United States Patent
Laporte et al.

(10) Patent No.: US 11,588,674 B2
(45) Date of Patent: Feb. 21, 2023

(54) SYSTEMS AND METHODS FOR MULTI-CARRIER OR MULTIBAND LOW-PAPR PRECODING THAT HANDLE CYCLIC PREFIX

(71) Applicant: Telefonaktiebolaget LM Ericsson (publ), Stockholm (SE)

(72) Inventors: Pierre-Andre Laporte, Gatineau (CA); Mark Edward Rollins, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/288,042

(22) PCT Filed: Oct. 26, 2018

(86) PCT No.: PCT/IB2018/058413
§ 371 (c)(1),
(2) Date: Apr. 23, 2021

(87) PCT Pub. No.: WO2020/084336
PCT Pub. Date: Apr. 30, 2020

(65) Prior Publication Data
US 2021/0399932 A1    Dec. 23, 2021

(51) Int. Cl.
*H04B 7/02*      (2018.01)
*H04L 27/26*     (2006.01)
*H04B 7/0456*    (2017.01)

(52) U.S. Cl.
CPC ....... *H04L 27/2615* (2013.01); *H04B 7/0456* (2013.01)

(58) Field of Classification Search
CPC .................. H04L 27/2615; H04B 7/0456
(Continued)

(56) References Cited

U.S. PATENT DOCUMENTS 5,732,113 A * 3/1998 Schmidl ............... H04L 5/0048
375/354
8,929,352 B2 * 1/2015 Fettweis ............ H04L 27/0006
370/344
(Continued)

FOREIGN PATENT DOCUMENTS

WO    2019069117 A1    4/2019

OTHER PUBLICATIONS

Aggarwal et al., "Minimizing the Peak-to-Average Power Ratio of OFDM Signals Using Convex Optimization," IEEE Transactions on Signal Processing, vol. 54, Issue 8, Aug. 2006, pp. 3099-3110.
(Continued)

*Primary Examiner* — Helene E Tayong
(74) *Attorney, Agent, or Firm* — Withrow & Terranova, PLLC

(57) ABSTRACT

Systems and methods are disclosed herein that relate to Peak-to-Average Power Ratio (PAPR) reduction in a MIMO OFDM transmitter system. In some embodiments, a method of operation of a transmitter system includes, for each carrier of two or more carriers, performing precoding of frequency-domain input signals for the carrier to provide frequency-domain precoded signals for the carrier, the frequency-domain input signals for the carrier being for a plurality of transmit layers for the carrier, respectively. The method further includes processing the two or more pluralities of frequency-domain precoded signals for the two or more carriers, respectively, in accordance with a multi-carrier processing scheme to provide a plurality of multi-carrier time-domain transmit signals for a plurality of antenna branches, respectively, of the MIMO OFDM transmitter system. The multi-carrier processing scheme provides PAPR reduction for Cyclic Prefixes (CPs) of the plurality of
(Continued)

multi-carrier time-domain transmit signals for the plurality of antenna branches.

18 Claims, 28 Drawing Sheets

(58) Field of Classification Search
USPC .......................................................... 375/267
See application file for complete search history.

(56) References Cited

U.S. PATENT DOCUMENTS

| 2008/0108310 | A1 | 5/2008 | Tong et al. | |
|---|---|---|---|---|
| 2014/0348254 | A1* | 11/2014 | Lee | H04B 7/0426 375/267 |
| 2016/0006594 | A1 | 1/2016 | Persson et al. | |
| 2018/0213510 | A1 | 7/2018 | Akkarakaran et al. | |
| 2020/0059770 | A1 | 2/2020 | Smith et al. | |
| 2020/0266859 | A1 | 8/2020 | Rollins et al. | |

OTHER PUBLICATIONS

Manasseh, et al., "Efficient PAPR Reduction Techniques for MIMO-OFDM Based Cognitive Radio Networks," IEEE International Symposium on Intelligent Signal Processing and Communication Systems, Nov. 2013, pp. 357-362.
Final Office Action for U.S. Appl. No. 16/644,917, dated Jun. 18, 2021, 8 pages.
Bao, Hengyao, et al., "An Efficient Bayesian PAPR Reduction Method for OFDM-Based Massive MIMO Systems," Cornell University Library, URL: "https://arxiv.org/abs/1511.09013," Nov. 29, 2015, 13 pages.
Bao, Hengyao, et al., "An Efficient Bayesian PAPR Reduction Method for OFDM-Based Massive MIMO Systems," EEE Transactions on Wireless Communications, vol. 15, No. 6, Jun. 2016, pp. 4183-4195.
Bao, Hengyao, et al., "Perturbation-Assisted PAPR Reduction for Large-Scale MIMO-OFDM Systems via ADMM," Cornell University Library, URL: "https://arxiv.org/abs/1607.02681," Jul. 10, 2016, 9 pages.
Parikh, N., et al., "Proximal Algorithms," Foundations and Trends in Optimization, Now: The Essences of Knowledge, vol. No. 3, 2013, 113 pages.
Studer, Christoph, et al., "Democratic Representations," Version 1, URL: https://arxiv.org/abs/1401.3420v1, Cornell University Library, Jan. 15, 2014, 35 pages.
Studer, Christoph, et al., "Democratic Representations," Version 2, URL: https://arxiv.org/abs/1401.3420v2, Cornell University Library, Apr. 21, 2015, 43 pages.
Studer, Christoph, et al., "PAR-Aware Large-Scale Multi-User MIMO-OFDM Downlink," IEEE Journal on Selected Areas in Communications, Cornell University Library, URL: "https://arxiv.org/pdf/1202.4034.pdf," Sep. 4, 2012, 11 pages.
International Search Report and Written Opinion for International Patent Application No. PCT/IB2017/056155, dated Jun. 1, 2018, 14 pages.
Invitation to Pay Additional Fees and Partial Search for International Patent Application No. PCT/IB2018/058413, dated Jul. 1, 2019, 13 pages.
International Search Report and Written Opinion for International Patent Application No. PCT/IB2018/058413, dated Aug. 22, 2019, 18 pages.
Non-Final Office Action for U.S. Appl. No. 16/644,917, dated Dec. 10, 2020, 7 pages.
Examination Report for European Patent Application No. 17794774.4, dated Jan. 28, 2022, 7 pages.
Non-Final Office Action for U.S. Appl. No. 17/882,161, dated Dec. 8, 2022, 16 pages.

\* cited by examiner

*Reciprocity-based zero-forcing transmitter block diagram*

Reciprocity-based ZF transmitter using CRAM for PAPR reduction

*Spatial transformation based on a 2D-DFT*

*Derivation of CRAM X update for port reduction*

MULTI-BAND CRAM

*CRAM dual-band Y-update*

Channel estimate and pseudo-inverse interpolation schemes

EVA CHANNEL AND ITS INTERPOLATED APPROXIMATION (LEFT) AND REPLICATED APPROXIMATION (RIGHT) FOR A 12-TONE GRANULARITY

SYSTEMS AND METHODS FOR MULTI-CARRIER OR MULTIBAND LOW-PAPR PRECODING THAT HANDLE CYCLIC PREFIX

This application is a 35 U.S.C. § 371 national phase filing of International Application No. PCT/IB2018/058413, filed Oct. 26, 2018, the disclosure of which is incorporated herein by reference in its entirety.

TECHNICAL FIELD

The present disclosure relates to Peak-to-Average Power Ratio (PAPR) in a Multiple Input Multiple Output (MIMO) system.

BACKGROUND

Future large scale Multiple Input Multiple Output (MIMO) Orthogonal Frequency Division Multiplexing (OFDM) systems promise significant capacity gains by using large adaptive antenna arrays with hundreds of elements. Reciprocity-based transmission provides the mechanism to achieve interference-free transmission between multiple users with these arrays using a Zero-Forcing (ZF) transmit precoding based on known Channel State Information (CSI). However, OFDM signaling exhibits a large Peak-to-Average Power Ratio (PAPR) requiring expensive linear Radio Frequency (RF) components and costly digital predistortion to manage and mitigate out-of-band radiation and non-linear signal distortions. Consequently, there is considerable interest in adopting low-PAPR signaling schemes for these systems.

In particular, Fifth generation (5G) wireless systems will introduce massive MIMO technology to further improve the spectral efficiency of mobile communication networks. Base station architectures will be fundamentally impacted as the number of antennas will increase approximately by one order of magnitude together with the associated number of transmitter and receiver chains. This paradigm shift will introduce some serious complexity challenges to the design of network radio products, where the size and the power consumption will dramatically increase if conventional design approaches are followed. In turn, these attributes will become some key competitive and selling arguments for network equipment vendors.

Low PAPR precoding algorithms offer a very elegant solution to this complexity problem by reducing the dynamic range of the OFDM signals to levels that are unattainable using traditional Crest Factor Reduction (CFR) techniques. This is achieved by taking advantage of the large number of degrees of freedom that are available in massive MIMO systems. The very low PAPR that is obtained using these techniques enables several radio optimizations such as the elimination of traditional CFR, the elimination or the reduced complexity of the Digital Pre-Distortion (DPD) algorithms, the efficient use of smaller and less power-hungry Power Amplifiers (PAs), the use of smaller cooling sub-systems, the potential utilization of lower resolution data converters, etc.

ZF Solution for Reciprocity-Based Systems

FIG. 1 is a block diagram for the transmitter of a reciprocity-based system based on ZF precoding. The ZF precoding system has the following attributes. A linear precoder $P_n^{ZF}$ performs digital beamforming individually on each tone, producing a vector $x_n \in \mathbb{C}^{M \times 1}$ from its layer-domain input information vector $s_n \in \mathbb{C}^{K \times 1}$. The precoder operates on total of $|\mathcal{T}|$ tones and the remaining $|\mathcal{T}^C|$ tones are unused and set to zero, where $|\mathcal{T}|+|\mathcal{T}^C|=N$. The precoder matrix $P_n^{ZF}$ is set to the "right pseudo-inverse" $H_n^\dagger$ of the MIMO channel matrix $H_n$ as shown in Equation 1. The precoder enforces the spatial constraints given in Equation 2 such that tone $x_n = P_n s_n$ is received at the receiver (e.g., a User Equipment (UE) in a Long Term Evolution (LTE) or 5G New Radio (NR) based system) as $H_n x_n = H_n P_n s_n = H_n H_n^\dagger s_n = s_n$, and so this ZF precoding scheme removes all multiple access interference between layers in the ideal case.

$P_n^{ZF} = H_n^\dagger = H_n^H (H_n H_n^H)^{-1}$  Equation 1: ZF Precoding Solution $s_n = H_n x_n, n \in \mathcal{T}$  Equation 2: ZF spatial constraints for a given tone index n.

$s_n = 0^{K \times 1}, n \in \mathcal{T}^C$.  Equation 2: ZF spatial constraints for a give tone index n.

Each of the N precoded vectors $x_n$ contains M samples to be distributed evenly across the M antenna branches of the transmitter. This "reordering" generates a new set of M vectors $a_m$ each containing N frequency-domain samples. These vectors are converted to time-domain vectors $y_m$ using respective Inverse Fast Fourier Transforms (IFFTs), and are then serialized and prepended with a Cyclic Prefix (CP) according to conventional OFDM practice.

Time-domain clipping of each antenna branch signal reduces the PAPR from a large value (typically ~10 Decibels (dB)) to a value in the range of 5.0 to 9.0 dB. This process introduces signal distortion both in-band and out-of-band, typically characterized by its Error Vector Magnitude (EVM) measured on each frequency-domain tone as a percentage between 3% and 20% depending on modulation format.

PAPR Reduction in Massive MIMO

Recent research demonstrates the large degrees of freedom afforded by large antenna arrays can be exploited in reciprocity-based systems to reduce PAPR to unforeseen levels by combining precoding, OFDM modulation, and PAPR reduction into a single complex optimization problem.

Consider a narrow-band Multi-User MIMO (MU-MIMO) system with K users and M antennas, where K<M. For a reciprocity-based system, the transmit vector x must satisfy s=Hx to eliminate fully the multi-user interference and convey the information vectors to the receiver (e.g., the UE). Since K<M, there are infinitely many vectors x satisfying s=Hx because the MIMO channel matrix H is rank-deficient. A new class of algorithms has emerged recently that use convex optimization techniques to identify candidate signals x that exhibit very low PAPR while still satisfying the spatial constraints s=Hx.

Several recent works demonstrate how this can be approached.

Reference [4] proposes a method called "Convex Reduction of Amplitudes for Parseval frames (CRAMP)" based on a Douglas-Rachford (DR) splitting recursion to identify "democratic representations" of signals that exhibit similar magnitudes in all samples. These signals have favorable PAPR characteristics. Reference [4] demonstrates how CRAMP reduces PAPR in conventional OFDM systems such as the DVB-T2 broadcast system. When reformulated to the massive MIMO context, CRAMP evolves to a related variant (herein referred to simply as Convex Reduction of Amplitudes (CRAM)) involving DR recursion procedures similar to [4], and involving an identical set of spatial constraints as in methods [1], [2], and [3]. Since CRAM solves for x directly rather than solving for the perturbation signal Δx, a simpler algorithm results with no inner loop, but only a single outer loop with a pair of proximal updates. Simulations demonstrate the CRAM algorithm can achieve a PAPR in the range of (2,4) dB in 4 to 8 iterations.

Methods [1], [3], and [4] all solve for the time-domain signal vector x using proximal methods of convex optimization [5] which lead to iterative solutions employing time-domain clipping and frequency-domain projection operations. In each case, the solutions solve Equation 3 where $f(x)$ and $g(x)$ are real-valued convex functions. Typically, the function $f(x)$ characterizes the peak properties of x, and g(x) describes the spatial constraints of the reciprocity-based OFDM transmission.

Convex optimization problem to solve for PAPR in Massive MIMO OFDM systems.

$$\min_x f(x)+g(x) \qquad \text{Equation 3}$$

The CRAM algorithm [4] represents the most promising member of this new class of solutions for PAPR reduction due to its simplicity, lack of nested iterative loops, and its attractive cost vs. performance trade-off. CRAM, as proposed in [4], is one of the most promising low-PAPR precoding approaches. Although the algorithm is very attractive from a computational cost perspective, reference [4] only describes a single-carrier system with ZF precoding. To support many of the practical constraints that are encountered in real-world systems, the CRAM framework of [1] was extended in International Patent Application No. PCT/IB2017/056155 to support the following features:
 Global vs. per-antenna clipping.
 Port reduction.
 Reciprocity-Assisted Interference Transmission (RAIT) to reduce inter-cell interference.
 Multi-carrier and multi-band configurations.
 Incomplete channel knowledge

SUMMARY

Systems and methods are disclosed herein that related to Peak-to-Average Power Ratio (PAPR) reduction in a (e.g., massive) Multiple Input Multiple Output (MIMO) Orthogonal Division Multiplexing (OFDM) transmitter system. In some embodiments, a method of operation of a Multiple Input Multiple Output (MIMO) (OFDM) transmitter system comprises, for each carrier of two or more carriers, performing precoding of a plurality of frequency-domain input signals for the carrier to provide a plurality of frequency-domain precoded signals for the carrier, the plurality of frequency-domain input signals for the carrier being for a plurality of transmit layers for the carrier, respectively. The method further comprises processing the two or more pluralities of frequency-domain precoded signals for the two or more carriers, respectively, in accordance with a multi-carrier processing scheme to provide a plurality of multi-carrier time-domain transmit signals for a plurality of antenna branches, respectively, of the MIMO OFDM transmitter system. The multi-carrier processing scheme provides Peak-to-Average Power Ratio (PAPR) reduction for Cyclic Prefixes (CPs) of the plurality of multi-carrier time-domain transmit signals for the plurality of antenna branches.

Embodiments of MIMO OFDM transmitter system are also disclosed. In some embodiments, a MIMO OFDM transmitter comprises precoding circuitry and processing circuitry. The precoding circuitry is operable to, for each carrier of two or more carriers, perform precoding of a plurality of frequency-domain input signals for the carrier to provide a plurality of frequency-domain precoded signals for the carrier, the plurality of frequency-domain input signals for the carrier being for a plurality of transmit layers for the carrier, respectively. The processing circuitry is operable to process the two or more pluralities of frequency-domain precoded signals for the two or more carriers, respectively, in accordance with a multi-carrier processing scheme to provide a plurality of multi-carrier time-domain transmit signals for a plurality of antenna branches, respectively, of the MIMO OFDM transmitter system. The multi-carrier processing scheme providing PAPR reduction for CPs of the plurality of multi-carrier time-domain transmit signals for the plurality of antenna branches.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
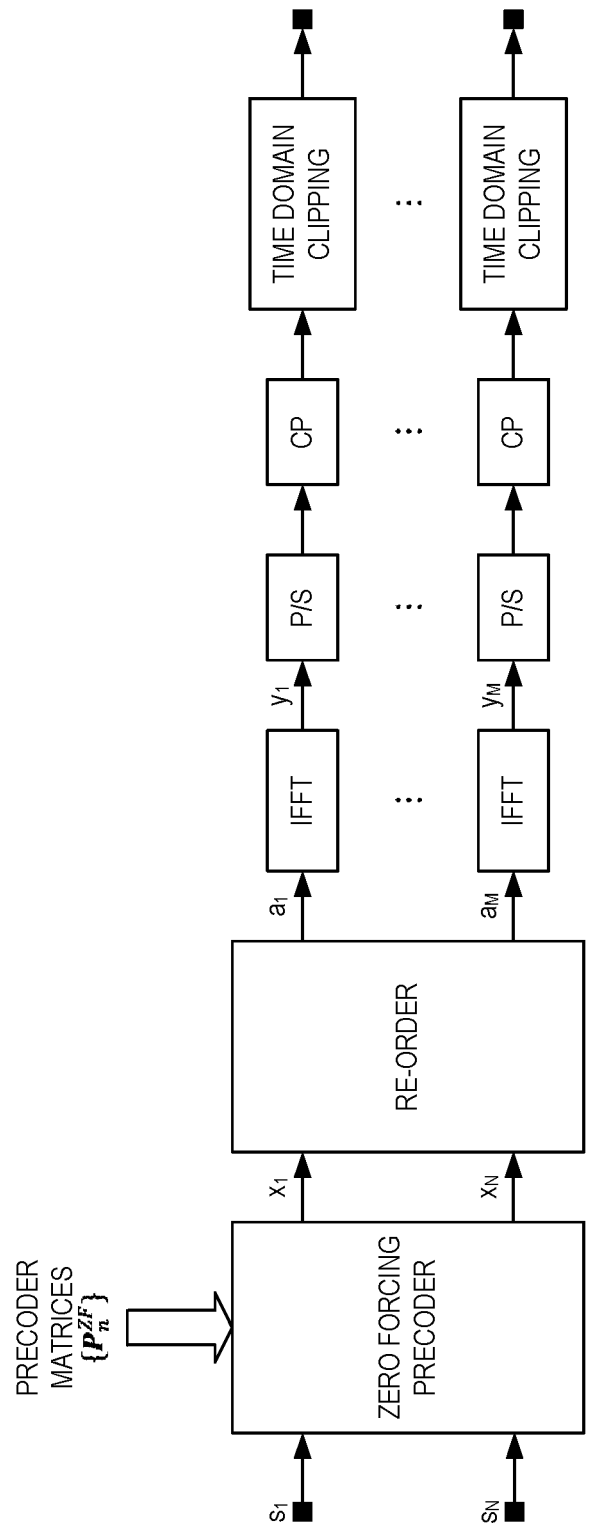
FIG. 1 is a block diagram for the transmitter of a reciprocity-based system based on Zero-Forcing (ZF) precoding.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, it is useful to first describe the application of Convex Reduction of Amplitudes (CRAM) for Peak-to-Average Power Ratio (PAPR) reduction in reciprocity-based systems. The basic goal of the CRAM algorithm is to identify a frequency-domain vector $x_n$ for each Orthogonal Division Multiplexing (OFDM) tone that satisfies two requirements (considered as spatial constraints and peak power constraints, respectively):

The first requirement ensures $x_n$ satisfies the spatial constraints for Zero-Forcing (ZF) precoding in Equation 2 such that $s_n = H_n x_n$ for all the tones $n \in \mathcal{T}$ carrying information via $s_n$, and $s_n = 0^{K \times 1}$ for all unused tones $n \in \mathcal{T}^C$.

The second requirement ensures the time-domain signal $y_m$ on each antenna branch $1 \leq m \leq M$ satisfies the PAPR constraint $\|y_m\|_\infty < P \forall m$. The relationship between the frequency-domain $x_n$ and the time-domain $y_m$ involves a mapping of layers to antenna branches as shown in Equation 4 and Equation 5, where the permutation matrix T re-orders the samples from layers into streams for transmission over M antennas, and $F_N \in \mathbb{C}^{N \times N}$ is the Discrete Fourier Transform (DFT) matrix of size N used to transform each antenna stream from time-domain to frequency-domain.

Permutation matrix to re-order precoded symbols for OFDM transmission.

$$[a_1^T, \ldots, a_M^T]^T = T[x_1^T, \ldots, x_N^T]^T \qquad \text{Equation 4}$$
$$\bar{a} = T\bar{x}$$

Relationship between frequency and timed-domain OFDM signal samples.

$$\begin{bmatrix} a_1 \\ a_2 \\ \vdots \\ a_M \end{bmatrix} = \begin{bmatrix} F_N & 0 & \ldots & 0 \\ 0 & F_N & \ldots & 0 \\ \vdots & \vdots & \ddots & \vdots \\ 0 & 0 & \ldots & F_N \end{bmatrix} \cdot \begin{bmatrix} y_1 \\ y_2 \\ \vdots \\ y_M \end{bmatrix} \qquad \text{Equation 5}$$
$$\bar{a} = \bar{F}\bar{y}$$

The CRAM algorithm [4] solves for $x_n$ using the iterative solution given in Equation 6. The vector $\bar{z}$, which is referred to herein as a vector or collection of Z-update outputs of the CRAM algorithm, accumulates the frequency-domain error in the spatial layers between $\bar{y}$ (a collection of $y_n$) and $\bar{x}$ (a collection of $x_n$) over all iterations of the algorithm. The vector $\bar{x}$ exhibits zero Error Vector Magnitude (EVM) and satisfies the spatial constraints in Equation 2. The vector $\bar{w}$ is the time-domain equivalent of the frequency-domain $\bar{y}$. The vector $\hat{w}$ is a clipped version of $\bar{w}$ satisfies the peak-power constraint $\|\hat{w}\|_\infty < P$.

The CRAM algorithm for PAPR reduction with large antenna arrays.

$$\bar{z}^{(0)} = 0 \qquad \text{Equation 6}$$

for $k = 1, 2, \ldots$ do $$x_n^{(k)} = z_n^{(k-1)} - P_n^{ZF}(H_n z_n^{(k-1)} - s_n), \forall n \in \mathcal{T}$$
$$x_n^{(k)} = 0, \forall n \in \mathcal{T}^C$$
$$\bar{w} = \bar{F}^H T(2\bar{x}^{(k)} - \bar{z}^{(k-1)})$$
$$\hat{w} = \text{clip}(w, P)$$
$$\bar{y}^{(k)} = T^T \bar{F} \hat{w}$$
$$\bar{z}^{(k)} = \bar{z}^{(k-1)} + \bar{y}^{(k)} - \bar{x}^{(k)}$$

end

Figure 2:
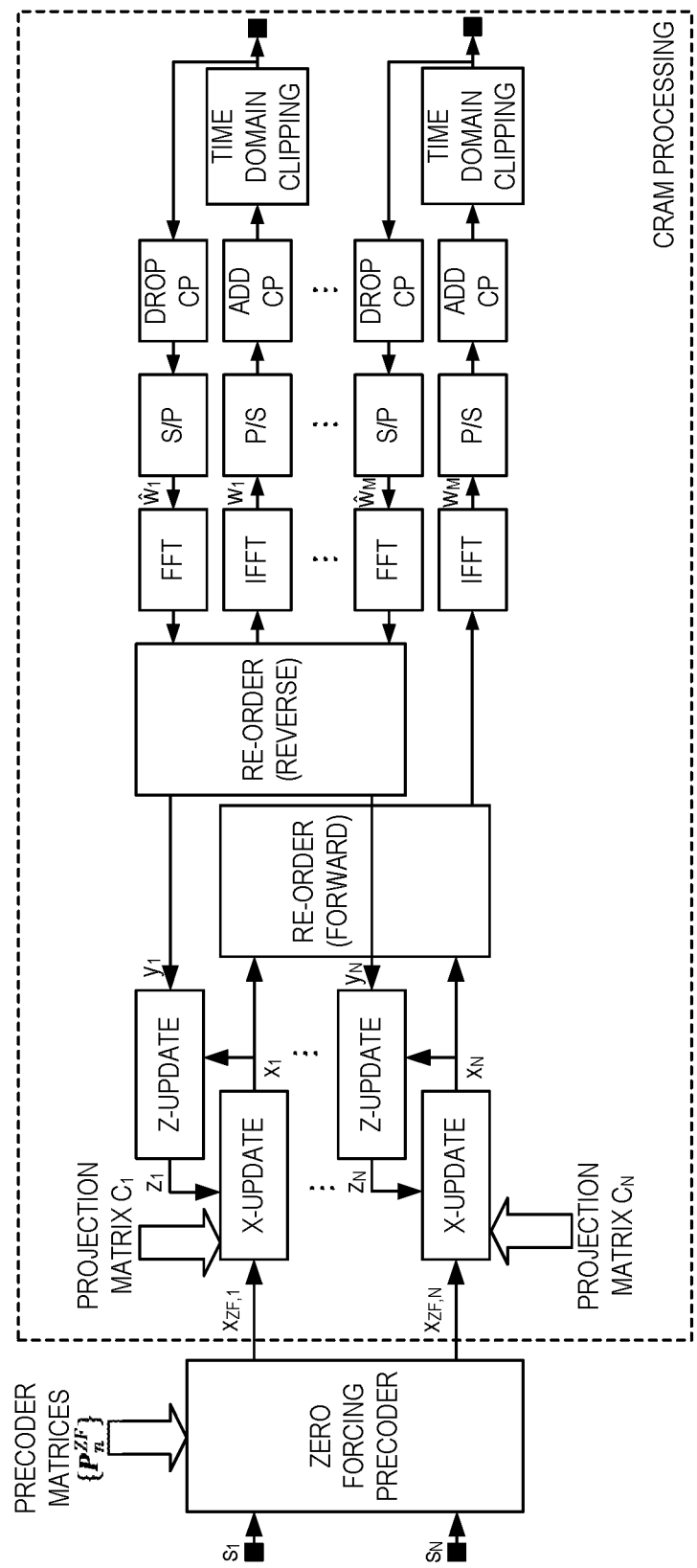
FIG. 2 is a block diagram for a reciprocity-based ZF transmitter that uses a Convex Reduction of Amplitudes (CRAM) algorithm for Peak-to-Average Power Ratio (PAPR) reduction.

A block diagram for a reciprocity-based ZF transmitter that uses the CRAM algorithm (i.e., the CRAM procedure or CRAM scheme) of Equation 6 for PAPR reduction is shown in FIG. 2. Note the Fast Fourier Transform (FFT) and Inverse FFT (IFFT) branches required by the CRAM iterations. The X-UPDATE blocks compute the respective values of $x_n^{(k)}$ for each k-th iteration of the CRAM algorithm in accordance with Equation 6. Together, the Z-UPDATE blocks maintain the z accumulator in accordance with Equation 6.

The X-UPDATE of Equation 6 may be expressed in an alternative form as shown in Equation 7, where $C_n=(I-P_n^{ZF}H_n)$ acts as a projection matrix for the CRAM algorithm.

CRAM X-UPDATE interpreted as an additive perturbation to the ZF solution.

$$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$\equiv C_n \cdot z_n^{(k-1)} + x_n^{ZF}$$

Equation 7

Figure 3:
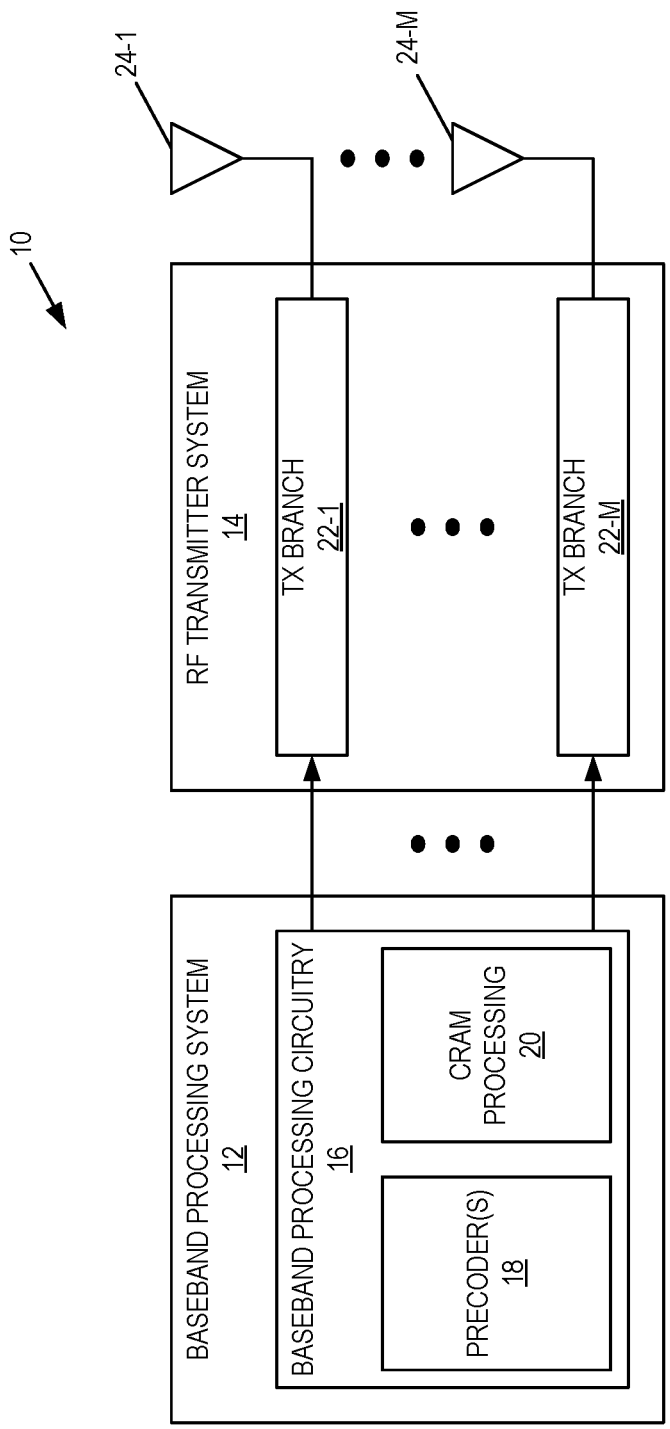
FIG. 3 illustrates a transmitter system in which embodiments of the present disclosure may be implemented.

FIG. 3 illustrates a transmitter system 10 in which embodiments of the present disclosure may be implemented. The transmitter system 10 may be part of a wireless device (e.g., a User Equipment (UE)) or a base station in a cellular communications network (e.g., a 5G cellular communications network), but is not limited thereto. The transmitter system 10 includes baseband processing system 12 and Radio Frequency (RF) transmitter circuitry 14. The baseband processing system 12 includes hardware or a combination of hardware and software. In particular, the baseband processing system 12 includes baseband processing circuitry 16 (e.g., one or more Digital Signal Processors (DSPs), one or more Application Specific Integrated Circuits (ASICs), one or more Field Programmable Gate Arrays (FPGAs), and/or the like). In some embodiments, the baseband processing circuitry 16 includes memory storing software that is executed by one or more processors within the baseband processing circuitry 16. This hardware and, in some embodiments, software implements one or more precoders 18 (e.g., one or more ZF precoders) and a CRAM processing system 20, as will be described in detail below. The precoder(s) 18 and the CRAM processing system 20 perform the precoding and CRAM processing according to embodiments of the present disclosure. The RF transmitter circuitry 14 includes multiple transmitter branches 22-1 through 22-M coupled to antenna elements or antenna element subarrays 24-1 through 24-M, respectively. As will be appreciated by one of skill in the art, each of the transmitter branches 22-1 through 22-M includes circuitry such as, for example, an Analog-to-Digital Converter (ADC), upconversion circuitry (e.g., mixers), a filter, a power amplifier, and the like. Each transmitter branch 22 and its respective antenna element or antenna element subarray 24 is referred to herein as an antenna branch of the transmitter system 10.

CRAM with Per-Antenna PAPR Reduction (e.g., Per-Antenna Clipping)

In some embodiments, the CRAM processing system 20 performs a CRAM algorithm that is extended to include per-antenna PAPR reduction in the time-domain. The per-antenna time-domain PAPR reduction uses a separate PAPR reduction limit (i.e., bound) which is set for each antenna branch based on an RMS signal level of the time-domain transmit signal for that antenna branch (i.e., the antenna branch signal component $w_m \forall_m = 1, \ldots M$). The per-antenna time-domain PAPR reduction is, in some particular embodiments, per-antenna time-domain clipping in which a separate clipping threshold $P_m$ is set for each antenna branch based on an RMS signal level of time-domain transmit signal for that antenna branch. In this manner, time-domain PAPR reduction is performed for each antenna branch independently to a level that is appropriate to its own RMS signal level.

Figure 4:
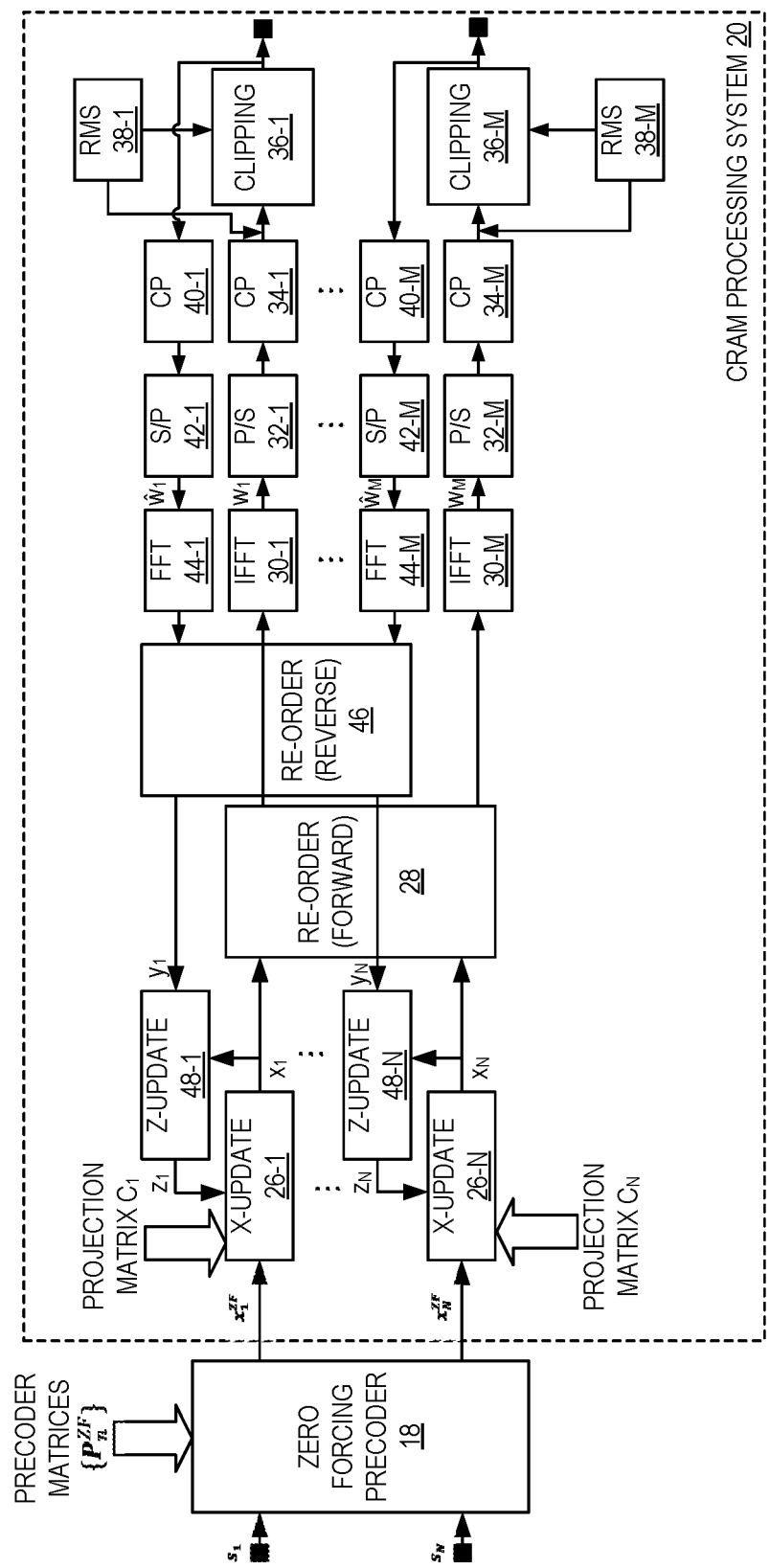
FIG. 4 illustrates the precoder(s) and the CRAM processing system of FIG. 3 in accordance with some embodiments of the present disclosure in which the CRAM algorithm implemented by the CRAM processing system provides per-antenna time-domain PAPR reduction.

In this regard, FIG. 4 illustrates the precoder(s) 18 and the CRAM processing system 20 in accordance with some embodiments of the present disclosure in which the CRAM algorithm implemented by the CRAM processing system 20 provides per-antenna time-domain PAPR reduction. As illustrated, in this example, the precoder(s) 18 is a ZF precoder, which, for consistency, is referred to as a ZF precoder 18.

The ZF precoder 18 receives a number (N) of frequency-domain input signals $s_n \in \mathbb{C}^{K \times 1}$ for $n=1, \ldots, N$. The frequency-domain input signals $s_n$ are also referred to herein as layer-domain input vectors. The number N is the number of tones in the OFDM symbol. For example, for a 20 MHz LTE signal, N=2048 and K is typically in the range of, e.g., 2 to 8. The ZF precoder 18 is a linear precoder that performs digital beamforming individually on each frequency-domain input signal $s_n$ using a respective ZF precoding matrix $P_n^{ZF}$ to produce a respective frequency-domain precoded signal $x_n^{ZF} \in \mathbb{C}^{M \times 1}$. The ZF precoder 18 operates on a total of $|\mathcal{T}|$ tones and the remaining $|\mathcal{T}^C|$ tones are unused and set to zero, where $|\mathcal{T}| + |\mathcal{T}^C| = N$. The precoder matrix $P_n^{ZF}$ is set to the "right pseudo-inverse" $H_n^\dagger$ of the MIMO channel matrix $H_n$ as shown in Equation 8. The ZF precoder 18 enforces the spatial constraints given in Equation 9, such that tone $x_n^{ZF} = P_n^{ZF} s_n$ is received at the UE as $H_n x_n^{ZF} = H_n P_n^{ZF} s_n = H_n H_n^\dagger s_n = s_n$, and so this ZF precoding scheme removes all multiple access interference between layers in the ideal case.

$$P_n^{ZF} = H_n^\dagger = H_n^H (H_n H_n^H)^{-1}$$

Equation 8: ZF Precoding Solution $$s_n = H_n x_n^{ZF}, n \in \mathcal{T}$$
$$s_n = 0^{K \times 1}, n \in \mathcal{T}^C.$$

Equation 9: ZF spatial constraints for a given tone index n.

Each of the N precoded vectors $x_n^{ZF}$ contains M samples to be distributed evenly across the M antenna branches after performing respective CRAM X-updates, as described below. The frequency-domain precoded vectors $x_n^{ZF}$ for $n=1, \ldots, N$ (also referred to herein as frequency-domain precoded signals $x_n^{ZF}$ for $n=1, \ldots, N$) are provided to the CRAM processing system 20.

The CRAM processing system 20 performs a CRAM algorithm that includes per-antenna PAPR reduction according to Equation 10.

CRAM algorithm with Per-Antenna PAPR Reduction $$\bar{z}^{(0)} = 0$$

Equation 10 for $k = 1, 2, \ldots$ do
$$x_n^{(k)} = z_n^{(k-1)} - P_n^{ZF}(H_n z_n^{(k-1)} - s_n), \forall n \in \mathcal{T}$$
$$x_n^{(k)} = 0, \forall n \in \mathcal{T}^C$$
$$\bar{w} = F^H T(2x^{(k)} - z^{(k-1)})$$
$$\hat{w} = \text{clip}(\bar{w}, \mathcal{P})$$
$$y^{(k)} = T^T F \hat{w}$$
$$z^{(k)} = z^{(k-1)} + y^{(k)} - x^{(k)}$$
end In Equation 10:
$\bar{z}^{(k)}$ is a collection of frequency-domain Z-update outputs generated by the CRAM processing system 20 for all N tones for the k-th iteration of the CRAM algorithm.
$x_n^{(k)}$ is a frequency-domain X-update output generated by the CRAM processing system 20 for the n-th tone for the k-th iteration of the CRAM algorithm.

$z_n^{(k-1)}$ is a frequency-domain Z-update output generated by the CRAM processing system 20 for the n-th tone for the (k−1)-th iteration of the CRAM algorithm.

$\overline{w}$ is a collection of time-domain signals $w_m$ for m=1, ..., M generated by the CRAM processing system 20 for the M antenna branches, respectively.

$F^H$ is a matrix transform equivalent to the Inverse DFT.

T( ) is a permutation matrix that re-orders the samples from layers into streams for transmission over M antenna branches.

$\hat{w}$ is a collection of clipped versions of the time-domain signals $w_m$ for m=1, ..., M generated by the CRAM processing system 20 for the M antenna branches, respectively.

$\overline{P}$ is a collection of separate clipping thresholds $P_m$ for m=1, ..., M for the M antenna branches of the transmitter system 10.

$\overline{y}^{(k)}$ is a collection of frequency-domain feedback signals $y_n^{(k)}$ generated by the CRAM processing system 20 for the n-th tone for the k-th iteration of the CRAM algorithm.

The X-update in the CRAM algorithm of Equation 10 can be expressed in an alternative form as shown in Equation 11, where $C_n = (I - P_n^{ZF} H_n)$ acts as a projection matrix for the CRAM algorithm for the n-th tone.

*CRAM X-UPDATE interpreted as an additive perturbation to the ZF solution*

$$x_n^{(k)} = z_n^{(k-1)} - P_n^{ZF}(H_n z_n^{(k-1)} - s_n), n \in \mathcal{J}$$
$$= (I - P_n^{ZF} H_n) \cdot z_n^{(k-1)} + P_n^{ZF} \cdot s_n$$
$$\equiv C_n \cdot z_n^{(k-1)} + x_n^{ZF}$$

Equation 11

The CRAM processing system 20 of FIG. 4 operates to perform the CRAM algorithm of Equations 10 and 11 as follows. A number of X-update functions 26-1 through 26-N operate to perform frequency-domain X-update procedures for the N tones for n=1, ..., N, respectively, in accordance with Equation 11. In the forward direction, the frequency-domain X-update outputs $x_n^{(k)}$ for n=1, ..., N are provided to a re-ordering function 28 that re-orders the frequency-domain X-update outputs $x_n^{(k)}$ to generate a new set of M vectors $a_m$ each containing N frequency-domain samples. In other words, each of the N frequency-domain X-update outputs $x_n^{(k)}$ contains M samples that are distributed evenly across the M antenna branches via the re-ordering function 28. The re-ordered vectors $a_m$ for m=1, ..., M (also referred to herein as re-ordered signals) are converted from the frequency-domain to the time-domain via respective IFFTs 30-1 through 30-M to provide the time-domain signals $w_m$ for m=1, ..., M for the M antenna branches, respectively. Time-domain processing is then performed on the M time-domain signals $w_m$ to provide M time-domain transmit signals. In this example, the time-domain processing includes Parallel-to-Serial (P/S) conversion by P/S converters 32-1 through 32-M and prepending Cyclic Prefixes (CPs) via CP functions 34-1 through 34-M, respectively. Time-domain clipping functions 36-1 through 36-M perform time-domain clipping of the M time-domain transmit signals for the M antenna branches using the M separate clipping thresholds $P_m$ for the M antenna branches, respectively, to thereby provide M clipped time-domain transmit signals for the M antenna branches. The M clipped time-domain transmit signals are output to the RF transmitter system 14 for transmission.

The M separate clipping thresholds $P_m$ for the M antenna branches are determined, e.g., by the time-domain clipping functions 36-1 through 36-M as a function of the RMS levels of the respective time-domain transmit signals. For example, the clipping threshold $P_m$ can be set to the desired level of PAPR reduction. As a specific example, to achieve a final PAPR of 3 dB to 5 dB, the clipping threshold $P_m$ can be set to be 4 dB above the measured RMS level. The RMS levels of the M time-domain transmit signals are determined by respective RMS level measurement functions 38-1 through 38-M. In this manner, each of the time-domain transmit signals is independently clipped to a level that is appropriate for its own RMS signal level. Note that while clipping is used in the example of FIG. 4 and Equation 10, other time-domain PAPR reduction techniques may be used. Some examples of other time-domain PAPR reduction techniques that can be used include a Look Up Table (LUT) use to shape the signal envelope. Rather than hard clipping based on the envelope, the envelope can be passed through a LUT that implements a "soft compression" function. This performs an arbitrary shaping of the signal envelope as a more flexible alternative to hard clipping.

In the reverse direction, the M clipped time-domain transmit signals are fed back through respective CP dropping functions 40-1 through 40-M and respective Serial-to-Parallel (S/P) converters 42-1 through 42-M to provide the M time-domain feedback signals for the M antenna branches, respectively, which correspond to the collection W of the clipped time-domain signals in Equation 10 above. The M time-domain feedback signals are converted from the time-domain to the frequency-domain via respective FFTs 44-1 through 44-M. A re-ordering function 46 performs a reverse re-ordering of the frequency-domain feedback signals to provide the N frequency-domain feedback signals $y_n^{(k)}$ for the N tones, respectively. The N frequency-domain feedback signals $y_n^{(k)}$ are provided to respective Z-update functions 48-1 through 48-N, which operate to perform a frequency-domain Z-update procedure in accordance with Equation 10 above. In particular, for each k-th iteration of the CRAM algorithm, the Z-update functions 48-1 through 48-N compute the collection of frequency-domain Z-update outputs as:

$$\overline{z}^{(k)} = \overline{z}^{(k-1)} + \overline{y}^{(k)} - \overline{x}^{(k)}.$$

The N frequency-domain Z-update outputs $z_n^{(k)}$ are provided to the N X-update functions 26-1 through 26-N, respectively, where they are used by the X-update functions 26-1 through 26-N to perform the frequency-domain X-update procedure for the N tones.

Figure 5:
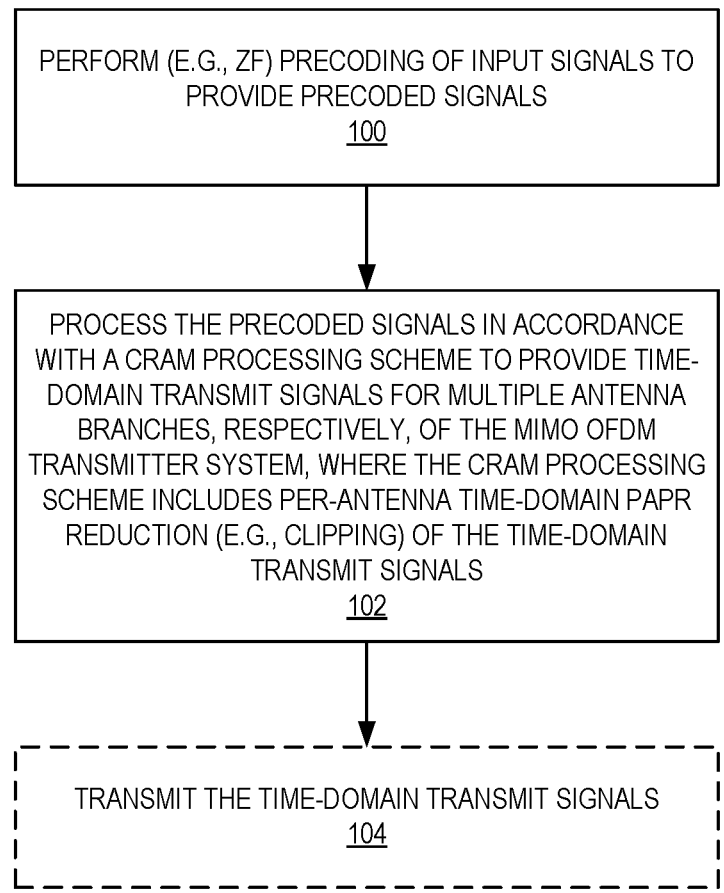
FIG. 5 is a flow chart that illustrates the operation of the transmitter system in accordance with some embodiments of the present disclosure.

FIG. 5 is a flow chart that illustrates the operation of the transmitter system 10 in accordance with some embodiments of the present disclosure. As illustrated, the transmitter system 10, and in particular the baseband processing system 12, performs (e.g., ZF) precoding of the frequency-domain input signals $s_n$ for n=1, ..., N to provide the frequency-domain precoded signals $x_n^{ZF}$ for n=1, ..., N, as described above (step 100). Note that while ZF precoding is used for the examples described herein, other types of precoding may be used. The transmitter system 10, and in particular the baseband processing system 12, processes the frequency-domain precoded signals $x_n^{ZF}$ for n=1, ..., N in accordance with a CRAM processing scheme to provide M time-domain transmit signals for the M antenna branches of the transmitter system 10 (step 102). The CRAM processing scheme includes per-antenna time-domain PAPR reduction (e.g., clipping) of the M time-domain transmit signals. In particular, in this embodiment, the CRAM processing scheme is that described above with respect to Equations 10 and 11. Optionally, the transmitter system 10, and in particular the RF transmitter circuitry 14, transmits the M time-domain transmit signals (step 104).

The CRAM algorithm with per-antenna PAPR improves the performance of CRAM significantly.

As shown herein, the RMS penalty of CRAM with per-antenna clipping is only 0.2 dB as compared to a penalty of 1.9 dB for "global" clipping. Overall, a peak reduction of 4.6 dB over ZF is achieved by the CRAM algorithm with per-antenna clipping as compared to 2.1 dB when using the conventional CRAM algorithm with global clipping.

CRAM with Port Reduction

In some embodiments, the transmitter system 10 utilizes an extension of the conventional CRAM algorithm of Equations 6 and 7 or an extension of the CRAM algorithm with per-antenna PAPR reduction of Equations 10 and 11 that supports port reduction. In particular, in contrast to the full-dimension system in which precoding uses a M×K precoding matrix $P_n^{ZF} \in \mathbb{C}^{M \times K}$, the port reduced system performs precoding into a subset of $N_B < M$ beams using a $N_B \times K$ matrix $P_n^{ZFB} \in \mathbb{C}^{B \times K}$ for each data bearing tone $n \in \mathcal{T}$. Here, $N_B$ is the number of (available) beams used in the port reduction scheme.

The set of $N_B$ precoded signals is then transmitted over the M antenna branches by applying a M×$N_B$ spatial transformation matrix $\varphi \in \mathbb{C}^{M \times N_B}$. In practice, $\varphi$ may be chosen using different strategies offering unique performance versus complexity tradeoffs. A fixed "grid-of-beams" strategy uses a fixed matrix $\varphi$ forming a set of uniformly distributed spatial beams across the coverage area. A Two-Dimensional DFT (2D-DFT) represents a common example of this type. A "channel-aware" strategy based on, for example, the Singular Value Decomposition (SVD) of the channel matrix can offer improved performance in certain conditions.

The CRAM algorithm operates on the signals output from the spatial transformation. To achieve the desired PAPR reduction, both the ZF precoding $P_n^{ZF}$ and CRAM projection matrix $C_n$ must be modified to take account of the specific spatial transformation matrix $\varphi$ used for port reduction.

Figure 6:
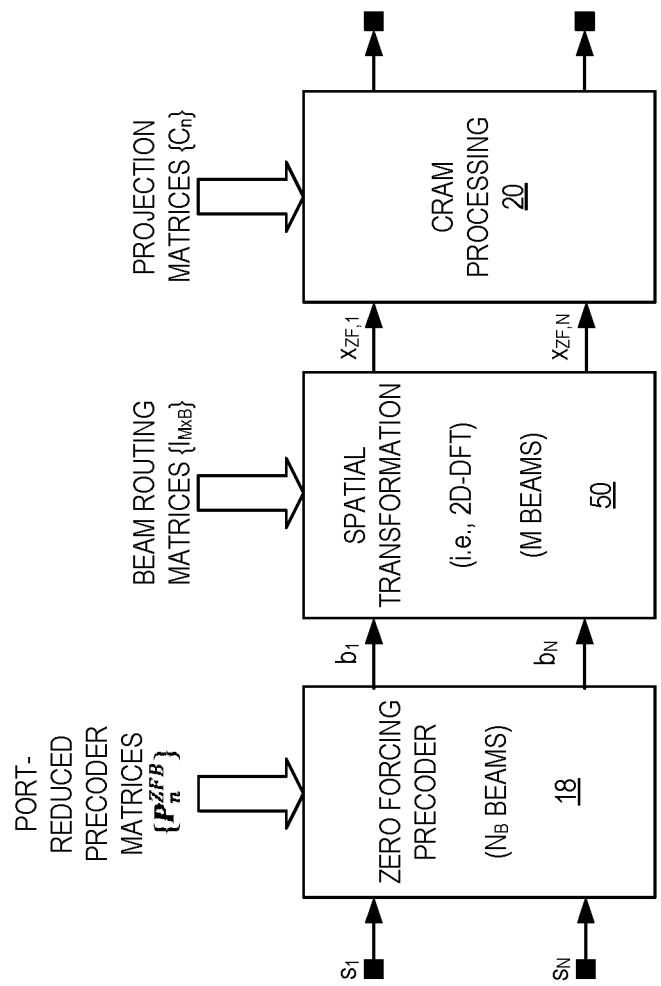
FIG. 6 illustrates the baseband processing system of the transmitter system of FIG. 3 that implements a CRAM algorithm with port reduction according to some embodiments of the present disclosure.

In this regard, FIG. 6 illustrates the baseband processing system 12 of the transmitter system 10 that implements a CRAM algorithm with port reduction according to some embodiments of the present disclosure. As illustrated, the ZF precoder 18 receives the N frequency-domain input signals $s_n$ and performs digital beamforming individually on each frequency-domain input signal $s_n$ using a respective port-reduced ZF precoding matrix $P_n^{ZFB}$ to produce N port reduced frequency-domain precoded signals $b_n \in \mathbb{C}^{N_B \times 1}$ for n=1, ..., N. A spatial transformation function 50 applies a M×$N_B$ spatial transformation matrix $\varphi \in \mathbb{C}^{M \times N_B}$ to each of the N port-reduced frequency-domain precoded signals $b_n$ to provide the N frequency-domain precoded signals $x_n^{ZF} \in \mathbb{C}^{M \times 1}$.

The CRAM processing system 20 performs a CRAM algorithm on the N frequency-domain precoded signals $x_n^{ZF} \in \mathbb{C}^{M \times 1}$. In some embodiments, the CRAM algorithm is the conventional CRAM algorithm of Equations 6 and 7. In some other embodiments, the CRAM algorithm is the CRAM algorithm of Equations 10 and 11, which includes per-antenna PAPR reduction as described above.

Figure 7:
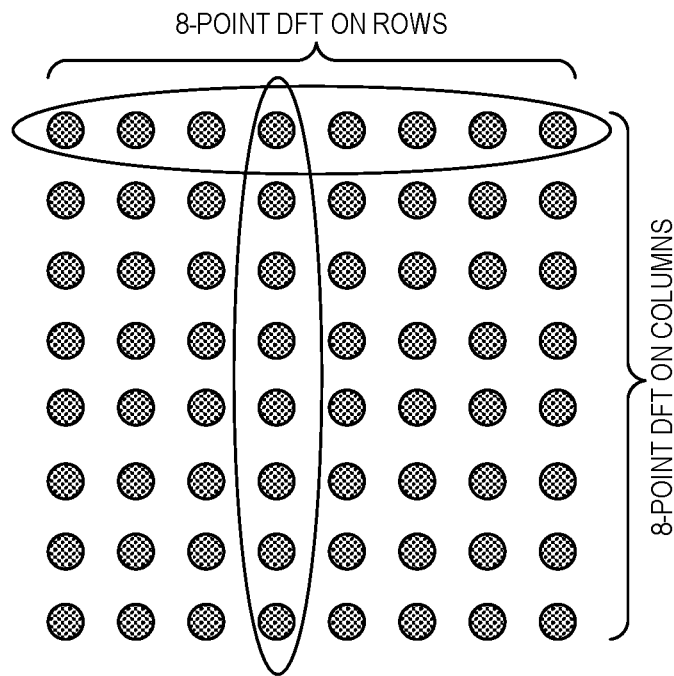
FIG. 7 illustrates an example Two Dimensional Discrete Fourier Transform (2D-DFT) antenna array concept.

To illustrate how ZF precoding and the CRAM algorithm can be extended to support port reduction, a fixed "grid-of-beams" strategy for the spatial transformation is used as an example. For simplicity, consider the 2D-DFT antenna array concept shown in FIG. 7. The antenna array supports M=64 beams in total using an 8×8 square grid of elements. To transmit a set of $N_B$ beams from the array, one must excite a subset of $N_B < M$ of the available antenna elements with the desired input beam signals while driving the remaining $N_B - M$ elements with zero-valued signals. The 2D-DFT spatial transformation will then first apply a One Dimensional DFT (1D-DFT) in the horizontal direction on each row of elements, followed by a second 1D-DFT (applied to the outputs of the first transform) in the vertical direction on each column of elements.

For this array configuration, the spatial transformation matrix may be expressed as in Equation 12, where $I_{M \times N_B}$ is a routing matrix with $N_B$ ones in total distributed across its M rows such that there is at most one non-zero entry per row and both $R_H$ and $R_V$ are matrices related to the 1D-DFT transformations performed on the rows and columns, respectively, of the array.

$$\varphi = R_V R_H I_{M \times B} \quad \text{Equation 12: 2D-DFT spatial transformation matrix.}$$

ZF Precoding Modifications to Support Port Reduction: To achieve ZF precoding, the port reduced system applies a $N_B \times M$ precoding matrix $P_n^{ZFB} \in \mathbb{C}^{K \times N_B}$ to form a reduced set of $N_B < M$ beams such that $\hat{s} \approx s$. To make this true, the precoding must be designed to satisfy $\hat{s} = H_n \cdot \varphi \cdot P_n^{ZFB} \cdot s \approx s$. It follows that $P_n^{ZFB} = (H_n \cdot \varphi)^\dagger$ as shown in Equation 13.

*ZF precoding solution with port reduction to B ports*

$$P_n^{ZFB} = (H_n \cdot \varphi)^\dagger \quad \text{Equation 13}$$
$$= (H_n \cdot R_V R_H I_{M \times B})^\dagger$$

CRAM Modifications to Support Port Reduction: To support port reduction, the CRAM X-update reproduced in Equation 14 (for convenience) must be modified to account for $P_n^{ZFB} \in \mathbb{C}^{K \times N_B}$ and $\varphi$.

$$x_n^{(k)} = z_n^{(k-1)} - P_n^{ZF} H_n z_n^{(k-1)} - s_n), \forall n \in \mathcal{T} \quad \text{Equation 14:}$$
Conventional CRAM X-update
prior to modification for port reduction.

Figure 8:
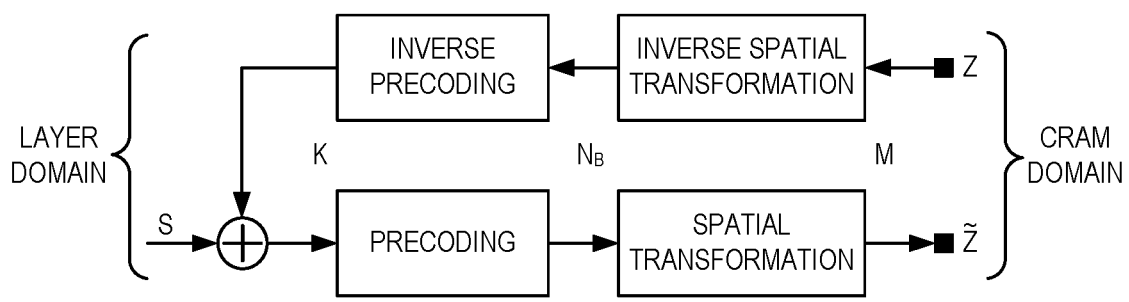
FIG. 8 illustrates the derivation of the CRAM X-update for port reduction.

The CRAM $z_n^{(k)}$ accumulator lies in the antenna branch domain, but must be transformed into the layer domain before it can be compared to $s_n$. FIG. 8 shows how this is done. First, an inverse spatial transformation (given by $\varphi^\dagger$) is applied to transform from the antenna domain to the beam domain (of dimension $N_B$). Then, an inverse precoding operation (given by $P_n^{ZFB\dagger}$) transforms the beam domain result to the layer domain (of dimension K). Once in the layer domain, the transformed $z_n^{(k)}$ may be compared to $s_n$ and then the result may be brought back to the antenna domain by precoding with $P_n^{ZFB}$ followed by applying the spatial transformation matrix $\varphi$.

Equation 14 provides the final CRAM X-update modified for port reduction based on the description above. The simplifications involve substitution of $P_n^{ZFB}$ into Equation 7 (or alternatively Equation 11), and then writing $(H_n \cdot \varphi)^\dagger = \varphi^\dagger H_n^\dagger$ and simplifying when the spatial transformation matrix is multiplied by its right pseudo-inverse (i.e., $\varphi \varphi^\dagger = I$).

CRAM X-update modified for port reduction $$x_n^{(k)} = z_n^{(k-1)} - \varphi P_n^{ZFB}(P_n^{ZFB\dagger} \varphi^\dagger z_n^{(k-1)} - s_n), \; \forall n \in \mathcal{T}$$ Equation 15

$$= z_n^{(k-1)} - \varphi(H_n \cdot \varphi)^\dagger (H_n \cdot \varphi) \varphi^\dagger z_n^{(k-1)} + \varphi P_n^{ZFB} s_n$$

$$= z_n^{(k-1)} - \varphi \varphi^\dagger H_n^\dagger H_n \varphi \varphi^\dagger z_n^{(k-1)} + \varphi P_n^{ZFB} s_n$$

$$= z_n^{(k-1)} - H_n^\dagger H_n z_n^{(k-1)} + \varphi P_n^{ZFB} s_n$$

$$= (I - H_n^\dagger H_n) z_n^{(k-1)} + \varphi P_n^{ZFB} s_n$$

$$\equiv C_n z_n^{(k-1)} + x_n^{ZF}$$

The following points highlight the modifications provided by the embodiments of the present disclosure to extend the reciprocity-based ZF precoding system with CRAM to support port reduction:

The vector $x_n^{ZF} \equiv \varphi P_n^{ZFB} s_n$ provides the ZF solution for the port-reduced system.

The CRAM projection matrix $C_n = (I - H_n^\dagger H_n)$ is independent of the spatial transformation matrix $\varphi$ and can be used to affect a PAPR reduction in the port-reduced system.

CRAM Extension for Multi-Cell Interference Scenarios

Some embodiments of the present disclosure extend the conventional CRAM algorithm of Equations 6 and 7, the CRAM algorithm of Equations 10 and 11 that provide per-antenna time-domain PAPR, or the extension of the CRAM algorithm that supports port reduction described above to support RAIT transmission through the following modifications. First, the spatial constraints of the CRAM algorithm are extended to include a new spatial beamforming constraint that forces all inter-cell interference to zero. The CRAM algorithm thus modified then enforces both this new inter-cell interference constraint while at the same time maintaining its original spatial constraints to affect the desired home-cell beamforming. Secondly, three different methods of incorporating, into the CRAM algorithm, Channel State Information (CSI) that characterizes the radio propagation medium between the interfering cell and the home cell are disclosed. Embodiments of the present disclosure incorporate into the CRAM iterations knowledge of the respective radio link's MIMO channel matrix $H_{Inter}$, its covariance matrix $\Lambda = \hat{H}_{Inter}^H \cdot \hat{H}_{Inter}$, or a smoothed estimate $\hat{\Lambda}_f$ of that covariance matrix so that practical PAPR reduction can be achieved for multi-cell systems employing RAIT for inter-cell interference mitigation.

A discussion will now be provided to demonstrate how the CRAM X-update procedure can be modified to incorporate inter-cell CSI to allow multi-cell operation using RAIT.

CRAM for RAIT with Perfect Channel Matrix Information: In this subsection, we will assume that the transmitter system 10 is a base station that can estimate the inter-channel response $H_{inter}$. From Equation 7 for the conventional CRAM algorithm:

$$x_n^{(k)} = z_n^{(k-1)} - P_n^{ZF}(H_n z_n^{(k-1)} - s_n), \; n \in \mathcal{T}$$

$$= (I - P_n^{ZF} H_n) \cdot z_n^{(k-1)} + P_n^{ZF} \cdot s_n$$

$$\equiv C_n \cdot z_n^{(k-1)} + x_n^{ZF}$$

But from Equation 1, the precoding matrix $P_n^{ZF}$ is given by the pseudo-inverse of the channel matrix, $P_n^{ZF} = H_n^\dagger = H_n^H (H_n H_n^H)^{-1}$. Therefore, Equation 7 can be effectively rewritten as:

$$x_n^{(k)} = H_n^\dagger \cdot s_n + (I - H_n^\dagger H_n) \cdot z_n^{(k-1)}, n \in \mathcal{T}$$

This equation can be extended to RAIT by expressing the CRAM X-update as follows in Equation 16.

CRAM X-update for RAIT with Perfect Channel Matrix Information $$x_n^{(k)} = \begin{bmatrix} H_{intra,n} \\ H_{inter,n} \end{bmatrix}^\dagger \cdot \begin{bmatrix} s_n \\ 0 \end{bmatrix} + \left( I - \begin{bmatrix} H_{intra,n} \\ H_{inter,n} \end{bmatrix}^\dagger \begin{bmatrix} H_{intra,n} \\ H_{inter,n} \end{bmatrix} \right) \cdot z_n^{(k-1)},$$ Equation 16

$$n \in \mathcal{T}$$

The "intra" label to the MIMO channel matrix refers to the current cell, and the "inter" label for the MIMO channel matrix refers to the interfering cell. The dimensions are the same for both matrices (i.e., L×M for L layers and M antennas). However, it is also possible that the desired cell uses $K_{intra}$ layers and the interfering cell uses $K_{inter}$ layers. In that case, $H_{intra,n}$ is a $K_{intra} \times M$ matrix, and $H_{inter,n}$ is a $K_{inter} \times M$ matrix. These two can still be stacked as shown in Equation 16 and the solution will work. So, there is no restriction that both cells need to use the same number of layers. Note that Equation 11 for the CRAM algorithm that uses per-antenna time-domain PAPR reduction can be rewritten in the same manner.

Using the X-update of Equation 16 will enforce both the zero-EVM and zero-interference constraints.

CRAM for RAIT with Perfect Covariance Information: In practice, the base station does not typically have access to the inter-cell channel $H_{Inter}$ matrix. Instead, the base station can only estimate the covariance matrix $\Lambda = \hat{H}_{Inter}^H \cdot \hat{H}_{Inter}$. Here, the X update equation is reformulated to use only the covariance matrix $\Lambda$.

While the RAIT equation solved the problem $$W = \underset{W}{\operatorname{argmin}} \left\| \begin{bmatrix} H^{DL} \\ G^{DL} \end{bmatrix} W - \begin{bmatrix} H^{ref} \\ 0 \end{bmatrix} \right\|_{fro}^2$$

with a form equivalent to a Tikhonov regularization, the problem is reformulated as a generalized Tikhonov like problem more suitable for iterative approaches. Applying similar derivation to the CRAM/RAIT problem leads to the following equations:

$$K = (\hat{H}_{Intra}^H \hat{H}_{Intra} + \Lambda)^{-1}; \Theta = \hat{H}_{Intra}^H \cdot \hat{H}_{Intra}; \Lambda = \hat{H}_{Inter}^H \cdot \hat{H}_{Inter}$$

$$x_n^{(k)} = z_n^{(k-1)} - K \cdot \hat{H}_{Intra}^H (\hat{H}_{Intra} z_n^{(k-1)} - s_n) - K \cdot \Lambda \cdot z_n^{(k-1)}$$

The equivalent X-update equation is given in Equation 17.

$$x_n^{(k)} = K H_{intra,n}^H \cdot s_n + (I - K\Theta - K\Lambda) \cdot z_n^{(k-1)}, n \in \mathcal{T}$$ Equation 17: CRAM X-update for RAIT with Perfect Covariance Information Note that the X-update in Equation 17 was extended with the term $K \cdot \Lambda z_n^{(k-1)}$ instead of being augmented with the pseudo-inverse involving $H_{Inter}$ as in the X-update when using perfect channel matrix information.

CRAM for RAIT with Imperfect Covariance Information: In practice, the base station does not have an ideal measurement of the covariance matrix $\Lambda$. Instead, the base station estimates the covariance matrix. The estimated covariance matrix is denoted as $\hat{\Lambda}$. In some embodiments, the channel covariance estimation is applied to generate the estimated covariance matrix $\hat{\Lambda}$.

When using the estimated covariance matrix $\hat{\Lambda}$, the new X-update equation is given by:

$$K = \left(\hat{H}_{Intra}^H \hat{H}_{Intra} + \hat{\Lambda}\right)^{-1}; \Theta = \hat{H}_{Intra}^H \cdot \hat{H}_{Intra};$$

$$\hat{\Lambda}_f = \frac{1}{N_{isc}} \sum_{f - \frac{N_{isc}}{2} < f < f + \frac{N_{isc}}{2}} \Lambda_f \Lambda_f^H$$

$$x_n^{(k)} = z_n^{(k-1)} - K \cdot \hat{H}_{Intra}^H \left(\hat{H}_{Intra} z_n^{(k-1)} - s_n\right) - K \cdot \hat{\Lambda} \cdot z_n^{(k-1)}$$

The equivalent X update equation is given by Equation 18:

$$x_n^{(k)} = KH_{intra,n}^H \cdot s_n + (I - K\Theta - K\hat{\Lambda}) \cdot z_n^{(k-1)}, n \in \mathcal{T}$$

Equation 18: CRAM X-update for RAIT with Imperfect Covariance Information

CRAM Extension for Multi-Carrier Operation

Some embodiments of the present disclosure utilize a CRAM algorithm that extends CRAM to support multi-carrier systems through the following modifications:

A higher sampling rate is adopted for the CRAM Y-update so that the clipping function may produce a more reliable peak cancellation that is preferable for multi-carrier signals. The PAPR reduction capability of CRAM is preserved by incorporating this high sample rate clipping directly into the iterative loop of CRAM. This sampling rate increase may be realized, e.g., by conventional time-domain interpolation filters or by zero-padding a larger dimension IFFT within the CRAM iteration.

Tuning blocks are incorporated within the CRAM iterations so that individual carriers may be tuned from their baseband origin of the X-update into proper position within the frequency-band to construct the multi-carrier signal utilized by the Y-update. Two sets of tuning blocks are used per carrier. The first set of tuners tune the signals from baseband to their proper offsets for clipping, and the second set of tuners tunes the clipped signals back to baseband for the next CRAM iteration. Note that decimation back to the original baseband sampling rate is also performed.

The CRAM Z-update is modified to move the CRAM Z-update from the frequency-domain to the time-domain. Consequently, the solution error difference is accumulated in the time-domain at the new higher sampling rate of the newly constructed multi-carrier signal rather than in the frequency-domain at the low sampling rate of the individual carriers. This allows the multi-carrier CRAM algorithm to achieve PAPR reduction of the multi-carrier signal comparable to that achieved for a single carrier signal.

Figure 9:
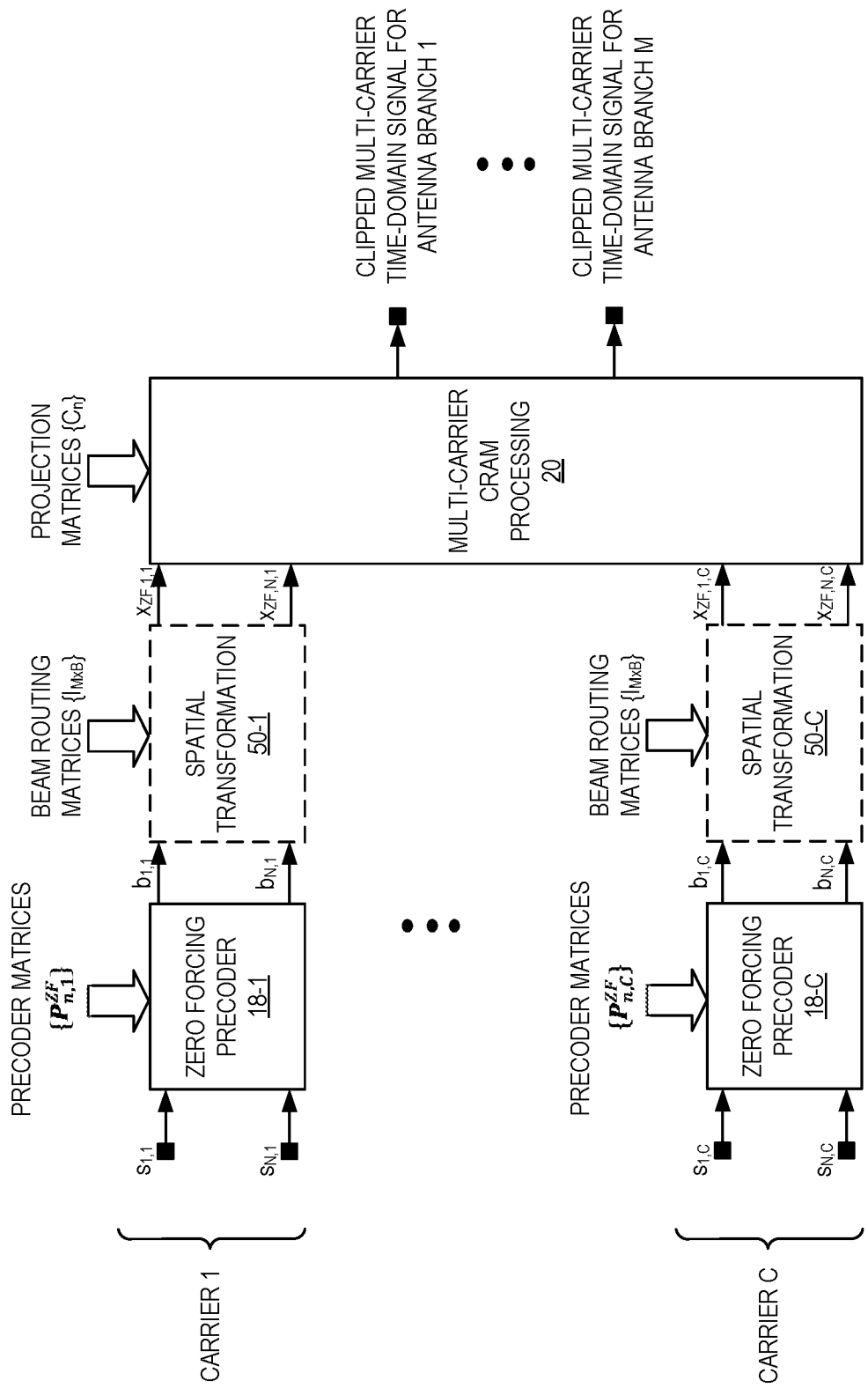
FIG. 9 illustrates the precoders, optional spatial transformation functions, and the (multi-carrier) CRAM processing system of FIG. 3 in accordance with some embodiments of the present disclosure in which the CRAM algorithm implemented by the CRAM processing system supports multi-carrier operation.

In this regard, FIG. 9 illustrates the precoders 18-1 through 18-C, optional spatial transformation functions 50-1 through 50-C, and the (multi-carrier) CRAM processing system 20 in accordance with some embodiments of the present disclosure in which the CRAM algorithm implemented by the CRAM processing system 20 supports multi-carrier operation. Here, C is the number of carriers, where C is greater than or equal to 2. As illustrated, in this example, the precoders 18-1 through 18-C are ZF precoders, which for consistency are referred to as ZF precoders 18-1 through 18-C.

The ZF precoder 18-c for c=1, . . . , C receives a number (N) of frequency-domain input signals $s_{n,c} \in \mathbb{C}^{K \times 1}$ for n=1, . . . , N for the c-th carrier. The frequency-domain input signals $s_{n,c}$ are also referred to herein as layer-domain input vectors for the c-th carrier. The number N is the number of layers in the layer-domain for the c-th carrier, where N is also the number of tones (i.e., OFDM tones or subcarriers) for the c-th carrier. Note that since the bandwidth and thus the number of tones for each carrier may vary, then N may also vary from one carrier to another. The ZF precoder 18-C is a linear precoder that performs digital beamforming individually on each frequency-domain input signal $s_{n,c}$ using a respective ZF precoding matrix $P_{n,c}^{ZF}$ to produce a respective frequency-domain precoded signal $x_{n,c}^{ZF} \in \mathbb{C}^{M \times 1}$ for the c-th carrier. The ZF precoder 18-C operates on total of $|\mathcal{T}|$ tones for the c-th carrier and the remaining $|\mathcal{T}^C|$ tones for the c-th carrier are unused and set to zero, where $|\mathcal{T}|+|\mathcal{T}^C|=N$. The precoder matrix $P_{n,c}^{ZF}$ is set to the "right pseudo-inverse" $H_{n,c}^\dagger$ of the MIMO channel matrix $H_{n,c}$ for the c-th carrier as shown in Equation 19. The ZF precoder 18-C enforces the spatial constraints given in Equation 20 for the c-th carrier such that tone $x_{n,c}^{ZF} = P_{n,c}^{ZF} s_{n,c}$ is received at the UE as $H_{n,c} x_{n,c}^{ZF} = H_{n,c} P_{n,c}^{ZF} s_{n,c} = H_{n,c} H_{n,c}^\dagger s_{n,c} = s_{n,c}$, and so this ZF precoding scheme removes all multiple access interference between layers in the ideal case.

$$P_{n,c}^{ZF} = H_{n,c}^\dagger = H_{n,c}^H (H_{n,c} H_{n,c}^H)^{-1}$$

Equation 19: ZF Precoding Solution $$s_{n,c} = H_{n,c} x_{n,c}^{ZF}, n \in \mathcal{T}$$

$$s_{n,c} = 0^{K \times 1}, n \in \mathcal{T}^C.$$

Equation 20: ZF spatial constraints for a given tone index n.

Each of the N precoded vectors $x_{n,c}^{ZF}$ for the c-th carrier contains M samples to be distributed evenly across the M antenna branches after performing respective CRAM X-updates, as described below. The frequency-domain precoded vectors $x_{n,c}^{ZF}$ for n=1, . . . , N for the c-th carrier (also referred to herein as frequency-domain precoded signals $x_{n,c}^{ZF}$ for n=1, . . . , N for the c-th carrier) are provided to the CRAM processing system 20.

Alternatively, if port reduction is used, the ZF precoder 18-C for c=1, . . . , C receives the N frequency-domain input signals $s_{n,c}$ for the c-th carrier and performs digital beamforming individually on each frequency-domain input signal $s_{n,c}$ using a respective port-reduced ZF precoding matrix $P_{n,c}^{ZFB}$ to produce N port reduced frequency-domain precoded signals $b_{n,c} \in \mathbb{C}^{N_B \times 1}$ for n=1, . . . , N for the c-th carrier. A spatial transformation function 50-C applies a $M \times N_B$ spatial transformation matrix $\varphi \in \mathbb{C}^{M \times N_B}$ to each of the N port-reduced frequency-domain precoded signals $b_{n,c}$ for the c-th carrier to provide the N frequency-domain precoded signals $x_{n,c}^{ZF} \in \mathbb{C}^{M \times 1}$ for the c-th carrier.

Figure 10A:
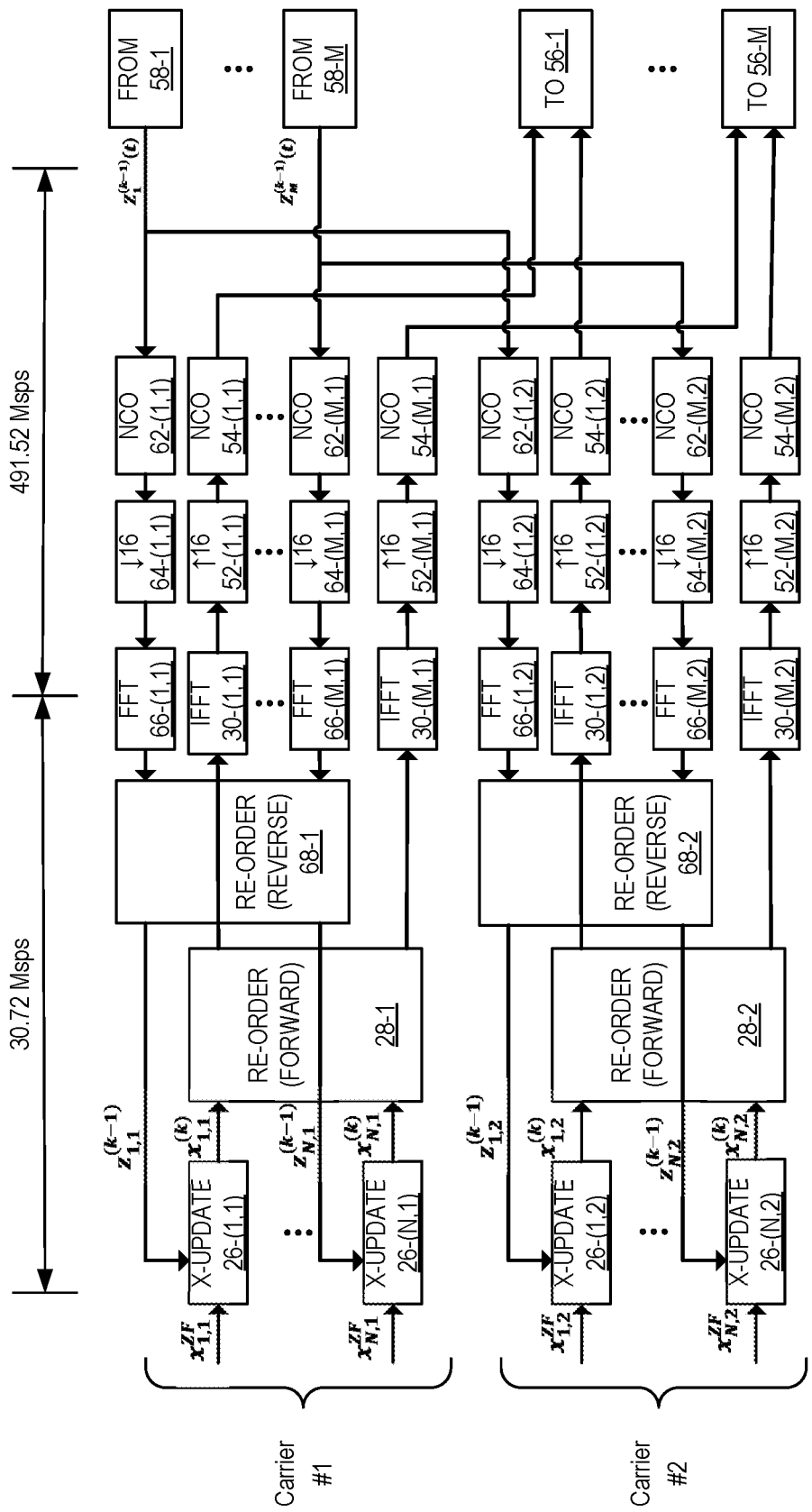
FIGS. 10A and 10B illustrate one example of the CRAM processing system of FIG. 9 that implements a multi-carrier CRAM algorithm.
Figure 10B:
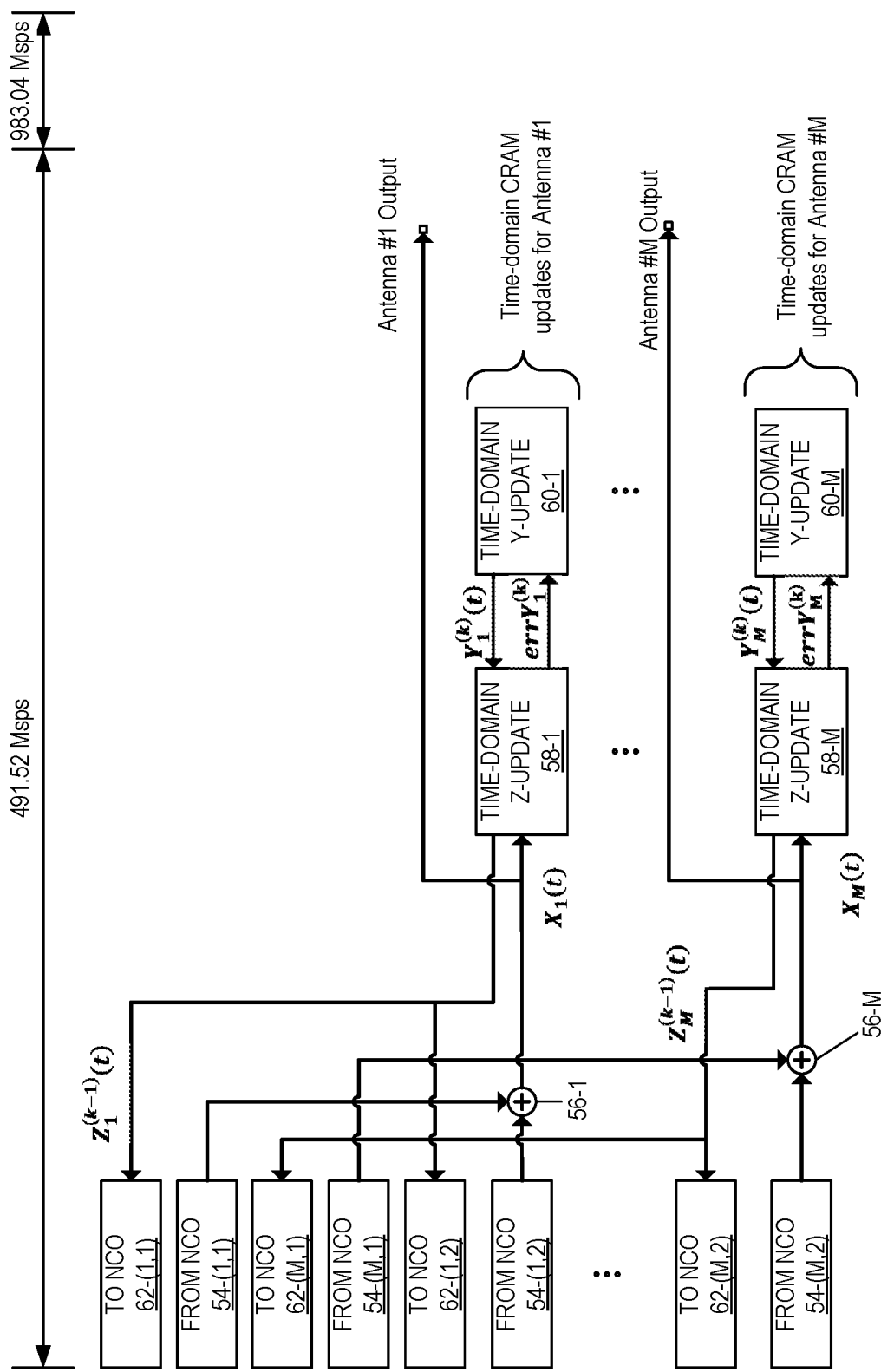

The CRAM processing system 20 performs a multi-carrier CRAM algorithm to generate M multi-carrier time-domain transmit signals for the M antenna branches, respectively. FIGS. 10A and 10B illustrate one example of the CRAM processing system 20 of FIG. 9 that implements a multi-carrier CRAM algorithm. For clarity and ease of discussion, there are only two carriers in the example of FIGS. 10A and 10B. However, the architecture in FIGS. 10A and 10B can be extended to any number of two or more carriers.

The CRAM processing system 20 of FIGS. 10A and 10B operates to perform a multi-carrier CRAM algorithm as follows. Looking first at the first carrier (i.e., Carrier #1), a number of X-update functions 26-(1,1) through 26-(N,1) operate to perform frequency-domain X-update procedures for the N tones for n=1, . . . , N for the first carrier, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,1}^{(k)}$ for n=1, . . . , N for the first carrier are provided to a re-ordering function 28-1 for the first carrier that re-orders the frequency-domain X-update outputs $x_{n,1}^{(k)}$ for the first carrier to generate a new set of M vectors $a_{m,1}$ for the first carder, each containing N frequency-domain samples. In other words, each of the N frequency-domain X-update outputs $x_{n,1}^{(k)}$ for the first carrier contains M samples that are distributed evenly across the M antenna branches via the re-ordering function 28-1. The re-ordered vectors $a_{m,1}$ for m=1, . . . , M (also referred to herein as re-ordered signals) are converted from the frequency-domain to the time-domain via respective IFFTs 30-(1,1) through 30-(M,1) to provide M time-domain signals for the M antenna branches, respectively, for the first carrier. While not illustrated, time-domain processing such as P/S conversion and CP insertion may be performed.

Interpolators 52-(1,1) through 52-(M,1) interpolate the M time-domain signals for the first carrier from a lower sampling rate used for the frequency-domain processing to a higher sampling rate. In this example, the first and second carriers are 20 MHz carriers, and the IFFTs (for both the first carrier and the second carrier) are 2048 point carriers, where the lower sampling rate is 30.72 Mega-Samples Per Second (Msps) and the higher sampling rate is 491.52 Msps. Note that these sampling rates are only examples. Other sampling rates may be used. Further, the interpolators 52-(1,1) through 52-(M,1) are upsamplers in this example, but any time-domain interpolation technique may be used. The upsamplers may be implemented as a number of cascaded filters. Since the carriers are centered around 0 Hertz (Hz), the filter requirements can be relaxed as we progress through the interpolation chain. Further, upsampling may alternatively be performed in the frequency-domain by using larger IFFTs 30-(1,1) through 30-(M,1) and zero-padding the additional subcarriers.

The M interpolated time-domain signals for the first carrier are tuned to an appropriate frequency offset for the first carrier by, in this example, corresponding Numerically Controlled Oscillators (NCOs) 54-(1,1) through 54-(M,1). The NCOs 54-(1,1) through 54-(M,1) may be implemented using a LUT or Coordinate Rotation Digital Computer (CORDIC) techniques, as will be appreciated by one of ordinary skill in the art. Note that there are no restrictions on the positions of the carriers (i.e., any desired carrier frequencies can be used). The M tuned time-domain signals for the first carrier are input to M combiners 56-1 through 56-M, respectively.

Turning to the second carrier (i.e., Carrier #2), a number of X-update functions 26-(1,2) through 26-(N,2) operate to perform frequency-domain X-update procedures for the N tones for n=1, . . . , N for the second carrier, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,2}^{(k)}$ for n=1, . . . , N for the second carrier are provided to a re-ordering function 28-2 for the second carrier that re-orders the frequency-domain X-update outputs $x_{n,2}^{(k)}$ for the second carrier to generate a new set of M vectors $a_{m,2}$ for the second carrier, each containing N frequency-domain samples. In other words, each of the N frequency-domain X-update outputs $x_{n,2}^{(k)}$ for the second carrier contains M samples that are distributed evenly across the M antenna branches via the re-ordering function 28-2. The re-ordered vectors $a_{m,2}$ for m=1, . . . , M (also referred to herein as re-ordered signals) are converted from the frequency-domain to the time-domain via respective IFFTs 30-(1,2) through 30-(M,2) to provide M time-domain signals for the M antenna branches, respectively, for the second carrier. While not illustrated, time-domain processing such as P/S conversion and CP insertion may be performed.

Interpolators 52-(1,2) through 52-(M,2) interpolate the M time-domain signals for the second carrier from the lower sampling rate used for the frequency-domain processing to the higher sampling. Again, in this example, the first and second carriers are 20 MHz carriers, and the IFFTs (for both the first carrier and the second carrier) are 2048 point carriers, where the lower sampling rate is 30.72 Msps and the higher sampling rate is 491.52 Msps. Note that these sampling rates are only examples. Other sampling rates may be used. Further, the interpolators 52-(1,2) through 52-(M,2) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,2) through 30-(M,2) and zero-padding the additional subcarriers.

The M interpolated time-domain signals for the second carrier are tuned to an appropriate frequency offset for the second carrier by, in this example, the corresponding NCOs 54-(1,2) through 54-(M,2). The NCOs 54-(1,2) through 54-(M,2) may be implemented using a LUT or CORDIC techniques, as will be appreciated by one of ordinary skill in the art. Note that there are no restrictions on the positions of the carriers (i.e., any desired carrier frequencies can be used). The M tuned time-domain signals for the second carrier are input to the M combiners 56-1 through 56-M, respectively.

Each combiner 56-m for m=1, . . . , M combines the tuned time-domain signal for the first carrier for the m-th antenna branch and the tuned time-domain signal for the second carrier for the m-th antenna branch to provide a multi-carrier time-domain signal for the m-th antenna branch. In this example, carrier combining is performed at the 491.52 Msps sampling rate. Note that, for each m-th antenna branch, the corresponding multi-carrier time-domain signal is referred to herein as $X_m(t)$, meaning that it still corresponds to the (frequency-domain) X-update output where the only difference is that it is now in the form of a multi-carrier time-domain signal.

The M multi-carrier time-domain signals $X_m(t)$ output by the combiners 56-1 through 56-M are provided to time-domain Z-update functions 58-1 through 58-M for the M antenna branches, respectively. The time-domain Z-update functions 58-1 through 58-M operate together with time-domain Y-update functions 60-1 through 60-M to perform a time-domain Z-update procedure as follows. For each m-th antenna branch (for m=1, . . . , M), the time-domain Z-update function 58-m and the time-domain Y-update function 60-$m$ operate together to perform the time-domain Z-update procedure for the m-th antenna branch in accordance with Equation 21.

$$\text{err}Y_m^{(k)}(t)=2\cdot X_m^{(k)}(t)-Z_m^{(k-1)}(t)$$

$$Z_m^{(k)}(t)=Z_m^{(k-1)}(t)+Y_m^{(k)}(t)-X_m^{(k)}(t) \quad \text{Equation 21:}$$
Time-Domain Z-Update where:
- err$Y_m^{(k)}(t)$ is an output of the time-domain Z-update function 58-$m$ for the m-th antenna branch for the k-th iteration of the CRAM algorithm that is provided to the time-domain Y-update function 60-$m$ for the m-th antenna branch for the k-th iteration of the CRAM algorithm;
- $X_m^{(k)}(t)$ is the multi-carrier time-domain signal for the m-th antenna branch for the k-th iteration of the CRAM algorithm that is input to the time-domain Z-update function 58-$m$;
- $Z_m^{(k-1)}(t)$ is the time-domain Z-update output generated by the time-domain Z-update function 58-$m$ for the m-th antenna branch for the (k–1)-th iteration of the CRAM algorithm;
- $Z_m^{(k)}(t)$ is the time-domain Z-update output generated by the time-domain Z-update function 58-$m$ for the m-th antenna branch for the k-th iteration of the CRAM algorithm; and
- $Y_m^{(k)}(t)$ is the time-domain Y-update output generated by the time-domain Y-update function 60-$m$ and provided to the time-domain Z-update function 58-$m$ for the m-th antenna branch for the k-th iteration of the CRAM algorithm.

The time-domain Y-update function 60-$m$ generates $Y_m^{(k)}(t)$ in accordance with Equation 22.

Y-Update $$Y_m(t) = \begin{cases} \frac{Th_{high}}{|errY_m|} \times errY_m, & \text{if } |errY_m| > Th_{high} \\ \frac{Th_{low}}{|errY_m|} \times errY_m, & \text{if } |errY_m| < Th_{low} \\ Th_{low}, & \text{if } |errY_m| = 0 \\ errY_m, & \text{otherwise} \end{cases} \quad \text{Equation 22}$$

where:
- $Th_{high}$ is an upper clipping threshold; and
- $Th_{low}$ is a lower clipping threshold.

Note that $Th_{high}$ and $Th_{low}$ are global clipping thresholds in the example of Equation 22. However, in some alternative embodiments, per-antenna time-domain clipping may be provided by utilizing separate clipping thresholds for the antenna branches.

In the reverse direction, the M time-domain Z-update outputs of the M time-domain Z-update functions 58-1 through 58-$m$ are tuned back to baseband by respective NCOs 62-(1,1) through 62-(M,1) for the first carrier and NCOs 62-(1,2) through 62-(M,2) for the second carrier and then decimated back to the lower sampling rate by respective decimators 64-(1,1) through 64-(M,1) for the first carrier and decimators 64-(1,2) through 64-(M,2) for the second carrier, thereby providing M time-domain Z-update outputs for the first carrier and M time-domain Z-update outputs for the second carrier. The M time-domain Z-update outputs for the first carrier are converted to the frequency-domain by respective FFTs 66-(1,1) through 66-(M,1) to thereby provide M frequency-domain Z-update outputs. A re-ordering function 68-1 performs a reverse re-ordering of the M frequency-domain Z-update outputs for the first carrier to provide the N frequency-domain Z-update outputs that are input to the X-update functions 26-(1,1) through 26-(N,1) for the first carrier. Likewise, the M time-domain Z-update outputs for the second carrier are converted to the frequency-domain by respective FFTs 66-(1,2) through 66-(M,2) to thereby provide M frequency-domain Z-update outputs. A re-ordering function 68-2 performs a reverse re-ordering of the M frequency-domain Z-update outputs for the second carrier to provide the N frequency-domain Z-update outputs that are input to the X-update functions 26-(1,2) through 26-(N,2) for the second carrier.

Figure 11:
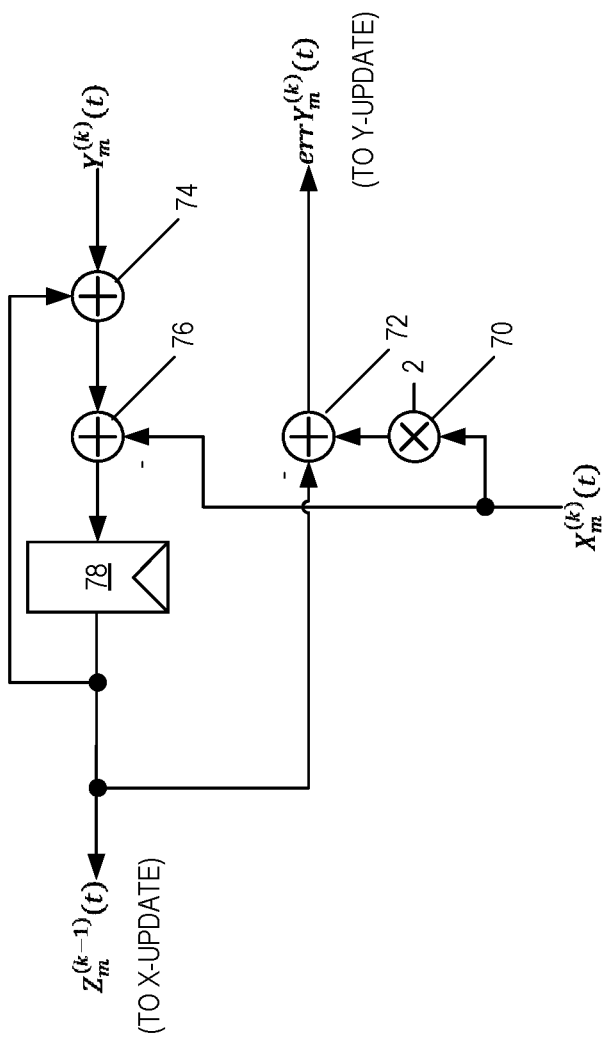
FIG. 11 illustrates one example implementation of the time-domain Z-update procedure for multi-carrier CRAM.

FIG. 11 illustrates one implementation of the time-domain Z-update procedure of Equation 21. In other words, FIG. 11 illustrates one example implementation of the m-th time-domain Z-update function 58-$m$. As illustrated, the time-domain Z-update function 58-$m$ includes a multiplication node 70, a number of summation nodes 72-76, and a Flip/Flop (F/F) 78, connected as shown. The multiplication node 70 multiplies $X_m^{(k)}(t)$ by 2 and subtracts $Z_m^{(k-1)}(t)$ (stored at the output of the F/F 78) from the result of the multiplication to thereby generate err$Y_m^{(k)}(t)$. $Y_m^{(k)}(t)$ is received from the time-domain Y-update function 60-$m$ and summed together with $Z_m^{(k-1)}(t)$ at the summation node 74. The summation node 76 subtracts $X_m^{(k)}(t)$ from the output of the summation node 74 to thereby provide $Z_m^{(k)}(t)$.

Note that, for the multi-carrier embodiment of FIGS. 10A and 10B, one should ensure that the roundtrip delay from the X-update back to the X-update corresponds to an integer number of samples at the baseband sampling rate of 30.72 Msps for 20 MHz LTE signals in the example of FIGS. 10A and 10B. Therefore, special attention should be paid to the overall group delay when designing the interpolation and the decimation filter chains shown in FIGS. 10A and 10B.

Table 2 shows the peak reduction and PAPR reduction achieved by an embodiment of the present disclosure for the four-carrier scenario.

TABLE 2

Performance of Multi-carrier CRAM for 20 channel instances, 20 symbols per channel instance and 5 CRAM iterations

| | PAPR target: 4 dB | | | |
| | Donut level: 0.8 | | | |
| Carrier configuration | 99.9% RMS Penalty [dB] | 99.9% PAPR Level [dB] | 99.9% Peak Reduction [dB] | 99.9% PAZF Level [dB] |
| --- | --- | --- | --- | --- |
| B0: 4 × 20 MHz contiguous B1: 4 × 20 MHz contiguous | 2.5 | 3.3 | 4.1 | 5.8 |

These results demonstrate that the multi-carrier extension to CRAM provided by an embodiment of the present disclosure may be used successfully to handle multi-carrier systems in a flexible manner with no compromise in PAPR reduction capability.

CRAM Extension for Multi-Band Operation

Some embodiments of the present disclosure utilize a CRAM algorithm that extends CRAM to support multi-band systems, with each band including one or more carriers, through the following modifications:

- A bank of separate baseband frequency-domain CRAM X-Update blocks are adopted for each carrier in the multi-band system. These updates operate at, e.g., the conventional sampling rate.
- Tuning blocks and interpolation blocks are incorporated in a manner identical to the CRAM extension for multi-carrier operation. Separate tuning and interpolation branches and their associated tuning and decimation branches are provided for each carrier in the multi-band system.
- Separate time-domain Z-Update block (from the multi-carrier CRAM extension) are included for each band supported in its multi-band embodiment.
- The Y-Update of the multi-carrier CRAM extension is modified to use multi-band peak detection to enable multi-band clipping of the signal based on its per-band constituent components. This multi-band Y-Update produces a clipped version of each per-band signal which drives the CRAM iterations performed in parallel for each carrier in each band.

Figure 12:
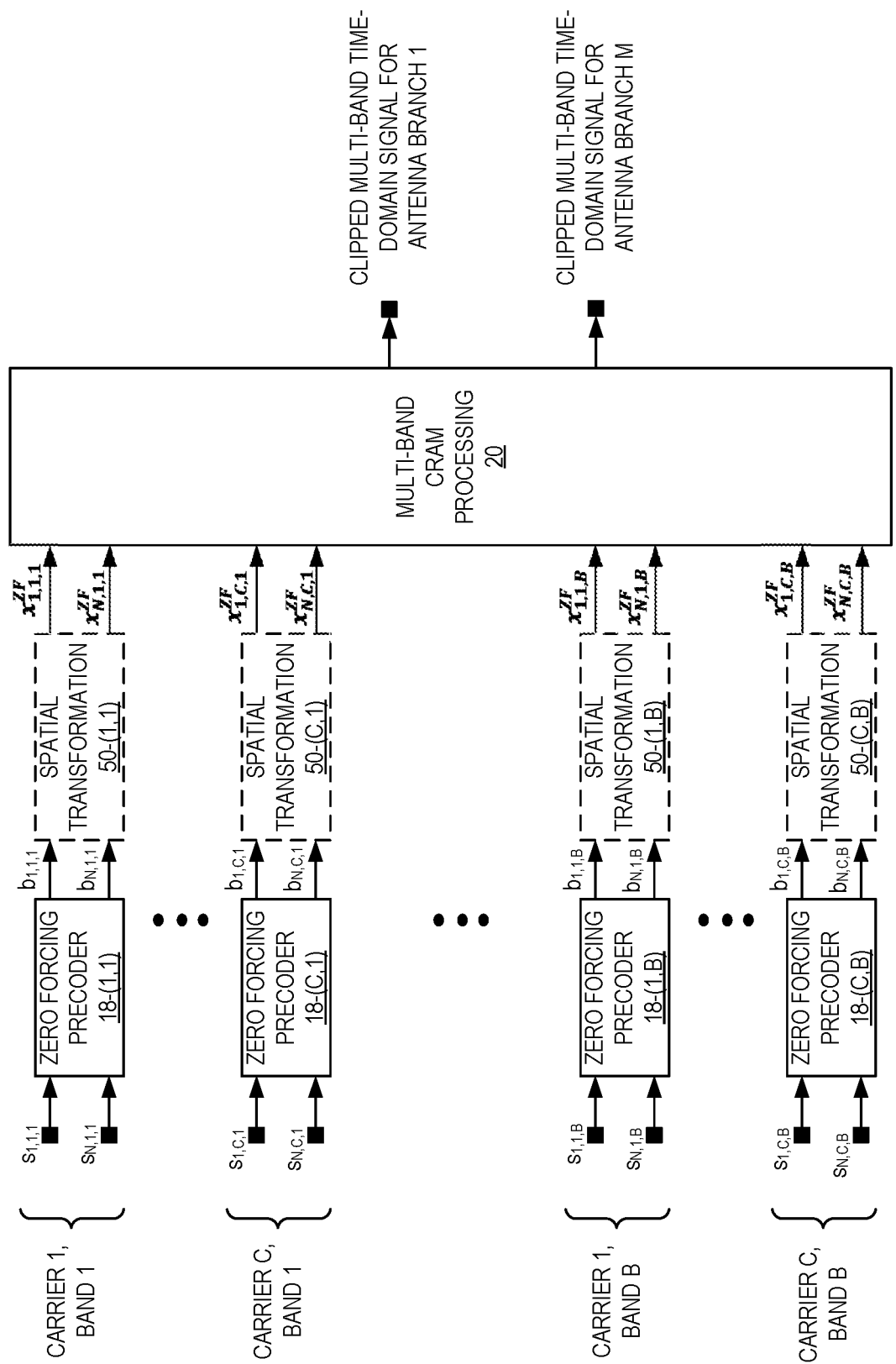
FIG. 12 illustrates the precoders, optional spatial transformation functions, and the (multi-band) CRAM processing system in accordance with some embodiments of the present disclosure in which the CRAM algorithm implemented by the CRAM processing system supports multi-band operation.

In this regard, FIG. 12 illustrates the precoders $18\text{-}(1,1)$ through $18\text{-}(C,B)$, optional spatial transformation functions $50\text{-}(1,1)$ through $50\text{-}(C,B)$, and the (multi-band) CRAM processing system 20 in accordance with some embodiments of the present disclosure in which the CRAM algorithm implemented by the CRAM processing system 20 supports multi-band operation. Here, B is the number of frequency bands, and C is the number of carriers for a particular frequency band. Note that B is greater than or equal to 2. Also, the value of C may vary among bands. For example, one frequency band may include one carrier in which case, for that frequency band, C=1. In contrast, another frequency band may include two carriers in which case, for that frequency band, C=2. As illustrated, in this example, the precoders $18\text{-}(1,1)$ through $18\text{-}(C,B)$ are ZF precoders, which for consistency are referred to as ZF precoders $18\text{-}(1,1)$ through $18\text{-}(C,B)$.

The ZF precoder $18\text{-}(c,b)$ for $c=1, \ldots, C$ and $b=1, \ldots, B$ receives a number (N) of frequency-domain input signals $s_{n,c,b} \in \mathbb{C}^{K \times 1}, \ldots, N$ for the c-th carrier in the b-th frequency band. The frequency-domain input signals $s_{n,c,b}$ are also referred to herein a layer-domain input vectors for the c-th carrier in the b-th frequency band. The number K is the number of layers in the layer-domain for the c-th carrier in the b-th frequency band, and N is the number of tones (i.e., OFDM tones or subcarriers) for the c-th carrier in the b-th frequency band. Note that since the bandwidth and thus the number of tones for each carrier may vary, the N may also vary from one carrier to another. The ZF precoder $18\text{-}(c,b)$ is a linear precoder that performs digital beamforming individually on each frequency-domain input signal $s_{n,c,b}$ using a respective ZF precoding matrix $P_{n,c,b}^{ZF}$ to produce a respective frequency-domain precoded signal $x_{n,c,b}^{ZF} \in \mathbb{C}^{M \times 1}$ for the c-th carrier in the b-th frequency band. The ZF precoder $18\text{-}(c,b)$ operates on a total of $|\mathcal{T}|$ tones for the c-th carrier in the b-th frequency band and the remaining $|\mathcal{T}^C|$ tones for the c-th carrier in the b-th frequency band are unused and set to zero, where $|\mathcal{T}|+|\mathcal{T}^C|=N$. The precoder matrix $P_{n,c,b}^{ZF}$ is set to the "right pseudo-inverse" $H_{n,c}^\dagger$ of the MIMO channel matrix $H_{n,c,b}$ for the c-th carrier in the b-th frequency band as shown in Equation 23. The ZF precoder $18\text{-}(c,b)$ enforces the spatial constraints given in Equation 24 for the c-th carrier in the b-th frequency band such that tone $x_{n,c}^{ZF}=P_{n,c,b}^{ZF}s_{n,c,b}$ is received at the UE as $H_{n,c,b}x_{n,c,b}^{ZF}=H_{n,c,b}P_{n,c,b}^{ZF}s_{n,c,b}=H_{n,c,b}H_{n,c,b}^\dagger s_{n,c,b}=s_{n,c,b}$, and so this ZF precoding scheme removes all multiple access interference between layers in the ideal case.

$$P_{n,c,b}^{ZF}=H_{n,c,b}^\dagger=H_{n,c,b}^H(H_{n,c,b}H_{n,c,b}^H)^{-1}$$

Equation 23: ZF Precoding Solution $$s_{n,c,b}=H_{n,c,b}x_{n,c,b}^{ZF}, n \in \mathcal{T}$$

$$s_{n,c,b}=0^{K \times 1}, n \in \mathcal{T}^C$$

Equation 24: ZF spatial constraints for a given tone index n.

Each of the N precoded vectors $x_{n,c,b}^{ZF}$ for the c-th carrier in the b-th frequency band contains M samples to be distributed evenly across the M antenna branches after performing respective CRAM X-updates, as described below. The frequency-domain precoded vectors $x_{n,c,b}^{ZF}$ for $n=1, \ldots, N$ for the c-th carrier in the b-th frequency band (also referred to herein as frequency-domain precoded signals $x_{n,c,b}^{ZF}$ for $n=1, \ldots, N$ for the c-th carrier in the b-th frequency band) are provided to the CRAM processing system 20.

Alternatively, if port reduction is used, the ZF precoder $18\text{-}(c,b)$ for $c=1, \ldots, C$ and $b=1, \ldots, B$ receives the N frequency-domain input signals $s_{n,c,b}$ for the c-th carrier in the b-th frequency band and performs digital beamforming individually on each frequency-domain input signal $s_{n,c}$ using a respective port-reduced ZF precoding matrix $P_{n,c,b}^{ZFB}$ to produce N port reduced frequency-domain precoded signals $b_{n,c,b} \in \mathbb{C}^{N_B \times 1}$ for $n=1, \ldots, N$ for the c-th carrier in the b-th frequency band. A spatial transformation function $50\text{-}(c,b)$ applies a $M \times N_B$ spatial transformation matrix $\varphi \in \mathbb{C}^{M \times N_B}$ to each of the N port-reduced frequency-domain precoded signals $b_{n,c,b}$ for the c-th carrier in the b-th frequency band to provide the N frequency-domain precoded signals $x_{n,c,b}^{ZF} \in \mathbb{C}^{M \times 1}$ for the c-th carrier in the b-th frequency band.

The CRAM processing system 20 performs a multi-band CRAM algorithm to generate M multi-band time-domain transmit signals for the M antenna branches, respectively. FIGS. 13A through 13D illustrate one example of the multi-band CRAM processing system 20 of FIG. 12 that implements a multi-band CRAM algorithm. For clarity and ease of discussion, there are two carriers in each of two frequency bands in the example of FIGS. 13A through 13D. However, the architecture in FIGS. 13A through 13D can be extended to any number of two or more frequency bands and any number of carriers within each frequency band.

The CRAM processing system 20 of FIGS. 13A through 13D operates to perform a multi-carrier CRAM algorithm as follows. Looking first at the first carrier (Carrier #1) in the first frequency band (Band #1), a number of X-update functions $26\text{-}(1,1,1)$ through $26\text{-}(N,1,1)$ operate to perform frequency-domain X-update procedures for the N tones for $n=1, \ldots, N$ for the first carrier in the first frequency band, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,1,1}^{(k)}$ for n=1, . . . , N for the first carrier in the first frequency band are provided to a re-ordering function 28-(1,1) for the first carrier in the first frequency band that re-orders the frequency-domain X-update outputs $x_{n,1,1}^{(k)}$ for the first carrier in the first frequency band to generate a new set of M vectors $a_{m,1,1}$ for the first carrier in the first frequency band, each containing N frequency-domain samples. In other words, each of the N frequency-domain X-update outputs $x_{n,1,1}^{(k)}$ for the first carrier in the first frequency band contains M samples that are distributed evenly across the M antenna branches via the re-ordering function 28-(1,1). The re-ordered vectors $a_{m,1,1}$ for m=1, . . . , M (also referred to herein as re-ordered signals) are converted from the frequency-domain to the time-domain via respective IFFTs 30-(1,1,1) through 30-(M,1,1) to provide M time-domain signals for the M antenna branches, respectively, for the first carrier in the first frequency band. While not illustrated, time-domain processing such as P/S conversion and CP insertion may be performed.

Interpolators 52-(1,1,1) through 52-(M,1,1) interpolate the M time-domain signals for the first carrier in the first frequency band from a lower sampling rate used for the frequency-domain processing to a higher sampling rate. In this example, the first and second carriers in the first and second frequency bands are all 20 MHz carriers, and the IFFTs (for both the first carrier and the second carrier in both the first and second frequency bands) are 2048 point carriers, where the lower sampling rate is 30.72 Msps and the higher sampling rate is 491.52 Msps. Note that these sampling rates are only examples. Other sampling rates may be used. Further, the interpolators 52-(1,1,1) through 52-(M,1,1) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,1,1) through 30-(M,1,1) and zero-padding the additional subcarriers.

The M interpolated time-domain signals for the first carrier in the first frequency band are tuned to an appropriate frequency offset for the first carrier in the first frequency band by, in this example, corresponding NCOs 54-(1,1,1) through 54-(M,1,1). The NCOs 54-(1,1,1) through 54-(M,1,1) may be implemented using a LUT or CORDIC techniques, as will be appreciated by one of ordinary skill in the art. Note that there are no restrictions on the positions of the carriers (i.e., any desired carrier frequencies can be used). The M tuned time-domain signals for the first carrier in the first frequency band are input to M combiners 56-(1,1) through 56-(M,1), respectively. See FIG. 13C and FIG. 13D which illustrate the combiners 56-(1,1) and 56-(M,1) respectively. Note that FIGS. 13C and 13D illustrate the architecture for only antenna branches 1 and M. However, the details of FIGS. 13C and 13D are included for all M antenna branches.

Turning to the second carrier (i.e., Carrier #2) in the first frequency band, a number of X-update functions 26-(1,2,1) through 26-(N,2,1) operate to perform frequency-domain X-update procedures for the N tones for n=1, . . . , N for the second carrier in the first frequency band, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,2,1}^{(k)}$ for n=1, . . . , N for the second carrier in the first frequency band are provided to a re-ordering function 28-(2,1) for the second carrier in the first frequency band that re-orders the frequency-domain X-update outputs $x_{n,2,1}^{(k)}$ for the second carrier in the first frequency band to generate a new set of M vectors $a_{m,2,1}$ for the second carrier in the first frequency band, each containing N frequency-domain samples. In other words, each of the N frequency-domain X-update outputs $x_{n,2,1}^{(k)}$ for the second carrier in the first frequency band contains M samples that are distributed evenly across the M antenna branches via the re-ordering function 28-(2-1). The re-ordered vectors $a_{m,2,1}$ for m=1, . . . , M (also referred to herein as re-ordered signals) are converted from the frequency-domain to the time-domain via respective IFFTs 30-(1,2,1) through 30-(M,2,1) to provide M time-domain signals for the M antenna branches, respectively, for the second carrier in the first frequency band. While not illustrated, time-domain processing such as P/S conversion and CP insertion may be performed.

Interpolators 52-(1,2,1) through 52-(M,2,1) interpolate the M time-domain signals for the second carrier in the first frequency band from the lower sampling rate used for the frequency-domain processing to the higher sampling. Again, in this example, the first and second carriers are 20 MHz carriers, and the IFFTs (for both the first carrier and the second carrier) are 2048 point carriers, where the lower sampling rate is 30.72 Msps and the higher sampling rate is 491.52 Msps. Note that these sampling rates are only examples. Other sampling rates may be used. Further, the interpolators 52-(1,2,1) through 52-(M,2,1) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,2,1) through 30-(M,2,1) and zero-padding the additional subcarriers.

The M interpolated time-domain signals for the second carrier in the first frequency band are tuned to an appropriate frequency offset for the second carrier by, in this example, corresponding NCOs 54-(1,2,1) through 54-(M,2,1). The NCOs 54-(1,2,1) through 54-(M,2,1) may be implemented using a LUT or CORDIC techniques, as will be appreciated by one of ordinary skill in the art. Note that there are no restrictions on the positions of the carriers (i.e., any desired carrier frequencies can be used). The M tuned time-domain signals for the second carrier are input to the M combiners 56-(1,1) through 56-(M,1) for the M antenna branches for the first frequency band, respectively.

Figure 13A:
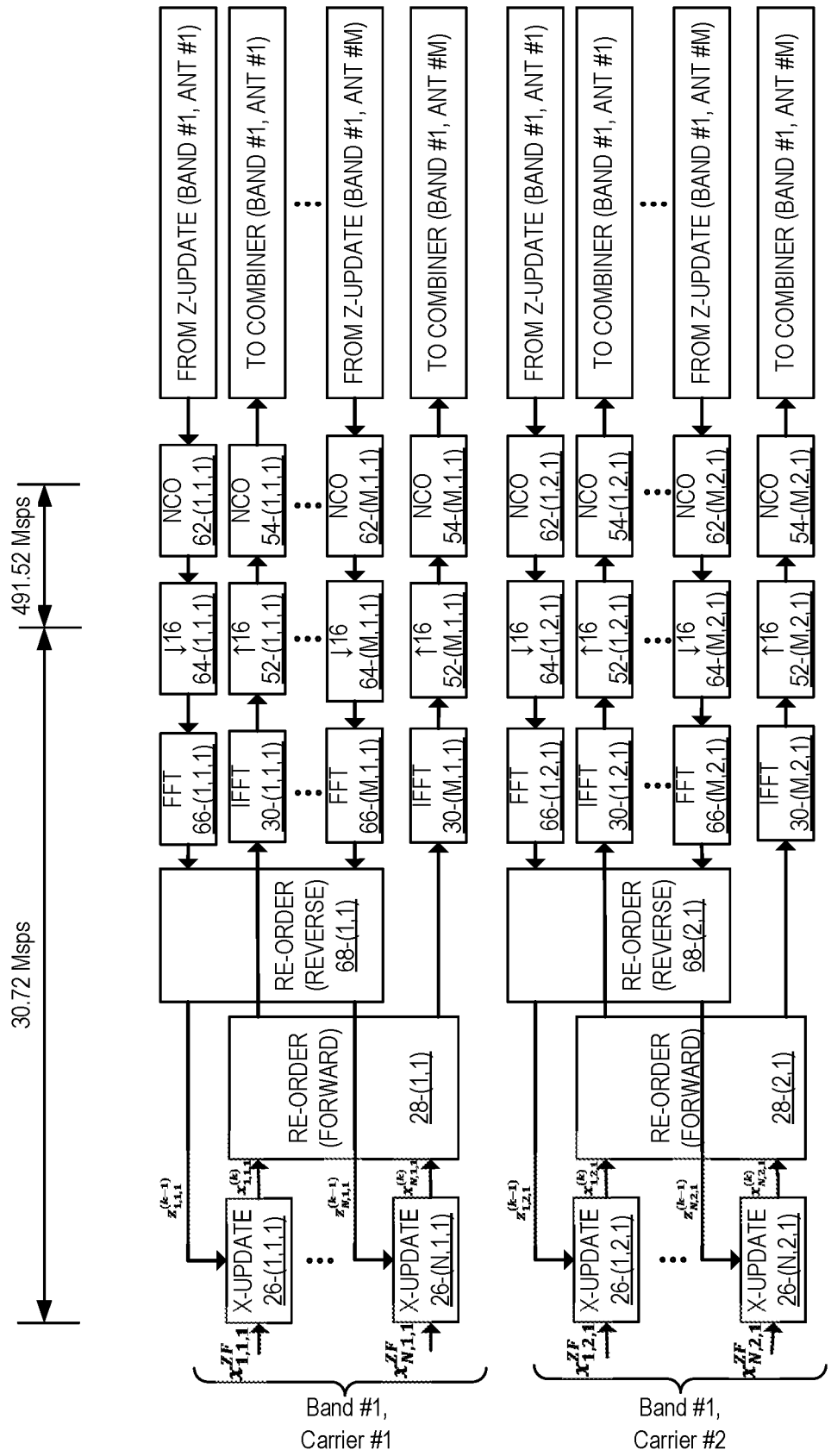
FIGS. 13A through 13D illustrate one example of the multi-band CRAM processing system of FIG. 12 that implements a multi-band CRAM algorithm.
Figure 13B:
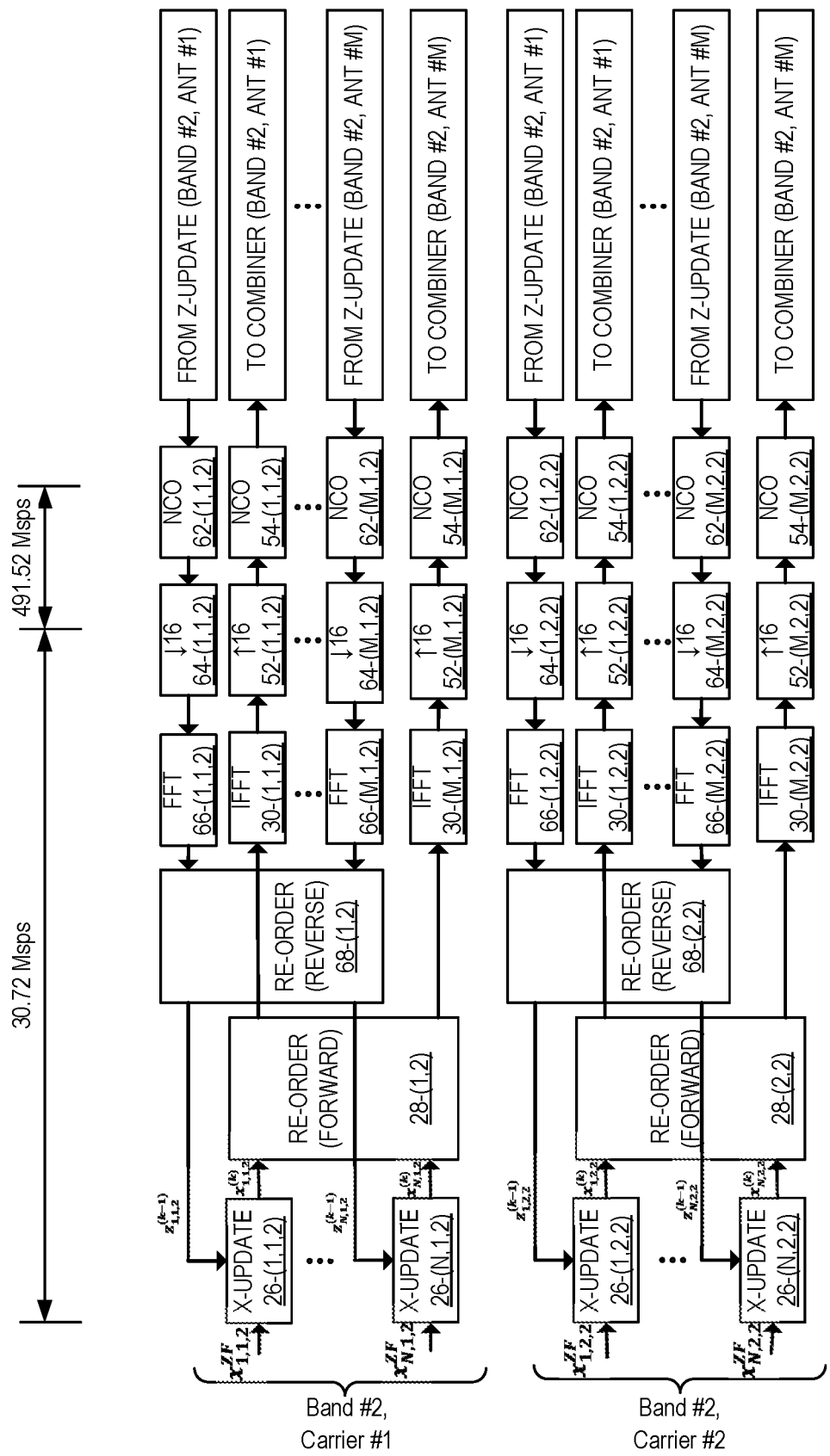
Figure 13C:
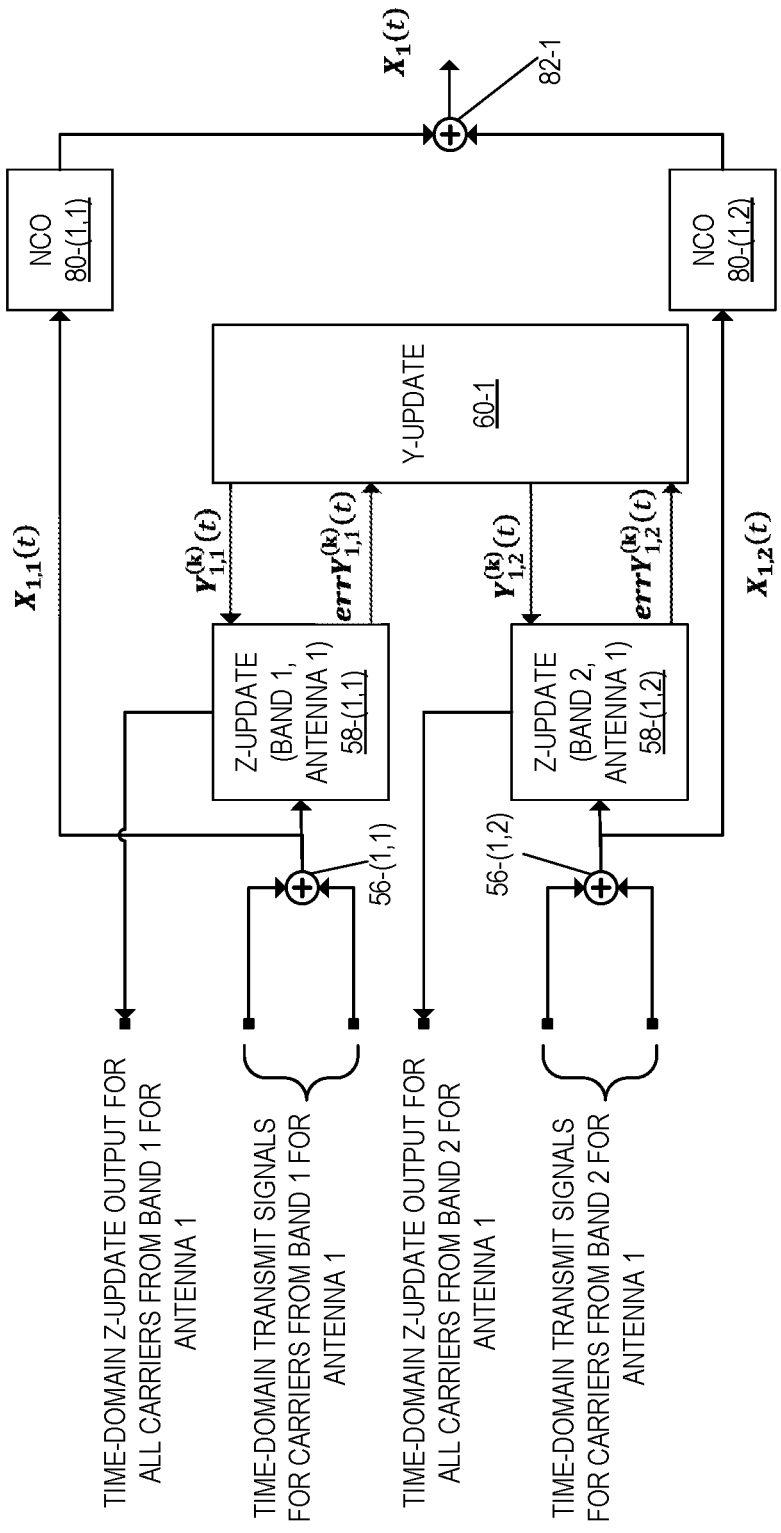
Figure 13D:
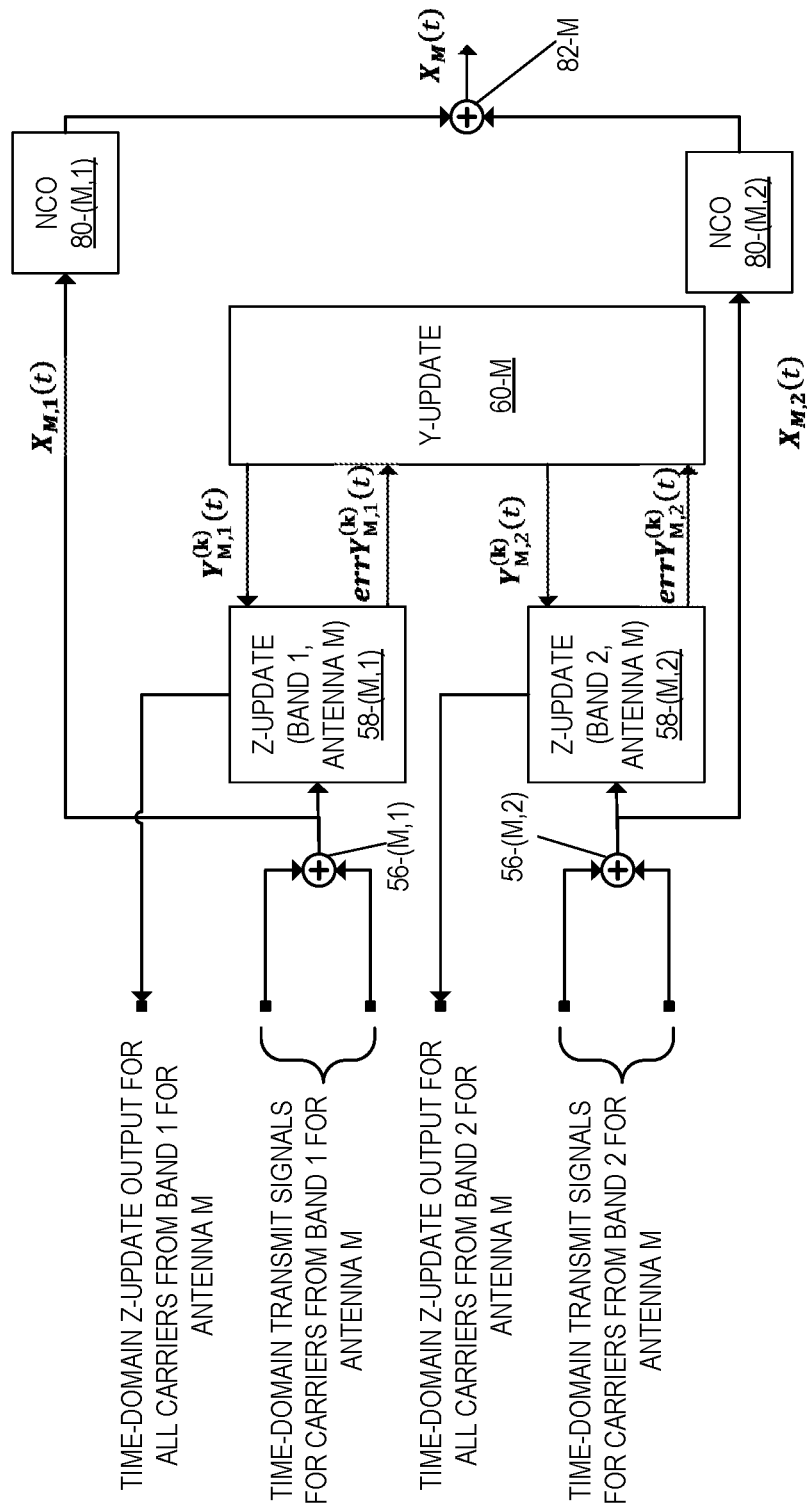

As illustrated in FIG. 13B, processing for the first and second carriers in the second frequency band is performed in the same manner as described above for the first carrier except that the M tuned time-domain signals for the first carrier in the second frequency band are input to M combiners 56-(1,2) through 56-(M,2) for the M antenna branches for the second frequency band, respectively. Likewise, the M tuned time-domain signals for the second carrier in the second frequency band are input to the M combiners 56-(1,2) through 56-(M,2) for the M antenna branches for the second frequency band, respectively.

Each combiner 56-(m,1) for m=1, . . . , M for the first frequency band combines the tuned time-domain signals for the first and second carriers in the first frequency band for the m-th antenna branch to thereby provide a multi-carrier transmit signal for the first band for the m-th antenna branch. Likewise, each combiner 56-(*m*,2) for m=1, ..., M for the second frequency band combines the tuned time-domain signals for the first and second carriers in the second frequency band for the m-th antenna branch to thereby provide a multi-carrier transmit signal for the second band for the m-th antenna branch. In this example, carrier combining is performed at the 491.52 Msps sampling rate. Note that, for each m-th antenna branch, the corresponding multi-carrier time-domain signal for the first band is referred to herein as $X_{m,1}(t)$, meaning that it still corresponds to the (frequency-domain) X-update output for the first band where the only difference is that it is now in the form of a multi-carrier time-domain signal. Likewise, for each m-th antenna branch, the corresponding multi-carrier time-domain signal for the second band is referred to herein as $X_{m,2}(t)$, meaning that it still corresponds to the (frequency-domain) X-update output for the second band where the only difference is that it is now in the form of a multi-carrier time-domain signal.

The M multi-carrier time-domain signals $X_{m,1}(t)$ for the first frequency band output by the combiners 56-(1,1) through 56-(M,1) are provided to time-domain Z-update functions 58-(1,1) through 58-(M,1) for the first frequency band for the M antenna branches, respectively. Likewise, the M multi-carrier time-domain signals $X_{m,2}(t)$ for the second frequency band output by the combiners 56-(1,2) through 56-(M,2) are provided to time-domain Z-update functions 58-(1,2) through 58-(M,2) for the second frequency band for the M antenna branches, respectively. The time-domain Z-update functions 58-(1,1) through 58-(M,1) for the first frequency band and the time-domain Z-update functions 58-(1,2) through 58-(M,2) for the second frequency band operate together with time-domain Y-update functions 60-1 through 60-M to perform a time-domain Z-update procedure as follows. For each m-th antenna branch (for m=1, ..., M), the time-domain Z-update functions 58-(*m*,1) and 58-2(*m*,2) and the time-domain Y-update function 60-*m* operate together to perform the time-domain Z-update procedure for the m-th antenna branch in accordance with Equation 25.

$$\text{err}Y_{m,b}^{(k)}(t) = 2 \cdot X_{m,b}^{(k)}(t) - Z_{m,b}^{(k-1)}(t)$$

$$Z_{m,b}^{(k)}(t) = Z_{m,b}^{(k-1)}(t) + Y_{m,b}^{(k)}(t) - X_{m,b}^{(k)}(t)$$

Equation 25: Time-Domain Z-Update where:
  $\text{err}Y_{m,b}^{(k)}(t)$ is an output of the time-domain Z-update function 58-(*m*,*b*) for the m-th antenna branch for the b-th frequency band for the k-th iteration of the CRAM algorithm that is provided to the time-domain Y-update function 60-*m* for the m-th antenna branch for the b-th frequency band for the k-th iteration of the CRAM algorithm;
  $X_{m,b}^{(k)}(t)$ is the multi-carrier time-domain signal for the m-th antenna branch for the b-th frequency band for the k-th iteration of the CRAM algorithm that is input to the time-domain Z-update function 58-*m*;
  $Z_{m,b}^{(k-1)}(t)$ is the time-domain Z-update output generated by the time-domain Z-update function 58-*m* for the m-th antenna branch for the b-th frequency band for the (k−1)-th iteration of the CRAM algorithm;
  $Z_{m,b}^{(k)}(t)$ is the time-domain Z-update output generated by the time-domain Z-update function 58-*m* for the m-th antenna branch for the b-th frequency band for the k-th iteration of the CRAM algorithm; and
  $Y_{m,b}^{(k)}(t)$ is the time-domain Y-update output generated by the time-domain Y-update function 60-*m* and provided to the time-domain Z-update function 58-(*m*,*b*) for the m-th antenna branch for the b-th frequency band for the k-th iteration of the CRAM algorithm.

The time-domain Y-update function 60-*m* generates $Y_{m,b}^{(k)}(t)$ in accordance with Equation 26.

Y-Update $$Y_{m,b}(t) = \begin{cases} \dfrac{Th_{high}}{PE} \times \text{err}Y_{m,b}, & \text{if } PE > Th_{high} \\ \dfrac{Th_{low}}{PE} \times \text{err}Y_{m,b}, & \text{if } PE < Th_{low} \\ \dfrac{Th_{low}}{B}, & \text{if } PE = 0 \\ \text{err}Y_{m,b}, & \text{otherwise} \end{cases}$$

Equation 26 where:
  $Th_{high}$ is an upper clipping threshold;
  $Th_{low}$ is a lower clipping threshold; and $$PE = \sum_{b=1}^{B} |\text{err}Y_{m,b}|$$

Note that $Th_{high}$ and $Th_{low}$ are global clipping thresholds in the example of Equation 26. However, in some alternative embodiments, per-antenna time-domain clipping may be provided by utilizing separate clipping thresholds for the antenna branches.

For multi-band clipping, peak estimation is implemented by summing the absolute values of the multi-carrier signal $\text{err}Y_{m,b}$ signal for each band as shown in Equation 26. One particularity of Equation 26 is that it clips each of the bands proportionally to their contribution to the peak, i.e., clipping more heavily the band that has the largest amplitude.

For each m-th antenna branch, the multi-carrier time-domain signals for the first and second frequency band are frequency-translated to an appropriate frequency offset relative to one another by respective NCOs 80-(*m*,1) and 80-(*m*-2) such that, after combined by combiner 82-*m* and upconverted to RF, each of the resulting multi-carrier time-domain transmit signals are in the appropriate frequency band. This results in a multi-band time-domain transmit signal for each m-th antenna branch.

In the reverse direction, for each b-th frequency bands for b=1, ..., B, the M time-domain Z-update outputs of the M time-domain Z-update functions 58-(1,*b*) through 58-(*m*,*b*) are tuned back to baseband by respective NCOs 62-(1,1,*b*) through 62-(M,1,*b*) for the first carrier and NCOs 62-(1,2,*b*) through 62-(M,2,*b*) for the second carrier and then decimated back to the lower sampling rate by respective decimators 64-(1,1,*b*) through 64-(M,1,*b*) for the first carrier and decimators 64-(1,2,*b*) through 64-(M,2,*b*) for the second carrier, thereby providing M time-domain Z-update outputs for the first carrier and M time-domain Z-update outputs for the second carrier, for the b-th frequency band. The M time-domain Z-update outputs for the first carrier are converted to the frequency-domain by respective FFTs 66-(1, 1,*b*) through 66-(M,1,*b*) to thereby provide M frequency-domain Z-update outputs for the first carrier in the b-th frequency band. A re-ordering function 68-(1,*b*) performs a reverse re-ordering of the M frequency-domain Z-update outputs for the first carrier in the b-th frequency band to provide the N frequency-domain Z-update outputs that are input to the X-update functions 26-(1,1,*b*) through 26-(N,1,*b*) for the first carrier in the b-th frequency band. Likewise, the M time-domain Z-update outputs for the second carrier in the b-th frequency band are converted to the frequency-domain by respective FFTs 66-(1,2,*b*) through 66-(M,2,*b*) to thereby provide M frequency-domain Z-update outputs for the b-th frequency band. A re-ordering function 68-(2,*b*) performs a reverse re-ordering of the M frequency-domain Z-update outputs for the second carrier in the b-th frequency band to provide the N frequency-domain Z-update outputs that are input to the X-update functions 26-(1,2,*b*) through 26-(N,2,*b*) for the second carrier in the b-th frequency band.

Figure 14:
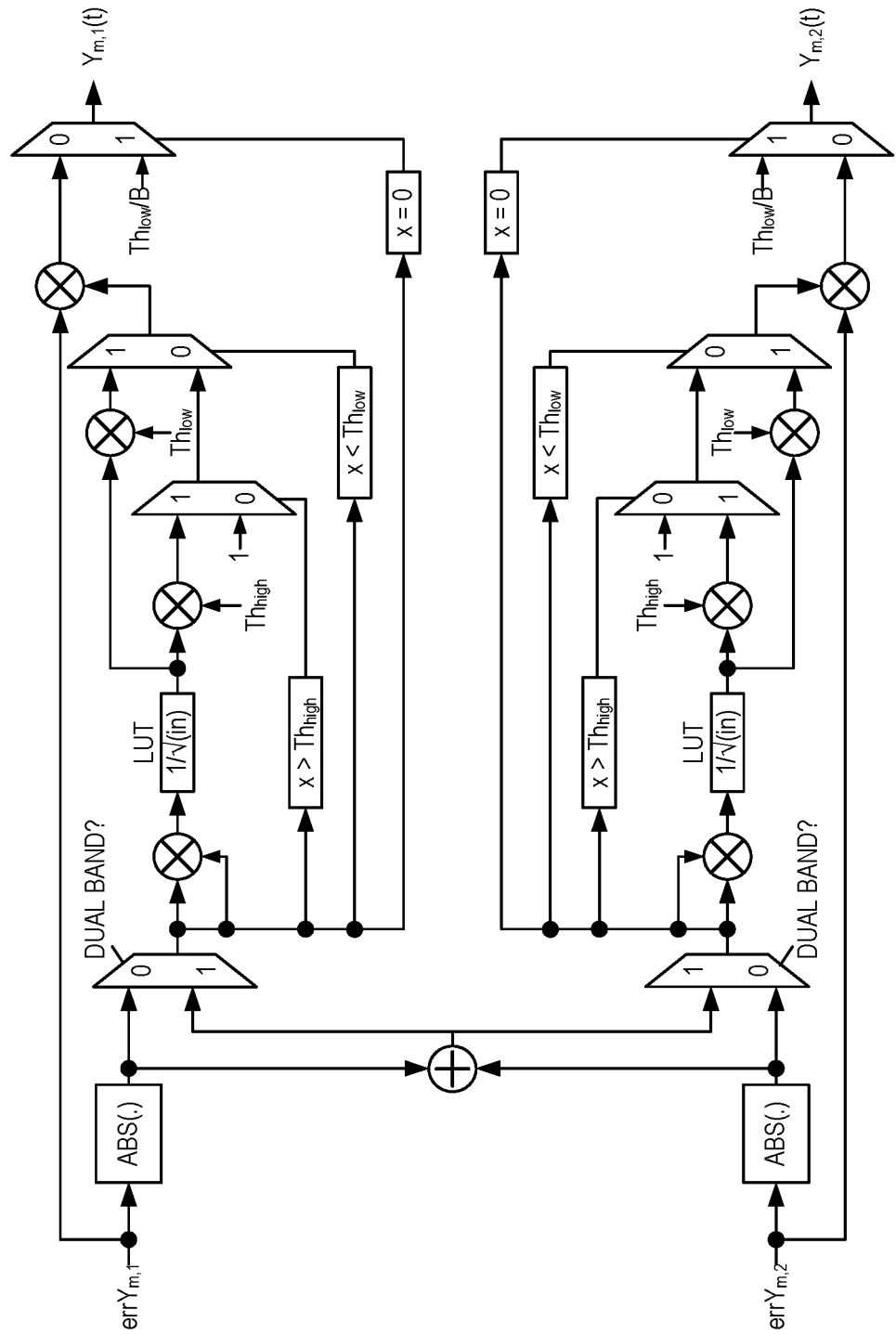
FIG. 14 illustrates one example hardware implementation of the m-th Y-update function of FIGS. 13C and 13D.

FIG. 14 illustrates one example hardware implementation of the m-th time-domain Y-update function 60-*m*.

TABLE 3

Performance of Multi-band CRAM for 20 channel instances, 20 OFDM symbols per channel instance and 5 CRAM iterations PAPR target: 4 dB
Donut level: 0.8

| Carrier configuration | 99.9% RMS Penalty [dB] | 99.9% PAPR Level [dB] | 99.9% Peak Reduction [dB] | 99.9% PAZF Level [dB] |
|---|---|---|---|---|
| B0: 4 × 20 MHz contiguous<br>B1: 4 × 20 MHz contiguous | 1.0 | 4.3 | 4.5 | 5.2 |

These results in Table 3 demonstrate that the multi-band extension to CRAM may be used successfully to handle multi-band systems in a flexible manner with no compromise in PAPR reduction capability.

CRAM Extension for Incomplete Channel Knowledge

Figure 15:
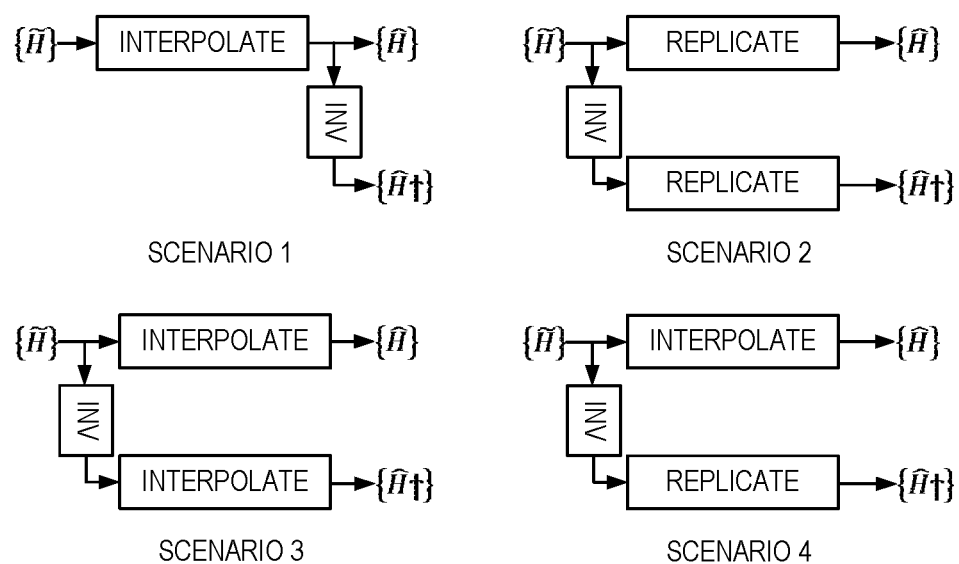
FIG. 15 illustrates four inversion and interpolation schemes for obtaining full Multiple Input Multiple Output (MIMO) channel knowledge from incomplete MIMO channel information.

To obtain a channel estimate $\hat{H}$ and its pseudo-inverse $\hat{H}^\dagger$ for every tone as required by the CRAM X-update, in some embodiments, any one of the four inversion and interpolation schemes shown in FIG. 15 may be used, each having different performance and computational complexity profiles. The schemes are as follows:

Scheme 1—The channel estimates are interpolated first, and then a pseudo-inverse is computed for each interpolated channel matrix.

Scheme 2—The pseudo-inverse of the channel estimate is first computed, and then both the channel estimate and its pseudo-inverse are replicated (no interpolation—instead use the same measurement for all nearby tones).

Scheme 3—The pseudo-inverse of the channel estimate is first computed, and then both the channel estimate and its pseudo-inverse are interpolated.

Scheme 4—The pseudo-inverse of the channel estimate is first computed, and then the channel estimate is interpolated but its pseudo-inverse is replicated.

In addition or alternatively, projection matrices used for the CRAM procedure may be interpolated and/or replicated and/or extrapolated from known MIMO channel information.

Simulations demonstrate the effectiveness of the four inversion and interpolation schemes of FIG. 15. The following simulation results use the following configurations:

The simulations use the 3GPP EVA channel model, 2 layers, 64 antennas, 0.5 spatial correlation, cross polarized.

Ideal channel H is generated for every tone.

The channels are sampled with a specified PRB granularity of X tones.

−5 dB noise is added to the sampled channel responses $\tilde{H}$.

$\hat{H}$ and $\hat{H}^\dagger$ are estimated as specified per each scenario.

Figure 16:
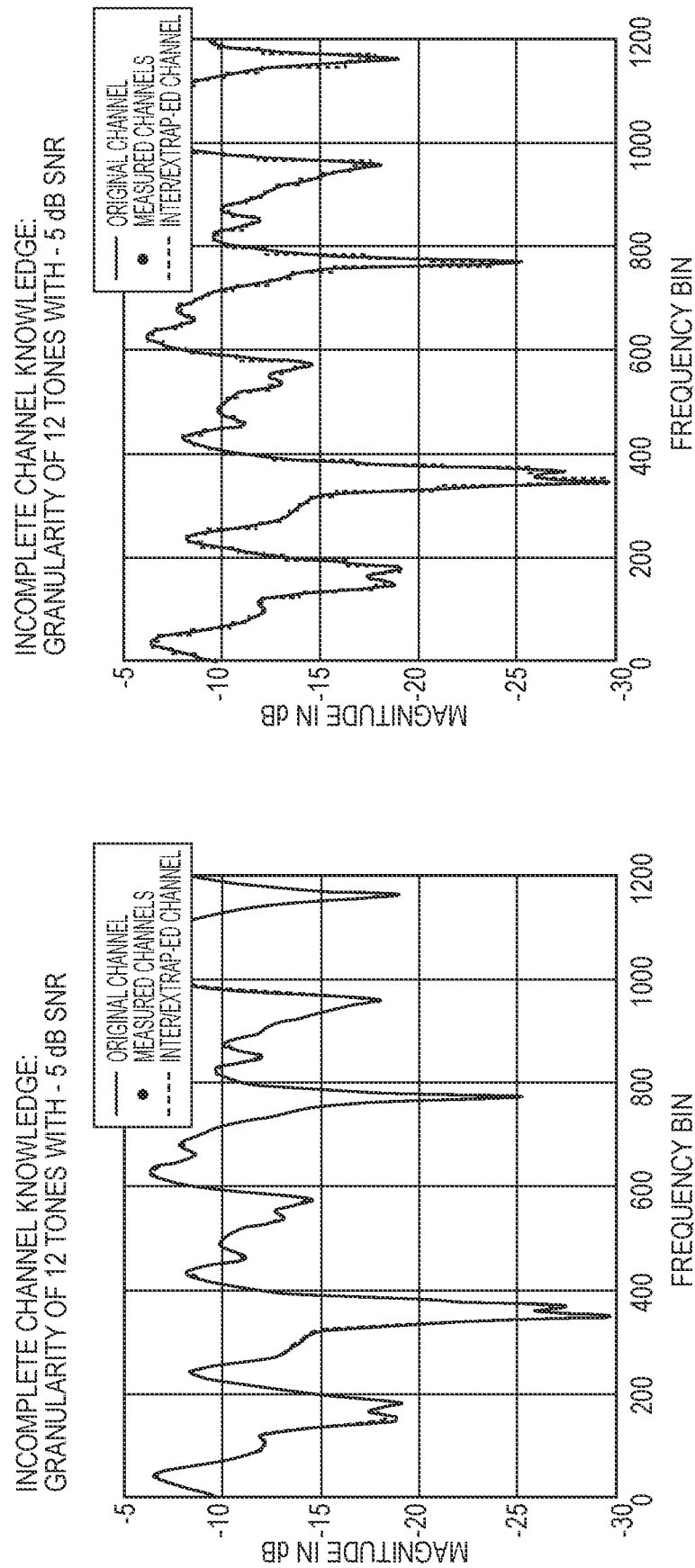
FIG. 16 illustrates simulation results for an Extended Vehicular A (EVA) channel and its interpolated approximation and replicated approximation for a 12-tone granularity.

FIG. 16 shows the 3GPP EVA channel model and its interpolated approximation (left) and its replicated approximation (right) for a granularity of 12 tones (i.e., one PRB).

The four inversion and interpolation schemes provided in FIG. 15 were simulated using this channel model and the PAPR and EVM performance is shown in Table 4.

First, it is shown that the ZF solution (unclipped signal with 10.3 dB PAPR) has 1.7% EVM when the pseudo-inverse is computed for every tone, 1.87% when pseudo inverse is computed only at the measured tones and then interpolated, and 7.5% when no interpolation is applied.

Note that although scenario 4 shows a replicated pseudo-inverse for CRAM, ZF used an interpolated channel to enable a fair comparison with CRAM.

TABLE 4

PAPR and EVM performance of both ZF and CRAM using the four inversion & interpolation schemes provided by an embodiment of the present disclosure with PRB-based granularity.

| | Scenario 1 | Scenario 2 | Scenario 3 | Scenario 4 |
|---|---|---|---|---|
| ZF EVM | 1.74% | 7.5% | 1.87% | 1.87% |
| CRAM EVM | 1.96% | 7.95% | 2.11% | 2.23% |
| ZF PAPR | | 10.3 | | |
| CRAM PAZF | | 5.9 | | |
| CRAM RMS Penalty | | 2.6 | | |
| CRAM PAPR | | 3.3 | | |
| CRAM Peak Reduction | | 4.4 | | |

While CRAM has a similar degradation in EVM performance when replication or interpolation is applied, an interpolation for either the channel or the pseudo-inverse is enough to restore an acceptable performance. Note that CRAM has relatively worse EVM than unclipped ZF of up to 0.5%.

These results demonstrate that the four inversion and interpolation schemes provided in FIG. 15 may be used successfully to deal with incomplete channel knowledge—a common limitation in practical wireless systems.

Figure 17:
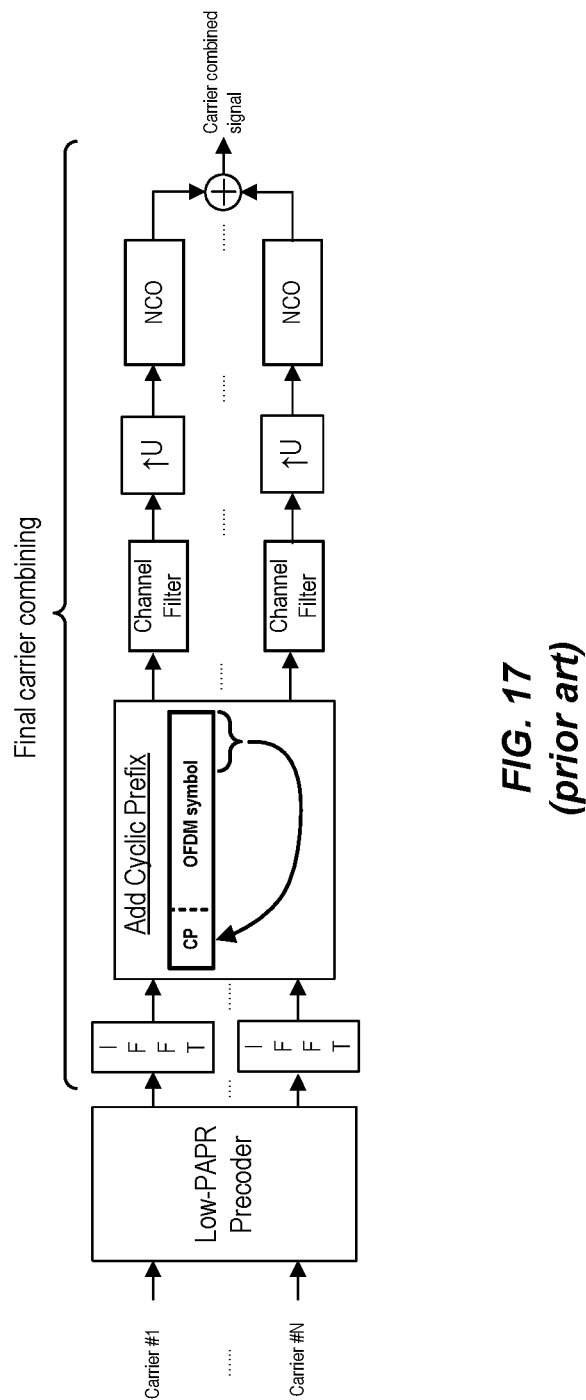
FIG. 17 illustrates Cyclic Prefix (CP) treatment in prior art systems.

In the description above, particularly that describing the multi-carrier and multi-band CRAM processing schemes, treatment of the CP is not described. Technically, the CP is a copy of the baseband samples located at the OFDM symbol end to the OFDM symbol front as shown in FIG. 17. This is needed in OFDM systems to combat inter-symbol interference and simplify the channel estimation as well as the equalizer structure in the receiver by making the wireless channel response look like a circular convolution.

As shown in FIG. 17, the CP is excluded from the low-PAPR precoding schemes in the prior art. Instead, the CP is introduced after the low-PAPR precoder in the final carrier combining. Since the CP is a repetition of baseband samples that have already been processed by the low-PAPR precoding algorithm, the CP introduction should have no impact on the final PAPR of the signal. However, this is not always the case as will be seen next.

Table 5 shows the CRAM performance when using the single carrier, multi-carrier, and multi-band CRAM processing schemes described above, with and without CP. In the table, the PAZF acronym stands for Peak-to-Average power ratio to the Zero-Forcing solution. This is a metric that compares the CRAM signal peaks to the ZF average power, thus capturing the CRAM average power penalty against a baseline ZF solution.

As seen in the table, the addition of the CP does not matter for single-carrier systems where the outcome is identical whether the CP is present or not. However, in the four following carrier configurations, the CRAM performance is greatly impacted by the addition of the cyclic prefix. Test cases #2 to #5 have one element in common; they all correspond to multi-carrier scenarios. The results from Table 5 imply that the introduction of the CP creates problem in multi-carrier configurations. Since most of the real-world systems serve more than one carrier concurrently, this is a major concern which requires a solution.

can be used for any type of iterative low PAPR precoding scheme. Some examples of other precoding schemes that can be used are "Fast Iterative Truncation Algorithm (FITRA)" [1] and PROXINF-ADMM [3].

Figure 18:
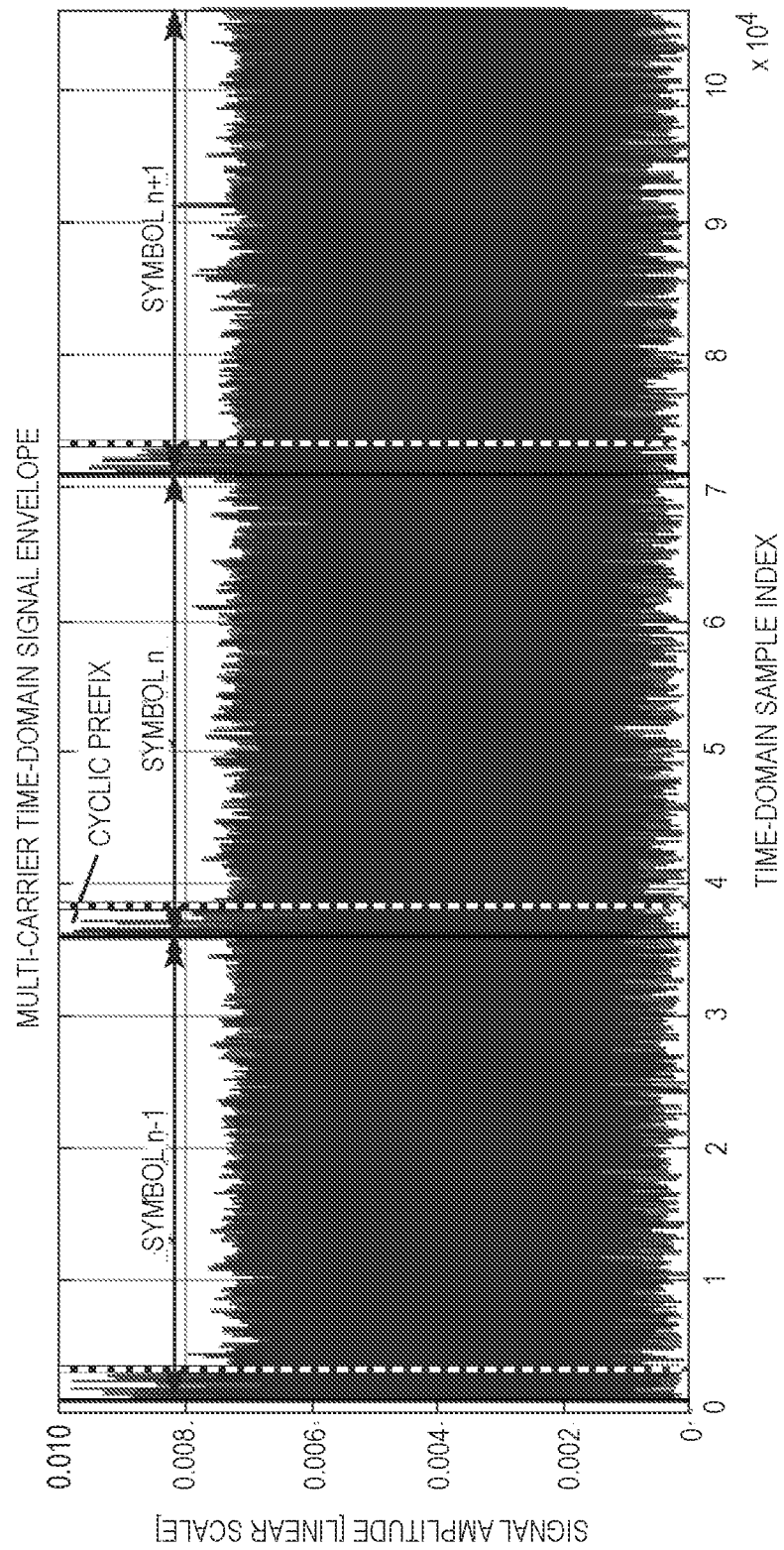
FIG. 18 illustrates multi-carrier CP peak regrowth.

A closer look at the time-domain waveforms for the multi-carrier and multi-band scenarios (i.e., test cases #2 to #5 in Table 5) reveals that the severe performance degradation is caused by some peaks regrowth which only occur in the CP regions as illustrated in FIG. 18.

Figure 19:
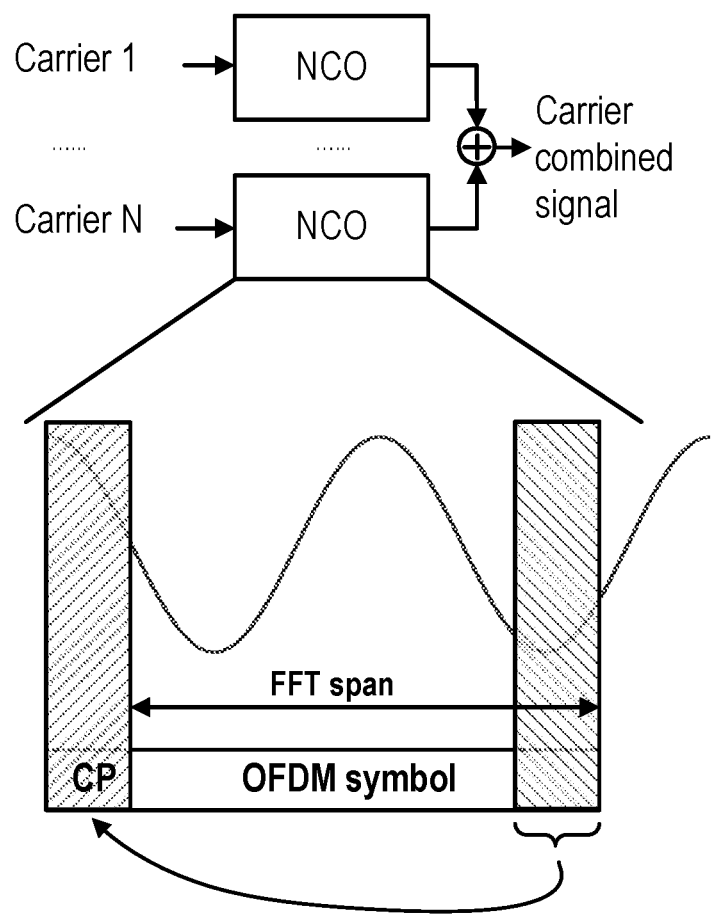
FIG. 19 illustrates the root cause of CP peak regrowth.

The source of this problem is located in the final carrier combining. For some of the carrier frequencies, the complex sinusoids generated by the NCO's have different phases between the two portions of the CP. This is illustrated in FIG. 19, where the shaded area to the left corresponds to the CP (front-CP) while the shaded area to the right corresponds to the original samples at the OFDM symbol end (back-CP). As shown in FIG. 19, the sinusoids are not necessarily in the same state over the two shaded areas. In multi-carrier and multi-band scenarios, this phenomenon creates different constructive and destructive summations between the multiple carriers in each of the two shaded segments, such that each of them requires a different low-PAPR precoding solution.

One of the constraints of the CRAM processing scheme is that the X-update can only process a number of time-domain samples that is equivalent to the FFT size. This is referred to as the "FFT span" in FIG. 19.

TABLE 5

Performance with and without CP for various carrier configurations

| Test case # | Number of bands | Carrier configuration | No CP PAPR [dB] | No CP PAZF [dB] | CP added in final carrier combining PAPR [dB] | CP added in final carrier combining PAZF [dB] |
|---|---|---|---|---|---|---|
| 1 | 1 | 1 × 20 MHz | 4.7 | 4.9 | 4.7 | 4.9 |
| 2 | | 3 × 20 MHz | 5.1 | 5.3 | 6.0 | 6.3 |
| 3 | | 1 × 10 MHz + 1 × 5 MHz + 1 × 20 MHz | 6.2 | 6.4 | 6.7 | 7.1 |
| 4 | 2 | B2: 1 × 10 MHz + 1 × 5 MHz B4: 2 × 20 MHz | 5.7 | 6.1 | 6.6 | 7.0 |
| 5 | | B1: 1 × 20 MHz + 2 × 20 MHz B3: 1 × 20 MHz + 2 × 10 MHz | 5.9 | 6.2 | 7.3 | 7.6 |

Embodiments will now be described that provide a multi-carrier or multi-band CRAM processing scheme that handles the CP in such that the peak reduction performance is preserved in multi-carrier and multi-band scenarios. These embodiments maintain the low-PAPR of the CRAM processing scheme when introducing the CP in multi-carrier and multi-band configurations. This is a key innovation for enabling practical systems which virtually always have more than one carrier. In turn, the small dynamic range of the signal enables several radio optimizations:

- The elimination of traditional Crest Factor Reduction (CFR).
- The elimination or the reduced complexity of the Digital Pre-Distortion (DPD) algorithms.
  - Also, potentially less bandwidth to carry between the DPD subsystem and the Power Amplifier (PA).
- The efficient use of smaller and less power-hungry PAs.
- The use of smaller cooling sub-systems.
- The potential utilization of lower resolution data converters.

Figure 20:
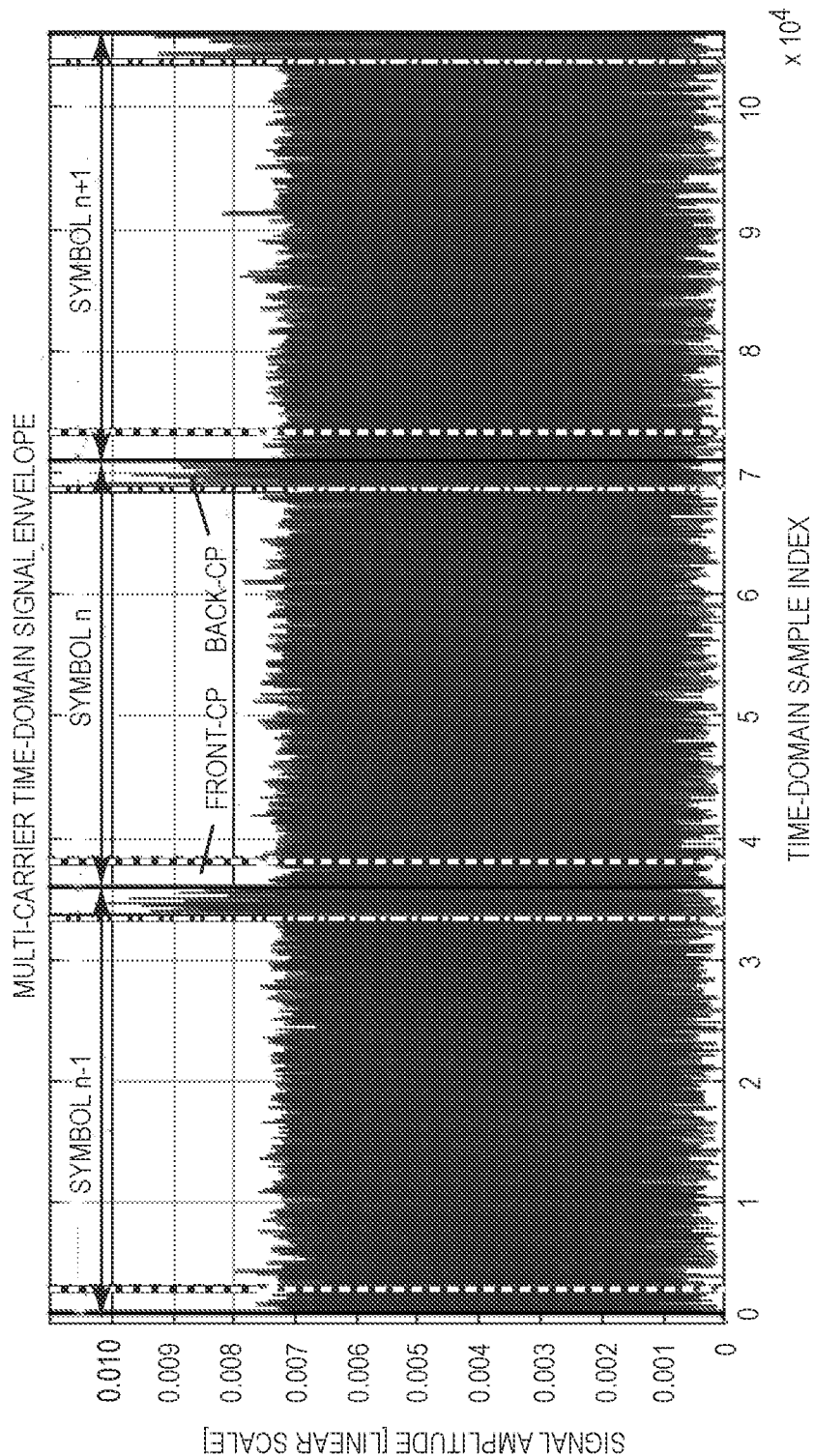
FIG. 20 illustrates multi-carrier back-CP peak regrowth.

Importantly, note that while the following embodiments are described for CRAM, they are not limited to CRAM and In the multi-carrier and multi-band CRAM processing schemes described above, the front-CP is not exposed to the CRAM X-update and the FFT span is identical to the one shown in FIG. 19. As a result, the generated solution does not have a guaranteed low PAPR in the front-CP portions of the waveform. Interestingly, moving the FFT window to the left to cover the front-CP instead of the back-CP does not solve the problem either. When doing so, the peak regrowth problem is moved to the back-CP portions of the waveform as illustrated in FIG. 20.

In some rare occasions, if the sinusoid phases happen to be exactly the same for all carriers in both the front-CP and the back-CP areas for each of the carriers, the multi-carrier and multi-band CRAM processing schemes described above work fine. Most of the time, however, the sinusoids have different states between the two CP segments and the algorithm must be reworked to handle this situation.

To solve this problem, the multi-carrier and multi-band CRAM processing schemes described above can be modified. In particular, the front-CP and the back-CP are combined so they can fit into the FFT span and therefore can be processed concurrently by the CRAM X-update. Using the multi-band CRAM processing architecture of FIGS. 13A and 13B, FIGS. 21A and 21B illustrate the proposed architecture modifications, which correspond to the blocks with bold edges in FIGS. 21A and 21B. In particular, for the forward propagation paths, an add CP function 88, a channel filter 90, and a copy function 92 are added for each antenna branch for each carrier in each frequency band. Note that the channel filter 90 and/or the copy function 92 may not be needed in all implementations. For the reverse propagation paths, a zero padding function 94 and a CP removal function 96 are added for each antenna branch for each carrier in each frequency band. Note that the zero padding function 94 may not be needed in all implementations. The operation of each of these new blocks will now be described in connection with FIG. 22.

Figure 21A:
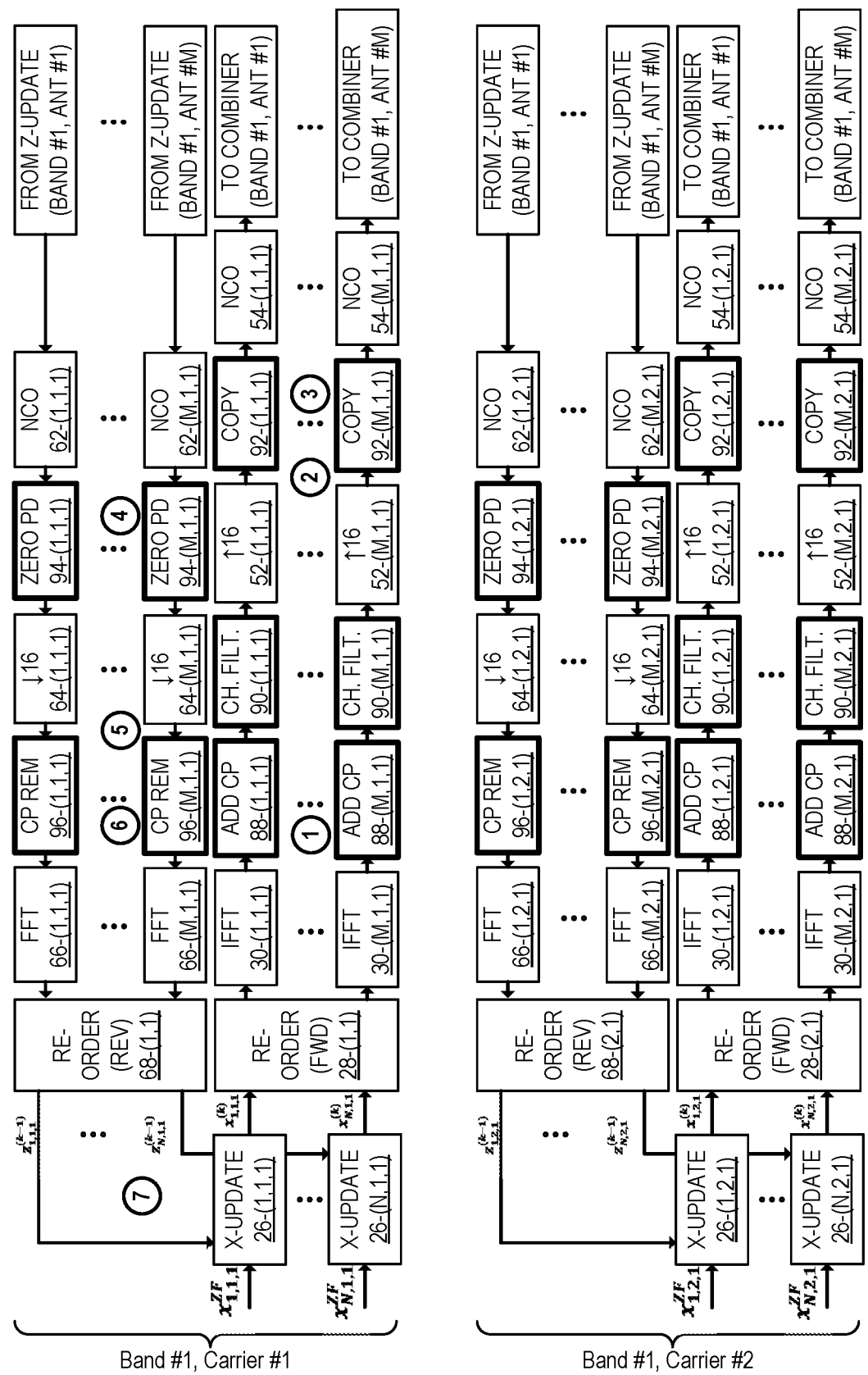
FIGS. 21A and 21B illustrate one example of the multi-band CRAM processing system of FIG. 12 that implements a multi-band CRAM algorithm with minimax CP combining in accordance with some embodiments of the present disclosure.
Figure 21B:
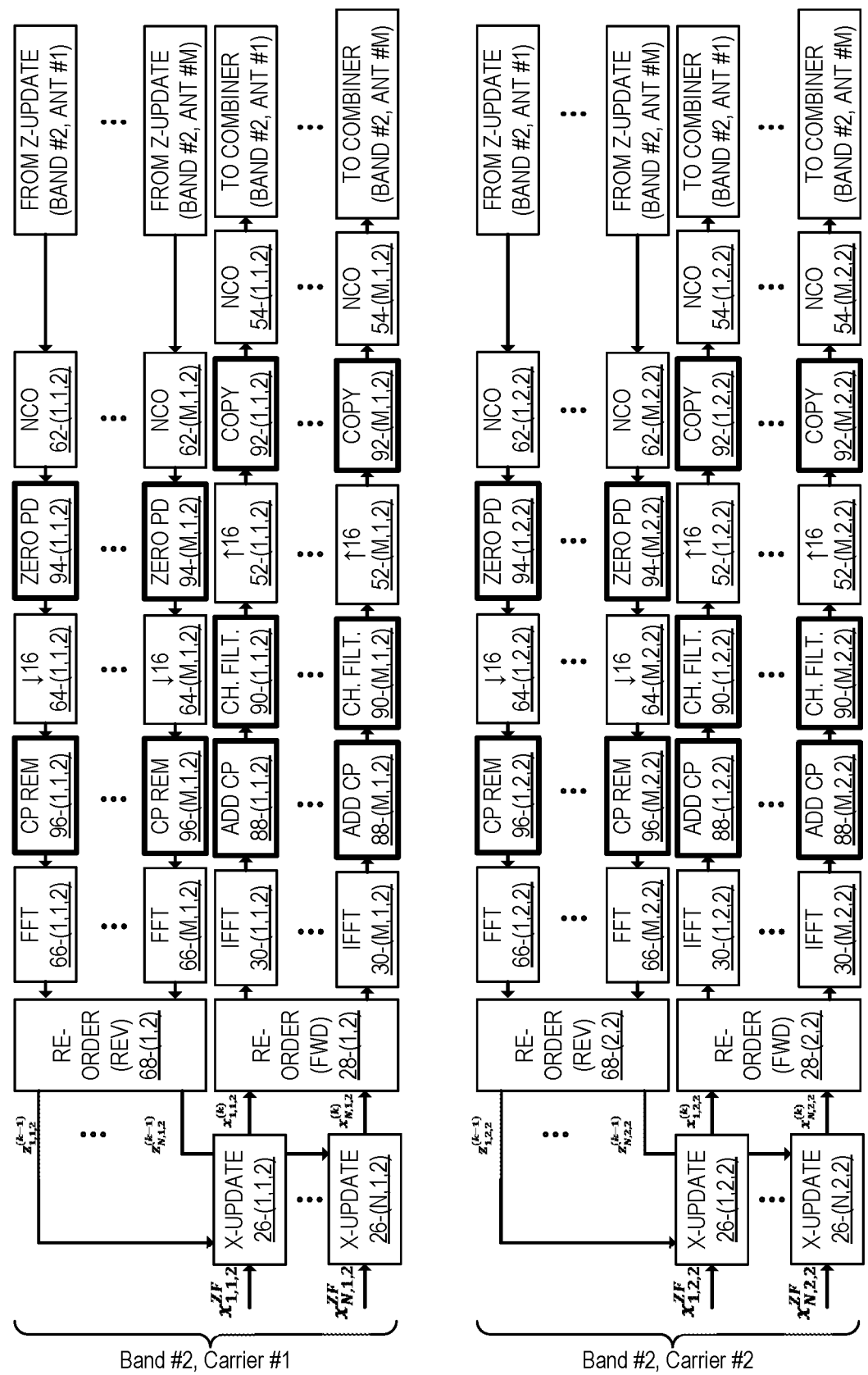
Figure 22:
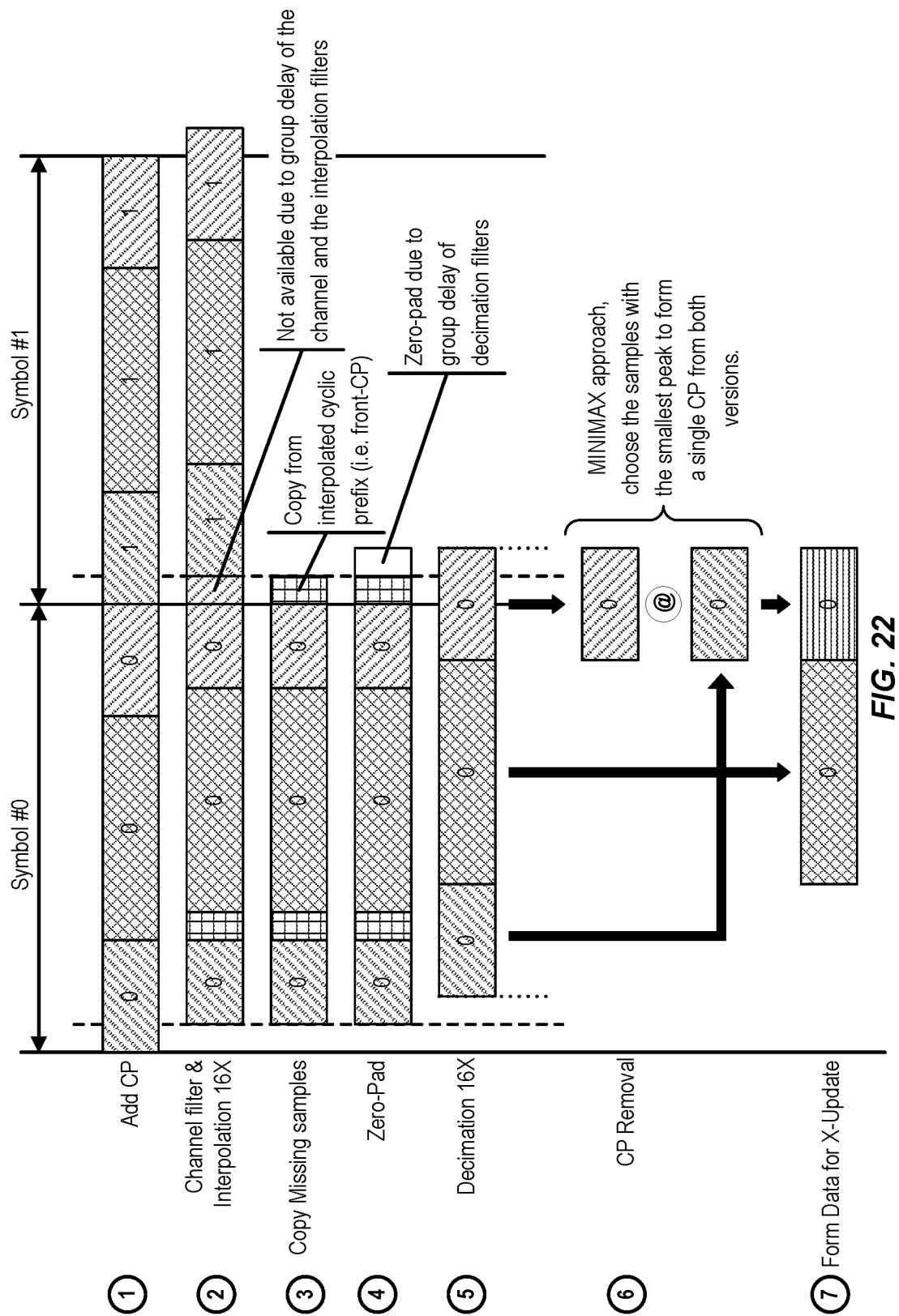
FIG. 22 graphically illustrates one example of minimax CP combining in accordance with some embodiments of the present disclosure.

The steps involved in the processing of one OFDM symbol are illustrated in FIG. 22. The circled labels numerated from 1 to 7 map the steps of FIG. 22 to the CRAM architecture diagrams of FIGS. 21A and 21B. The proposed solution is described here with reference to the circled labels of FIGS. 21A and 21B and FIG. 22. For the following discussion, the carrier #1 in frequency band #1 is used as an example; however, it should be appreciated that this discussion is equally applicable to all of the other carriers.

Label 1:

The first step is the addition of the CP at the IFFT outputs within the CRAM iterations. Using Carrier #1 in Band #1 of FIG. 21A as an example, the X-update functions 26-(1,1,1) through 26-(N,1,1) operate to perform frequency-domain X-update procedures for the N tones for n=1, . . . , N for the first carrier in the first frequency band, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios). In the forward direction, the frequency-domain X-update outputs $x_{n,1,1}^{(k)}$ for n=1, . . . , N for the first carrier in the first frequency band are provided to the re-ordering function 28-(1,1) for the first carrier in the first frequency band that re-orders the frequency-domain X-update outputs $x_{n,1,1}^{(k)}$ for the first carrier in the first frequency band to generate a new set of M vectors $a_{m,1,1}$ for the first carrier in the first frequency band, each containing N frequency-domain samples. In other words, each of the N frequency-domain X-update outputs $x_{n,1,1}^{(k)}$ for the first carrier in the first frequency band contains M samples that are distributed evenly across the M antenna branches via the re-ordering function 28-(1,1). The re-ordered vectors $a_{m,1,1}$ for m=1, . . . , M (also referred to herein as re-ordered signals) are converted from the frequency-domain to the time-domain via respective IFFTs 30-(1,1,1) through 30-(M,1,1) to provide M time-domain signals for the M antenna branches, respectively, for the first carrier in the first frequency band. While not illustrated, time-domain processing such as P/S conversion may be performed. The add CP functions 88-(1,1,1) thorough 88-(M,1,1) add CPs to the M time-domain signals for the M antenna branches for the first carrier in the first frequency band.

The channel filters 90-(1,1,1) through 90-(M,1,1) then perform channel filtering on the M time-domain signals for the M antenna branches for the first carrier in the first frequency band. For cost reduction purposes, the filter coefficients may be replaced by a delay block that corresponds to the filter group delay. Note that this is only allowed within the CRAM iterations; the final carrier combining must use the actual filter coefficients to meet the spectral emission requirements. The purpose of using a delay block is to ensure that all the samples are multiplied by a sinusoid phase that is identical to the one being used in the final carrier combining. Since the channel filter response is flat on the in-band tones that are used by the X-update, the all-pass frequency response of the delay block has a negligible impact on the CRAM performance.

Interpolators 52-(1,1,1) through 52-(M,1,1) interpolate the M filtered time-domain signals for the M antenna branches for the first carrier in the first frequency band from a lower sampling rate used for the frequency-domain processing to a higher sampling rate. In this example, the first and second carriers in the first and second frequency band are all 20 MHz carriers, and the IFFTs (for both the first carrier and the second carrier in both the first and second frequency band) are 2048 point carriers, where the lower sampling rate is 30.72 Msps and the higher sampling rate is 491.52 Msps. Note that these sampling rates are only examples. Other sampling rates may be used. Further, the interpolators 52-(1,1,1) through 52-(M,1,1) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,1,1) through 30-(M,1,1) and zero-padding the additional subcarriers.

Labels 2 and 3:

Due to the group delays of the channel filter 90 and the interpolators 52, the few last samples of the back-CP are not available until the next OFDM symbol is "pushed" through the filter chain. The role of the copy function 92 (i.e., to "copy missing samples") is to replicate those missing samples in the back-CP by copying them from the front-CP region. The full OFDM symbol with reconstructed back-CP may be processed by CRAM Z-update and Y-update normally.

Again, in the example for the first carrier of the first frequency band in FIG. 21A, the M interpolated time-domain signals for the first carrier in the first frequency band for the M antenna branches are processed by the copy functions 92-(1,1,1) through 92-(M,1,1), respectively. For each m-th antenna branch, the interpolated time-domain signal for the first carrier in the first frequency band for the m-th antenna branch is processed by the respective copy function 92-($m$,1,1) to replicate the missing samples in the back-CP by copying them from the front-CP region. In other words, for each missing sample in the back-CP, the respective sample in the front-CP region is copied to the back-CP region, thereby replacing the missing sample.

The full OFDM symbols with reconstructed back-CPs are then tuned to an appropriate frequency offset for the first carrier in the first frequency band by, in this example, corresponding NCOs 54-(1,1,1) through 54-(M,1,1). The NCOs 54-(1,1,1) through 54-(M,1,1) may be implemented using a LUT or CORDIC techniques, as will be appreciated by one of ordinary skill in the art. Note that there are no restrictions on the positions of the carriers (i.e., any desired carrier frequencies can be used).

For each m-th antenna branch, the tuned time-domain signal for the first carrier in the first frequency band for the m-th antenna branch is provided to the respective combiner 56-($m$,1) (see, e.g., FIG. 13C which illustrates the combiners 56-(1,1) and 56-(1,2) for the first antenna branch for the first and second frequency bands, respectively). For each m-th antenna branch, the tuned time-domain signals for all of the carriers in the b-th frequency band are combined by the respective combiner 56($m$,$b$) to provide a multi-carrier time-domain signal for the m-th antenna branch for the b-th frequency band. These multi-carrier time-domain signals are processed by the respective Z-update functions 58($m$,$b$), which output respective time-domain Z-update outputs, as described above. In addition, the multi-carrier time-domain signals for all of the frequency bands are combined by a respective combiner 82-$m$ to provide a multi-band time-domain signal for the m-th antenna branch.

Label 4:

Again, looking at the first carrier in the first frequency band as an example, in the reverse direction, the M time-domain Z-update outputs of the M time-domain Z-update functions 58-(1,1) through 58-(M,1) are tuned back to baseband by respective NCOs 62-(1,1,1) through 62-(M,1,1) for the first carrier in the first frequency band. The tuned time-domain Z-update outputs for the first carrier in the first frequency band are then zero padded by the zero padding functions 94-(1,1,1) through 94-(M,1,1), respectively. Notably, each of the decimators 64-(1,1,1) through 64-(M,1,1) (i.e., each of the decimation filter chains (116)) also has a group delay which prevents the few last samples of the back-CP to appear at the decimator 64-(1,1,1) through 64-(M,1,1) outputs before the next OFDM symbol is processed. To work around this problem, the zero padding functions 94-(1,1,1) through 94-(M,1,1) operate to pad zeros at the very end the OFDM symbol prior to the decimators 64-(1,1,1) through 64-(M,1,1).

After zero padding, the decimators 64-(1,1,1) through 64-(M,1,1) decimate the time-domain Z-update outputs back to the lower sampling rate, thereby providing M time-domain Z-update outputs for the first carrier in the first frequency band.

Label 5:

For each antenna branch for the first carrier in the first frequency band, the zero-padded vector output by the respective zero padding function 94 yields a full-length CP for both the front-CP and back-CP regions at the decimation filter chain output.

Label 6:

After decimation, the M time-domain Z-update outputs for the first carrier in the first frequency band are processed by the CP removal functions 96-(1,1,1) through 96-(M,1,1), respectively, to perform CP removal. For each m-th antenna branch for the first carrier in the first frequency band, during CP removal, the worst-case clipped signal (i.e., smallest magnitude) is selected on a sample-by-sample basis between the front-CP and the back-CP. More specifically, as illustrated in FIG. 22, in order to reconstruct the back-CP region of the symbol for the m-th antenna branch for the first carrier in the first frequency band, the CP removal function 96-($m$,1,1) performs a sample-by-sample comparison of the front-CP region of the symbol and the back-CP region of the symbol. For each symbol, the symbol in the back-CP region is replaced by the respective symbol in the front-CP region if the magnitude of the sample in the front-CP region is less than the magnitude of the sample in the back-CP region. The front-CP region is removed from the symbol. In this manner, the front-CP region and the back-CP region are combined to form a single back-CP region from both CP regions. The reconstructed vector output by each of the CP removal functions 96-(1,1,1) through 96-(M,1,1) for the first carrier in the first frequency band is presented to the X-update as a "back-CP", even though it may contain samples from both CP regions. This ensures that the precoding solution that is produced by the CRAM X-update always satisfies the worst-case peak between the two CP segments. This algorithm is referred to herein as "Minimax CP combining".

More specifically, after CP removal, the M time-domain Z-update outputs for the first carrier in the first frequency band are converted to the frequency-domain by respective FFTs 66-(1,1,1) through 66-(M,1,1) to thereby provide M frequency-domain Z-update outputs for the first carrier in the first frequency band. The re-ordering function 68-(1,1) performs a reverse re-ordering of the M frequency-domain Z-update outputs for the first carrier in the first frequency band to provide the N frequency-domain Z-update outputs that are input to the X-update functions 26-(1,1,1) through 26-(N,1,1) for the first carrier in the first frequency band.

Note that while the front-CP portion and the back-CP portion are combined to provide a new back-CP portion in the example embodiment described above, the present disclosure is not limited thereto. For example, in an alternative embodiment, the front-CP portion and the back-CP portion are combined to provide a new front-CP portion. A frequency-domain phase shift could then be applied get to the same result.

Label 7:

The N frequency-domain Z-update outputs that are output by the re-ordering function 68-(1,1) are processed by the X-update functions 26-(1,1,1) through 26-(N,1,1) for the first carrier in the first frequency band, as described above. In this manner, the CRAM X-update is performed on the vector that is provided by the Minimax CP combining.

Note that while the details are described above for the first carrier in the first frequency band, the same details are also applicable to all carriers in all of the frequency bands. In this manner, a multi-carrier or multi-band CRAM processing scheme with minimax CP combining is provided.

The proposed multi-carrier or multi-band CRAM processing scheme with minimax CP combining has been validated using the five carrier configurations from Table 5. The simulation results are summarized in Table 6 below. The performance of the multi-carrier or multi-band CRAM processing scheme without the new minimax CP combining are also recalled in Table 6 to facilitate the comparison.

For all test cases, the PAPR and the PAZF that are produced by the proposed minimax algorithm are within 0.3 dB of the baseline reference without CP. In the four multi-carrier scenarios (i.e., test cases #2 to #5), the proposed minimax solution offers a clear advantage over the multi-carrier or multi-band CRAM processing scheme without the new minimax CP combining.

TABLE 6

Performance of the proposed CRAM processing scheme with minimax CP combining vs. CRAM processing scheme without CP minimax combining

| | | | No CP | | CP added | | | |
|---|---|---|---|---|---|---|---|---|
| | | | | | Algorithm from [2] | | Proposed minimax algorithm | |
| Test case # | Number of bands | Carrier configuration | PAPR [dB] | PAZF [dB] | PAPR [dB] | PAZF [dB] | PAPR [dB] | PAZF [dB] |
| 1 | 1 | 1 × 20 MHz | 4.7 | 4.9 | 4.7 | 4.9 | 4.6 | 4.9 |
| 2 | | 3 × 20 MHz | 5.1 | 5.3 | 6.0 | 6.3 | 5.1 | 5.4 |
| 3 | | 1 × 10 MHz + 1 × 5 MHz + 1 × 20 MHz | 6.2 | 6.4 | 6.7 | 7.1 | 6.2 | 6.5 |
| 4 | 2 | B2: 1 × 10 MHz + 1 × 5 MHz B4: 2 × 20 MHz | 5.7 | 6.1 | 6.6 | 7.0 | 6.0 | 6.4 |
| 5 | | B1: 1 × 20 MHz + 2 × 20 MHz B3: 1 × 20 MHz + 2 × 10 MHz | 5.9 | 6.2 | 7.3 | 7.6 | 6.2 | 6.4 |

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 23:
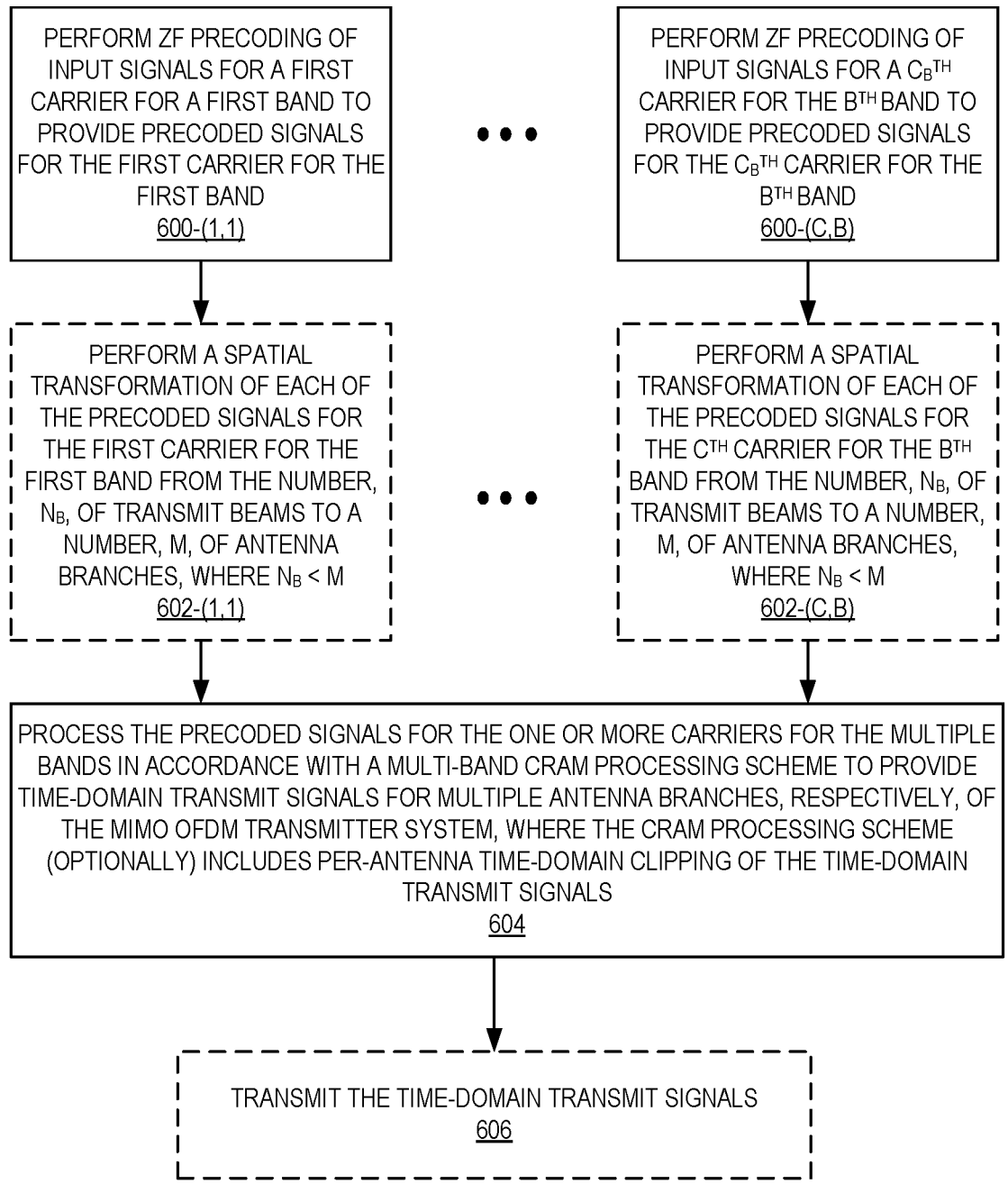
FIG. 23 is a flow chart that illustrates the operation of the transmitter system in accordance with some embodiments of the present disclosure in which the CRAM algorithm is the multi-band CRAM algorithm with minimax CP combining.

FIG. 23 is a flow chart that illustrates the operation of the transmitter system 10 in accordance with some embodiments of the present disclosure in which the CRAM algorithm is the multi-band CRAM algorithm with minimax CP combining described above. The CRAM algorithm used here may use the conventional frequency-domain X-update of Equation 7, the frequency-domain X-update of Equation 11, or the frequency-domain X-update of Equation 16, 17, or 18. This process is performed by the transmitter system 10 of FIG. 3 using, e.g., the architecture for the baseband processing system 12 of FIGS. 12, 21A, 21B, 13C, 13D, and 14.

As illustrated, for each c-th carrier for c=1, C in each b-th frequency band for b=1, B, the transmitter system 10, and in particular the baseband processing system 12, performs (e.g., ZF) precoding of the frequency-domain input signals $s_{n,c,b}$ for n=1, ..., N to provide the N (potentially port-reduced) frequency-domain precoded signals for the c-th carrier, as described above (step 600-(c,b)). In some embodiments, port reduction is not performed, and as such the N frequency-domain precoded signals for the c-th carrier in the b-th frequency band are the N frequency-domain precoded signals for n=1, ..., N for the c-th carrier in the b-th frequency band. In some other embodiments, the N frequency-domain precoded signals for the c-th carrier in the b-th frequency band are the N port-reduced frequency-domain precoded signals for the c-th carrier in the b-th frequency band. If port reduction is used, then the transmitter system 10, and in particular the baseband processing system 12, performs a spatial transformation of each of the N port-reduced frequency-domain precoded signals for the c-th carrier in the b-th frequency band from the number ($N_B$) of transmit beams to the number (M) of antenna branches where $N_B$<M to thereby provide the N frequency-domain precoded signals $x_{n,c,b}^{ZF}$ for the c-th carrier in the b-th frequency band, as described above (step 602-(c,b)). Note that step 602-(c,b) is optional, as indicated by the dashed lines, depending on whether or not port reduction is used.

The transmitter system 10, and in particular the baseband processing system 12, processes the frequency-domain precoded signals $x_{n,c,b}^{ZF}$ for n=1, ..., N for all C carriers in all B frequency bands in accordance with a multi-band CRAM processing scheme with minimax CP combining to provide M time-domain multi-band transmit signals for the M antenna branches of the transmitter system 10 (step 604), as described above. Optionally, the transmitter system 10, and in particular the RF transmitter circuitry 14, transmits the M time-domain multi-band transmit signals (step 606).

Figure 24:
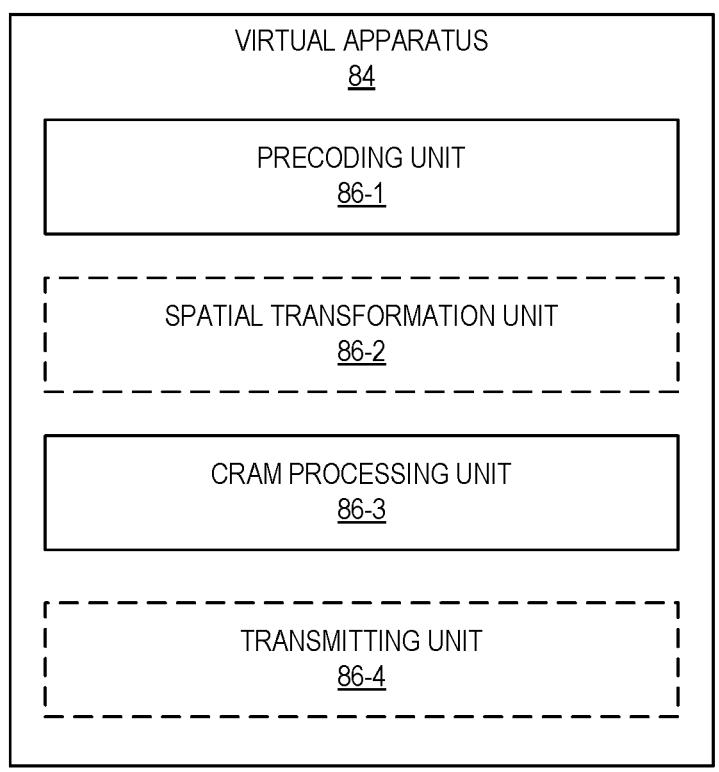
FIG. 24 illustrates a schematic block diagram of an apparatus in which embodiments of the present disclosure may be implemented.

FIG. 24 illustrates a schematic block diagram of an apparatus 84 in which embodiments of the present disclosure may be implemented. The apparatus 84 may be implemented in a transmitter (e.g., the transmitter system 10). The apparatus 84 is operable to carry out any processes or methods disclosed herein. It is also to be understood that the method is not necessarily carried out solely by the apparatus 84. At least some operations of the method can be performed by one or more other entities.

The virtual apparatus 84 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols, as well as instructions for carrying out one or more of the techniques described herein, in several embodiments. In some implementations, the processing circuitry may be used to cause a precoding unit 86-1, an optional spatial transformation unit 86-2, a CRAM processing unit 86-3, and an optional transmitting unit 86-4, and any other suitable units of the apparatus 84 to perform corresponding functions according one or more embodiments of the present disclosure.

As illustrated in FIG. 24, the apparatus 84 includes the precoding unit 86-1 that operates to performing precoding as described herein, the optional spatial transformation unit 86-2 that operates to perform spatial transformation as described herein, the CRAM processing unit 86-3 that operates to perform CRAM processing as described herein, and the optional transmitting unit 86-4 that operates to perform transmission as described herein.

The term unit may have conventional meaning in the field of electronics, electrical devices, and/or electronic devices, and may include, for example, electrical and/or electronic circuitry, devices, modules, processors, memory, logic solid state and/or discrete devices, computer programs or instructions for carrying out respective tasks, procedures, computations, outputs, and/or displaying functions, and so on, such as those that are described herein.

Those skilled in the art will recognize improvements and modifications to the embodiments of the present disclosure. All such improvements and modifications are considered within the scope of the concepts disclosed herein and the claims that follow.

REFERENCES

[1] C. Studer et al., "PAR-Aware Large-Scale Multi-User MIMO-OFDM Downlink," IEEE Journal on Selected Areas in Communications, Vol. 31, No. 2, February 2013.
[2] H. Bao et al., "An Efficient Bayesian PAPR Reduction Method for OFDM-Based Massive MIMO Systems," IEEE Transactions on Wireless Communications, Vol. 15, No. 6, June 2016.
[3] H. Bao et al., "Perturbation-Assisted PAPR Reduction for Large-Scale MIMO-OFDM Systems via ADMM," submitted for publication, July 2016.
[4] C. Studer et al., "Democratic Representations," CORR abs/1401.3420, Apr. 22, 2015, 43 pages.
[5] N. Parikh and S. Boyd, "Proximal Algorithms," Foundations and Trends in Optimization, Vol. 1, No. 3, 2013.

What is claimed is:

1. A method of operation of a Multiple Input Multiple Output, MIMO, Orthogonal Division Multiplexing, OFDM, transmitter system, comprising:
for each carrier of two or more carriers, performing precoding of a plurality of frequency-domain input signals for the carrier to provide a plurality of frequency-domain precoded signals for the carrier, the plurality of frequency-domain input signals for the carrier being for a plurality of transmit layers for the carrier, respectively; and
processing the two or more pluralities of frequency-domain precoded signals for the two or more carriers, respectively, in accordance with a multi-carrier processing scheme to provide a plurality of multi-carrier time-domain transmit signals for a plurality of antenna branches, respectively, of the MIMO OFDM transmitter system, the multi-carrier processing scheme providing Peak-to-Average Power Ratio, PAPR, reduction for Cyclic Prefixes, CPs, of the plurality of multi-carrier time-domain transmit signals for the plurality of antenna branches;
wherein the multi-carrier processing scheme is a multi-carrier Convex Reduction of Amplitudes, CRAM, processing scheme; and
wherein, in order to process the two or more pluralities of frequency-domain precoded signals for the two or more carriers, respectively, in accordance with the multi-carrier CRAM processing scheme, the processing circuitry is further operable to:
for each c-th carrier of the two or more carriers:
for each n-th frequency-domain precoded signal of the plurality of frequency-domain precoded signals for the c-th carrier for n=1, . . . , N, perform a frequency-domain X-update procedure on the n-th frequency-domain precoded signal for the c-th carrier to provide an X-update output $x_{n,c}^{(k)}$ for the n-th frequency-domain precoded signal for the c-th carrier for a k-th iteration of the multi-carrier CRAM processing scheme;
reorder the X-update outputs, $x_{n,c}^{(k)}$, for the c-th carrier for the plurality of frequency-domain precoded signals to thereby provide a plurality of antenna-domain vectors, each comprising N frequency-domain samples, for the plurality of antenna branches, respectively;
transform the plurality of antenna-domain vectors from the frequency-domain to the time-domain to thereby provide a plurality of time-domain signals for the plurality of antenna branches, respectively; and
for each time-domain signal of the plurality of time-domain signals:
add a CP to the time-domain signal;
after adding the CP, perform channel filtering on the time-domain signal to provide a filtered signal;
interpolate the filtered signal to a desired sampling rate to thereby provide an interpolated signal, wherein one or more samples at an end of the interpolated signal are missing;
copy, to the end of the interpolated signal, one or more samples from a front portion of the interpolated signal that correspond to the one or more samples that are missing, thereby replacing the one or more samples that are missing; and
after replacing the one or more samples that are missing, tune the interpolated signal to a desired frequency offset for the c-th carrier to thereby provide a tuned signal for the respective antenna branch for the c-th carrier; and
for each antenna branch of the plurality of antenna branches, combine the tuned signals for the antenna branch for the two or more carriers to provide the multi-carrier time-domain transmit signal for the antenna branch.

2. A Multiple Input Multiple Output, MIMO, Orthogonal Division Multiplexing, OFDM, transmitter system, comprising:
precoding circuitry operable to, for each carrier of two or more carriers, perform precoding of a plurality of frequency-domain input signals for the carrier to provide a plurality of frequency-domain precoded signals for the carrier, the plurality of frequency-domain input signals for the carrier being for a plurality of transmit layers for the carrier, respectively; and
processing circuitry operable to process the two or more pluralities of frequency-domain precoded signals for the two or more carriers, respectively, in accordance with a multi-carrier processing scheme to provide a plurality of multi-carrier time-domain transmit signals for a plurality of antenna branches, respectively, of the MIMO OFDM transmitter system, the multi-carrier processing scheme providing Peak-to-Average Power Ratio, PAPR, reduction for Cyclic Prefixes, CPs, of the plurality of multi-carrier time-domain transmit signals for the plurality of antenna branches;

wherein the multi-carrier processing scheme is a multi-carrier Convex Reduction of Amplitudes, CRAM, processing scheme; and wherein, in order to process the two or more pluralities of frequency-domain precoded signals for the two or more carriers, respectively, in accordance with the multi-carrier CRAM processing scheme, the processing circuitry is further operable to:

for each c-th carrier of the two or more carriers:
for each n-th frequency-domain precoded signal of the plurality of frequency-domain precoded signals for the c-th carrier for n=1, . . . , N, perform a frequency-domain X-update procedure on the n-th frequency-domain precoded signal for the c-th carrier to provide an X-update output $x_{n,c}^{(k)}$ for the n-th frequency-domain precoded signal for the c-th carrier for a k-th iteration of the multi-carrier CRAM processing scheme;

reorder the X-update outputs, $x_{n,c}^{(k)}$, for the c-th carrier for the plurality of frequency-domain precoded signals to thereby provide a plurality of antenna-domain vectors, each comprising N frequency-domain samples, for the plurality of antenna branches, respectively;

transform the plurality of antenna-domain vectors from the frequency-domain to the time-domain to thereby provide a plurality of time-domain signals for the plurality of antenna branches, respectively; and for each time-domain signal of the plurality of time-domain signals:
add a CP to the time-domain signal;
after adding the CP, perform channel filtering on the time-domain signal to provide a filtered signal;
interpolate the filtered signal to a desired sampling rate to thereby provide an interpolated signal, wherein one or more samples at an end of the interpolated signal are missing;
copy, to the end of the interpolated signal, one or more samples from a front portion of the interpolated signal that correspond to the one or more samples that are missing, thereby replacing the one or more samples that are missing; and
after replacing the one or more samples that are missing, tune the interpolated signal to a desired frequency offset for the c-th carrier to thereby provide a tuned signal for the respective antenna branch for the c-th carrier; and for each antenna branch of the plurality of antenna branches, combine the tuned signals for the antenna branch for the two or more carriers to provide the multi-carrier time-domain transmit signal for the antenna branch.

3. The MIMO OFDM transmitter system of claim 2 wherein in order to process the two or more pluralities of frequency-domain precoded signals for the two or more carriers, respectively, in accordance with the multi-carrier processing scheme, the processing circuitry is further operable to:

perform, in a forward direction, CP insertion within each iteration of the multi-carrier processing scheme; and perform, in a reverse direction, CP removal, wherein, in order to perform CP removal, the processing circuitry is further operable to, for each symbol:
combine a first-CP portion of the symbol that corresponds to the CP and a second-CP portion of the symbol that corresponds to samples from which the CP was derived into a new second-CP portion of the symbol; and
remove the first-CP portion of the symbol.

4. The MIMO OFDM transmitter system of claim 2 wherein the processing circuitry is further operable to:

for each m-th antenna branch of the plurality of antenna branches:
perform a time-domain Z-update procedure on the multi-carrier time-domain transmit signal for the m-th antenna branch to provide a time-domain Z-update output $Z_m^{(k)}$ for the m-th antenna branch for a k-th iteration of the multi-carrier CRAM processing scheme; and for each c-th carrier of the two or more carriers:
for each m-th antenna branch of the plurality of antenna branches:
tune the time-domain Z-update output $Z_m^{(k)}$ for the m-th antenna branch to baseband to thereby provide a time-domain Z-update output for the m-th antenna branch for the c-th carrier;
zero pad the time-domain Z-update output for the m-th antenna branch for the c-th carrier;
after zero padding, decimate the time-domain Z-update output for the m-th antenna branch for the c-th carrier to a desired sampling rate;
after decimating, perform CP removal on the time-domain Z-update output for the m-th antenna branch for the c-th carrier; and
after performing CP removal, transform the time-domain Z-update output for the m-th antenna branch for the c-th carrier from the time-domain to the frequency-domain to thereby provide a frequency-domain Z-update output for the m-th antenna branch for the c-th carrier; and
perform a reverse reordering on the frequency-domain Z-update outputs for the plurality of antenna branches for the c-th carrier to thereby provide frequency-domain Z-update outputs $z_{n,c}^{(k)}$ for the frequency-domain X-update procedures performed on a plurality of frequency-domain precoded signals for the c-th carrier for a (k+1)-th iteration of the multi-carrier CRAM processing scheme.

5. The MIMO OFDM transmitter system of claim 4 wherein, in order to perform the time-domain Z-update procedure on the multi-carrier time-domain transmit signal for the m-th antenna branch to provide the time-domain Z-update output $Z_m^{(k)}$ for the m-th antenna branch for a k-th iteration of the multi-carrier CRAM processing scheme, the processing circuitry is further operable to:

perform the time-domain Z-update procedure on the multi-carrier time-domain transmit signal for the m-th antenna branch for the two or more carriers in accordance with:

$$Z_m^{(k)}(t) = Z_m^{(k-1)}(t) + Y_m^{(k)}(t) - X_m^{(k)}(t)$$

wherein:
$Z_m^{(k)}(t)$ is the time-domain Z-update output for the m-th antenna branch for the k-th iteration of the multi-carrier CRAM processing scheme;
$Z_m^{(k-1)}(t)$ is a time-domain Z-update output for the m-th antenna branch for a (k−1)-th iteration of the multi-carrier CRAM processing scheme;
$Y_m^{(k)}(t)$ is for the m-th antenna branch and is defined as:

$$Y_m^{(k)}(t) = \begin{cases} \dfrac{Th_{high}}{|errY_m^{(k)}(t)|} \times errY_m^{(k)}(t), & \text{if } |errY_m^{(k)}(t)| > Th_{high} \\ \dfrac{Th_{low}}{|errY_m^{(k)}(t)|} \times errY_m^{(k)}(t), & \text{if } |errY_m^{(k)}(t)| < Th_{low} \\ Th_{low}, & \text{if } |errY_m^{(k)}(t)| = 0 \\ errY_m^{(k)}(t), & \text{otherwise} \end{cases}$$

wherein:
$errY_m^{(k)}(t) = 2 \cdot X_m^{(k)}(t) - Z_m^{(k-1)}(t)$;

$X_m^{(k)}(t)$ is the multi-carrier time-domain transmit signal for the m-th antenna branch for the two or more carriers for the k-th iteration of the multi-carrier CRAM processing scheme;
$errY_m^{(k)}(t)$ is an output of the time-domain Z-update function for the m-th antenna branch for the k-th iteration of the CRAM algorithm;
$Th_{high}$ is an upper clipping threshold; and
$Th_{low}$, is a lower clipping threshold.

6. The MIMO OFDM transmitter system of claim 4 wherein, in order to perform CP removal on the time-domain Z-update output for the m-th antenna branch for the c-th carrier, the processing circuitry is further operable to:
remove, from the time-domain Z-update output for the m-th antenna branch for the c-th carrier, a first portion of the time-domain Z-update output for the m-th antenna branch for the c-th carrier that corresponds to the CP of the respective time-domain signal for the m-th antenna branch for the c-th carrier; and
for each sample in the first portion that has a magnitude that is less than that of a respective sample in a second portion of the time-domain Z-update output for the m-th antenna branch for the c-th carrier that corresponds to a portion of the respective time-domain signal for the m-th antenna branch for the c-th carrier from which the CP was derived, replace the respective sample in the second portion with the sample in the first portion.

7. The MIMO OFDM transmitter system of claim 2 wherein, in order to perform the frequency-domain X-update procedure on the n-th frequency-domain precoded signal for the c-th carrier, the processing circuitry is further operable to perform the frequency-domain X-update procedure on the n-th frequency-domain precoded signal for the c-th carrier in accordance with:

$x_{n,c}^{(k)} = C_{n,c} \cdot z_{n,c}^{(k-1)} + x_{n,c}^{ZF}$ wherein:
$x_{n,c}^{(k)}$ is the X-update output for the c-th carrier for a k-th iteration of the multi-carrier CRAM processing scheme for the n-th frequency-domain precoded signal;
$C_{n,c}$ is a projection matrix for the n-th frequency-domain precoded signal for the c-th carrier that is defined as $C_{n,c} = I - P_{n,c}^{ZF} K_{n,c}$ where I is an identity matrix, $P_{n,c}^{ZF}$ is a zero-forcing precoding matrix applied to the n-th frequency-domain input signal of the plurality of frequency-domain input signals for the c-th carrier during precoding to provide the n-th frequency-domain precoded signal for the c-th carrier, and $H_{n,c}$ is a channel matrix for the n-th frequency-domain precoded signal for the c-th carrier;
$z_{n,c}^{(k-1)}$ is a Z-update output for the c-th carrier for a (k−1)-th iteration of a Z-update procedure for the n-th frequency-domain precoded signal; and
$x_{n,c}^{ZF}$ is the n-th frequency-domain precoded signal for the c-th carrier.

8. The MIMO OFDM transmitter system of claim 2 wherein the multi-carrier CRAM processing scheme incorporates multi-cell interference scenarios.

9. The MIMO OFDM transmitter system of claim 8 wherein, in order to perform the frequency-domain X-update procedure on the n-th frequency-domain precoded signal for the c-th carrier, the processing circuitry is further operable to perform the frequency-domain X-update procedure on the n-th frequency-domain precoded signal for the c-th carrier in accordance with:

$$x_{n,c}^{(k)} = \begin{bmatrix} \hat{H}_{Intra,n,c} \\ \hat{H}_{Inter,n,c} \end{bmatrix}^\dagger \begin{bmatrix} s_{n,c} \\ 0 \end{bmatrix} + \left( I - \left\{ \begin{bmatrix} \hat{H}_{Intra,n,c} \\ \hat{H}_{Inter,n,c} \end{bmatrix} \right\}^\dagger \begin{bmatrix} \hat{H}_{Intra,n,c} \\ \hat{H}_{Inter,n,c} \end{bmatrix} \right) z_{n,c}^{(k-1)}$$

wherein:
$x_{n,c}^{(k)}$ is the X-update output for the k-th iteration of the multi-carrier CRAM processing scheme for the n-th frequency-domain precoded signal of a desired cell in a wireless communication system for the c-th carrier;
$\hat{H}_{Intra,n,c}$ is a channel matrix for a MIMO channel for the n-th frequency-domain precoded signal for the desired cell for the c-th carrier;
$\hat{H}_{Inter,n,c}$ is a channel matrix for a MIMO channel for interference from an interfering cell in the wireless communication system for the c-th carrier;
$s_{n,c}$ is an n-th frequency-domain input signal of the plurality of frequency-domain input signals of the desired cell for the c-th carrier;

$$I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix}$$

is a projection matrix for the n-th frequency-domain precoded signal for the c-th carrier where I is an identity matrix; and
$z_{n,c}^{(k-1)}$ is a Z-update output for a (k−1)-th iteration of a Z-update procedure for the n-th frequency-domain precoded signal of the desired cell for the c-th carrier.

10. The MIMO OFDM transmitter system of claim 8 wherein, in order to perform the frequency-domain X-update procedure on the n-th frequency-domain precoded signal for the c-th carrier, the processing circuitry is further operable to perform the frequency-domain X-update procedure on the n-th frequency-domain precoded signal for the c-th carrier in accordance with:

$x_{n,c}^{(k)} = K_c \cdot \hat{H}_{Intra,n,c}^H s_{n,c} - (I - K_c \cdot \Theta_c - K_c \cdot \Lambda_c) z_{n,c}^{(k-1)}$ wherein:
$x_{n,c}^{(k)}$ is the X-update output for the k-th iteration of the multi-carrier CRAM processing scheme for the n-th frequency-domain precoded signal of a desired cell of a wireless communication system for the c-th carrier;

$K_c$ is defined as $K_c = (\hat{H}_{Intra,n,c}{}^H \hat{H}_{Intra,n,c} + \Lambda_c)^{-1}$ where $\hat{H}_{Intra,n,c}$ is known and is a channel matrix for a MIMO channel for the n-th frequency-domain precoded signal for the desired cell for the c-th carrier, and $\Lambda_c$ is a covariance matrix defined as $\Lambda_c = \hat{H}_{Inter,n,c}{}^H \cdot \hat{H}_{Inter,n,c}$ where $\hat{H}_{Inter,n,c}$ is unknown and is a channel matrix for a MIMO channel for interference from an interfering cell in the wireless communication system for the c-th carrier;

$\hat{H}_{Intra,n,c}{}^H$ is a Hermitian transpose of the channel matrix $\hat{H}_{Intra,n,c}$;

$s_{n,c}$ is an n-th frequency-domain input signal of the plurality of frequency-domain input signals of the desired cell for the c-th carrier;

$I - K_c \cdot \Theta_c - K_c \cdot \Lambda_c$ is a projection matrix where I is an identity matrix and $\Theta_c = \hat{H}_{Intra,n,c}{}^H \cdot \hat{H}_{Intra,n,c}$; and $z_{n,c}^{(k-1)}$ is a Z-update output for a (k−1)-th iteration of a Z-update procedure for the n-th frequency-domain precoded signal of the desired cell for the c-th carrier.

11. The MIMO OFDM transmitter system of claim 10 wherein, in order to perform the frequency-domain X-update procedure on the n-th frequency-domain precoded signal for the c-th carrier, the processing circuitry is further operable to perform the frequency-domain X-update procedure on the n-th frequency-domain precoded signal for the c-th carrier in accordance with:

$$x_{n,c}^{(k)} = K_c \cdot \hat{H}_{Intra,n,c}{}^H s_{n,c} - (I - K_c \cdot \Theta_c - K_c \cdot \hat{\Lambda}_c) z_{n,c}^{(k-1)}$$

wherein:

$x_{n,c}^{(k)}$ is the X-update output for the k-th iteration of the multi-carrier CRAM processing scheme for the n-th frequency-domain precoded signal of a desired cell in a wireless communication system for the c-th carrier;

$K_c$ is defined as $K_c = (\hat{H}_{Intra,n,c}{}^H \hat{H}_{Intra,n,c} + \hat{\Lambda}_c)^{-1}$ where $\hat{H}_{Intra,n,c}$ is a channel matrix for a MIMO channel for the n-th frequency-domain precoded signal for the desired cell for the c-th carrier, and $\hat{\Lambda}_c$ is a known estimate of a covariance of an inter-cell interference response for the c-th carrier;

$\hat{H}_{Intra,n,c}{}^H$ is a Hermitian transpose of the channel matrix $\hat{H}_{Intra,n,c}$;

$s_{n,c}$ is an n-th frequency-domain input signal of the plurality of frequency-domain input signals of the desired cell for the c-th carrier;

$I - K_c \cdot \Theta_c - K_c \cdot \hat{\Lambda}_c$ is a projection matrix where I is an identity matrix and $\Theta_c = \hat{H}_{Intra,n,c}{}^H \cdot \hat{H}_{Intra,n,c}$; and $z_{n,c}^{(k-1)}$ is a Z-update output for a (k−1)-th iteration of a Z-update procedure for the n-th frequency-domain precoded signal of the desired cell for the c-th carrier.

12. The MIMO OFDM transmitter system of claim 2 wherein:

the MIMO OFDM transmitter system is a concurrent multi-band transmitter system that concurrently transmits on two or more frequency bands;

the two or more carriers comprise at least one carrier in each frequency band of the two or more frequency bands; and the multi-carrier processing scheme is a multi-band processing scheme such that the plurality of multi-carrier time-domain transmit signals for the plurality of antenna branches, respectively, is a plurality of multi-band time-domain transmit signals for the plurality of antenna branches, respectively.

13. A Multiple Input Multiple Output, MIMO, Orthogonal Division Multiplexing, OFDM, transmitter system, comprising:

precoding circuitry operable to, for each carrier of two or more carriers, perform precoding of a plurality of frequency-domain input signals for the carrier to provide a plurality of frequency-domain precoded signals for the carrier, the plurality of frequency-domain input signals for the carrier being for a plurality of transmit layers for the carrier, respectively; and processing circuitry operable to process the two or more pluralities of frequency-domain precoded signals for the two or more carriers, respectively, in accordance with a multi-carrier processing scheme to provide a plurality of multi-carrier time-domain transmit signals for a plurality of antenna branches, respectively, of the MIMO OFDM transmitter system, the multi-carrier processing scheme providing Peak-to-Average Power Ratio, PAPR, reduction for Cyclic Prefixes, CPs, of the plurality of multi-carrier time-domain transmit signals for the plurality of antenna branches;

wherein:

the MIMO OFDM transmitter system is a concurrent multi-band transmitter system that concurrently transmits on two or more frequency bands;

the two or more carriers comprise at least one carrier in each frequency band of the two or more frequency bands; and the multi-carrier processing scheme is a multi-band processing scheme such that the plurality of multi-carrier time-domain transmit signals for the plurality of antenna branches, respectively, is a plurality of multi-band time-domain transmit signals for the plurality of antenna branches, respectively;

wherein, in order to process the two or more pluralities of frequency-domain precoded signals for the two or more carriers, respectively, in accordance with a multi-band CRAM processing scheme, the processing circuitry is further operable to:

for each b-th frequency band of the two or more frequency bands:

for each c-th carrier of the at least one carrier in the b-th frequency band:

for each n-th frequency-domain precoded signal of the plurality of frequency-domain precoded signals for the c-th carrier in the b-th frequency band for n=1, . . . , N, perform a frequency-domain X-update procedure on the n-th frequency-domain precoded signal for the c-th carrier in the b-th frequency band to provide an X-update output $x_{n,c,b}^{(k)}$ for the n-th frequency-domain precoded signal for the c-th carrier in the b-th frequency band for a k-th iteration of the multi-band CRAM processing scheme;

reorder the X-update outputs, $x_{n,c,b}^{(k)}$, for the c-th carrier in the b-th frequency band to thereby provide a plurality of antenna-domain vectors for the c-th carrier in the b-th frequency band, each comprising N frequency-domain samples, for the plurality of antenna branches, respectively;

transform the plurality of antenna-domain vectors for the c-th carrier in the b-th frequency band from the frequency-domain to the time-domain to thereby provide a plurality of time-domain signals for the c-th carrier in the b-th frequency band for the plurality of antenna branches, respectively; and for each time-domain signal of the plurality of time-domain signals for the c-th carrier in the b-th frequency band:
add a CP to the time-domain signal;
after adding the CP, perform channel filtering on the time-domain signal to provide a filtered signal;
interpolate the filtered signal to a desired sampling rate to thereby provide an interpolated signal, wherein one or more samples at an end of the interpolated signal are missing;
copy, to the end of the interpolated signal, one or more samples from a front portion of the interpolated signal that correspond to the one or more samples that are missing, thereby replacing the one or more samples that are missing; and
after replacing the one or more samples that are missing, tune the interpolated signal to a desired frequency offset for the c-th carrier to thereby provide a tuned signal for the respective antenna branch for the c-th carrier; and for each antenna branch of the plurality of antenna branches, combine the tuned signals for the antenna branch for the at least one carrier in the b-th frequency band to provide a time-domain transmit signal for the antenna branch for the b-th frequency band; and for each antenna branch of the plurality of antenna branches, combine the time-domain transmit signals for the antenna branch for the two or more frequency bands to provide the multi-band time-domain transmit signal for the antenna branch.

14. The MIMO OFDM transmitter system of claim 13 wherein the processing circuitry is further operable to:

for each b-th frequency band of the two or more frequency bands:
for each m-th antenna branch of the plurality of antenna branches:
perform a time-domain Z-update procedure on the time-domain transmit signal for the m-th antenna branch for the b-th frequency band to provide a time-domain Z-update output $Z_{m,b}^{(k)}$ for the m-th antenna branch for the b-th frequency band for a k-th iteration of the multi-band CRAM processing scheme; and for each c-th carrier of the at least one carrier in the b-th frequency band:
for each m-th antenna branch of the plurality of antenna branches:
tune the time-domain Z-update output $Z_{m,b}^{(k)}$ for the m-th antenna branch for the b-th frequency band to baseband to thereby provide a time-domain Z-update output for the m-th antenna branch for the c-th carrier in the b-th frequency band;
zero pad the time-domain Z-update output for the m-th antenna branch for the c-th carrier in the b-th frequency band;
after zero padding, decimate the time-domain Z-update output for the m-th antenna branch for the c-th carrier in the b-th frequency band to a desired sampling rate;

after decimating, perform CP removal on the time-domain Z-update output for the m-th antenna branch for the c-th carrier in the b-th frequency band; and after performing CP removal, transform the time-domain Z-update output for the m-th antenna branch for the c-th carrier in the b-th frequency band from the time-domain to the frequency-domain to thereby provide a frequency-domain Z-update output for the m-th antenna branch for the c-th carrier in the b-th frequency band; and perform a reverse reordering on the frequency-domain Z-update outputs for the plurality of antenna branches for the c-th carrier in the b-th frequency band to thereby provide Z-update outputs $z_{n,c,b}^{(k)}$ for the frequency-domain X-update procedures performed on a plurality of frequency-domain precoded signals for the c-th carrier in the b-th frequency band for a (k+1)-th iteration of the multi-band CRAM processing scheme.

15. The MIMO OFDM transmitter system of claim 14 wherein, in order to perform the time-domain Z-update procedure on the time-domain transmit signal for the m-th antenna branch for the b-th frequency band to provide the time-domain Z-update output $Z_{m,b}^{(k)}$ for the m-th antenna branch for the b-th frequency band for the k-th iteration of the multi-band CRAM processing scheme, the processing circuitry is further operable to:

perform the time-domain Z-update procedure on the time-domain transmit signal for the m-th antenna branch for the b-th frequency band in accordance with:

$$Z_{m,b}^{(k)}(t) = Z_{m,b}^{(k-1)}(t) + Y_{m,b}^{(k)}(t) - X_{m,b}^{(k)}(t)$$

wherein:
$Z_{m,b}^{(k)}(t)$ is the time-domain Z-update output for the m-th antenna branch for the b-th frequency band for the k-th iteration of the multi-band CRAM processing scheme;
$Z_{m,b}^{(k-1)}(t)$ is a time-domain Z-update output for the m-th antenna branch for the b-th frequency band for a (k−1)-th iteration of the multi-band CRAM processing scheme;
$Y_{m,b}^{(k)}(t)$ is for the m-th antenna branch for the b-th frequency band and is defined as:

$$Y_{m,b}^{(k)}(t) = \begin{cases} \frac{Th_{high}}{|errY_{m,b}^{(k)}(t)|} \times errY_{m,b}^{(k)}(t), & \text{if } |errY_{m,b}^{(k)}(t)| > Th_{high} \\ \frac{Th_{low}}{|errY_{m,b}^{(k)}(t)|} \times errY_{m,b}^{(k)}(t), & \text{if } |errY_{m,b}^{(k)}(t)| < Th_{low} \\ Th_{low}, & \text{if } |errY_{m,b}^{(k)}(t)| = 0 \\ errY_{m,b}^{(k)}(t), & \text{otherwise} \end{cases}$$

wherein:
$$errY_{m,b}^{(k)}(t) = 2 \cdot X_{m,b}^{(k)}(t) - Z_{m,b}^{(k-1)}(t);$$

and
$X_{m,b}^{(k)}(t)$ is the time-domain transmit signal for the m-th antenna branch for the b-th frequency band for the k-th iteration of the multi-band CRAM processing scheme;
$errY_m^{(k)}(t)$ is an output of the time-domain Z-update function for the m-th antenna branch for the k-th iteration of the CRAM algorithm;
$Th_{high}$ is an upper clipping threshold; and
$Th_{low}$ is a lower clipping threshold.

16. The MIMO OFDM transmitter system of claim 14 wherein, in order to perform CP removal on the time-domain Z-update output $Z_{m,b}^{(k)}$ for the m-th antenna branch for the c-th carrier in the b-th frequency band, the processing circuitry is further operable to:
- remove, from the time-domain Z-update output for the m-th antenna branch for the c-th carrier in the b-th frequency band, a first portion of the time-domain Z-update output for the m-th antenna branch for the c-th carrier in the b-th frequency band that corresponds to the CP of the respective time-domain signal for the m-th antenna branch for the c-th carrier in the b-th frequency band; and
- for each sample in the first portion that has a magnitude that is less than that of a respective sample in a second portion of the time-domain Z-update output for the m-th antenna branch for the c-th carrier in the b-th frequency band that corresponds to a portion of the respective time-domain signal for the m-th antenna branch for the c-th carrier in the b-th frequency band from which the CP was derived, replace the respective sample in the second portion with the sample in the first portion.

17. The MIMO OFDM transmitter system of claim 13 wherein, in order to perform the frequency-domain X-update procedure on the n-th frequency-domain precoded signal for the c-th carrier in the b-th frequency band, the processing circuitry is further operable to perform the frequency-domain X-update procedure on the n-th frequency-domain precoded signal for the c-th carrier in the b-th frequency band in accordance with:

$$x_{n,c,b}^{(k)} = C_{n,c,b} \cdot z_{n,c,b}^{(k-1)} + x_{n,c,b}^{ZF}$$

wherein:
$x_{n,c,b}^{(k)}$ is the X-update output for the c-th carrier in the b-th frequency band for the k-th iteration of the multi-band CRAM processing scheme for the n-th frequency-domain precoded signal;

$C_{n,c,b}$ is a projection matrix for the n-th frequency-domain precoded signal for the c-th carrier in the b-th frequency band that is defined as $C_{n,c,b} = I - P_{n,c,b}^{ZF} H_{n,c,b}$ where I is an identity matrix, $P_{n,c,b}^{ZF}$ is a zero-forcing precoding matrix applied to the n-th frequency-domain input signal of the plurality of frequency-domain input signals for the c-th carrier in the b-th frequency band during precoding to provide the n-th frequency-domain precoded signal for the c-th carrier in the b-th frequency band, and $H_{n,c,b}$ is a channel matrix for the n-th frequency-domain precoded signal for the c-th carrier in the b-th frequency band;

$z_{n,c,b}^{(k-1)}$ is a Z-update output for the c-th carrier in the b-th frequency band for a (k−1)-th iteration of a Z-update procedure for the n-th frequency-domain precoded signal; and $x_{n,c,b}^{ZF}$ is the n-th frequency-domain precoded signal for the c-th carrier in the b-th frequency band.

18. The MIMO OFDM transmitter system of claim 13 wherein the multi-band CRAM processing scheme incorporates multi-cell interference scenarios.

* * * * *